US010014812B2

(12) United States Patent
Bailey et al.

(10) Patent No.: US 10,014,812 B2
(45) Date of Patent: Jul. 3, 2018

(54) VARIABLE TORQUE MOTOR/GENERATOR/TRANSMISSION

(71) Applicant: Falcon Power, LLC, Titusville, FL (US)

(72) Inventors: James L. Bailey, Titusville, FL (US); Harley C. McDonald, Merritt Island, FL (US)

(73) Assignee: Falcon Power, LLC, Titusville, FL (US)

( * ) Notice: Subject to any disclaimer, the term of this patent is extended or adjusted under 35 U.S.C. 154(b) by 0 days.

(21) Appl. No.: 15/808,188

(22) Filed: Nov. 9, 2017

(65) Prior Publication Data

US 2018/0138850 A1 May 17, 2018

Related U.S. Application Data

(60) Continuation of application No. 15/332,824, filed on Oct. 24, 2016, now Pat. No. 9,819,296, which is a
(Continued)

(51) Int. Cl.
*B60L 11/02* (2006.01)
*B61C 9/38* (2006.01)
(Continued)

(52) U.S. Cl.
CPC ........... *H02P 25/188* (2013.01); *B63H 21/14* (2013.01); *B63H 21/20* (2013.01); *B63H 23/10* (2013.01);
(Continued)

(58) Field of Classification Search
CPC .... H02K 16/04; H02K 21/023; H02K 21/024; B60L 15/00
(Continued)

(56) References Cited

U.S. PATENT DOCUMENTS 3,401,290 A 9/1968 Potter
3,973,137 A 8/1976 Droblina
(Continued)

FOREIGN PATENT DOCUMENTS

EP 1265341 A1 12/2002
EP 1401087 A1 3/2004
(Continued)

OTHER PUBLICATIONS

International Search Report and Written Opinion dated Oct. 23, 2015 for Application No. PCT/US2015/043296.
(Continued)

*Primary Examiner* — Tulsidas C Patel
*Assistant Examiner* — Thomas Quigley
(74) *Attorney, Agent, or Firm* — Kevin E. West; Advent, LLP

(57) ABSTRACT

The present disclosure is directed to an electric generator and motor transmission system that is capable of operating with high energy, wide operating range and extremely variable torque and RPM conditions. In accordance with various embodiments, the disclosed system is operable to: dynamically change the output "size" of the motor/generator by modularly engaging and disengaging rotor/stator sets as power demands increase or decrease; activate one stator or another within the rotor/stator sets as torque/RPM or amperage/voltage requirements change; and/or change from parallel to series winding configurations or the reverse through sets of 2, 4, 6 or more parallel, three-phase, non-twisted coil windings with switchable separated center tap to efficiently meet torque/RPM or amperage/voltage requirements.

20 Claims, 35 Drawing Sheets

Related U.S. Application Data division of application No. 14/815,733, filed on Jul. 31, 2015, now Pat. No. 9,479,037.

(60) Provisional application No. 62/032,468, filed on Aug. 1, 2014, provisional application No. 62/146,694, filed on Apr. 13, 2015, provisional application No. 62/146,725, filed on Apr. 13, 2015.

(51) Int. Cl.

| | |
|---|---|
| *H02P 25/18* | (2006.01) |
| *B63H 21/14* | (2006.01) |
| *B63H 21/20* | (2006.01) |
| *B63H 23/10* | (2006.01) |
| *H02K 3/28* | (2006.01) |
| *H02K 19/16* | (2006.01) |
| *H02K 7/18* | (2006.01) |
| *H02K 16/04* | (2006.01) |
| *H02P 31/00* | (2006.01) |
| *H02K 21/02* | (2006.01) |

(52) U.S. Cl.
CPC ............ *H02K 3/28* (2013.01); *H02K 7/183* (2013.01); *H02K 16/04* (2013.01); *H02K 19/16* (2013.01); *H02K 21/024* (2013.01); *H02P 31/00* (2013.01); *B63H 2021/202* (2013.01); *B63H 2021/205* (2013.01); *Y02T 70/5236* (2013.01); *Y10S 903/906* (2013.01)

(58) Field of Classification Search
USPC .................... 290/45; 310/112–114, 191, 209
See application file for complete search history.

(56) References Cited

U.S. PATENT DOCUMENTS

| | | | |
|---|---|---|---|
| 4,027,229 A | 5/1977 | Frink | |
| 4,093,882 A | 6/1978 | Furuta | |
| 4,472,673 A | 9/1984 | Miller | |
| 4,734,604 A | 3/1988 | Sontheimer et al. | |
| 4,920,293 A | 4/1990 | Kanda | |
| 5,019,766 A | 5/1991 | Hsu et al. | |
| 5,189,357 A | 2/1993 | Woodson et al. | |
| 5,614,777 A | 3/1997 | Bitterly et al. | |
| 5,675,203 A | 10/1997 | Schulze et al. | |
| 5,763,977 A | 6/1998 | Shimasaki et al. | |
| 5,831,366 A | 11/1998 | Kern et al. | |
| 5,834,872 A | 11/1998 | Lamb | |
| 6,005,317 A | 12/1999 | Lamb | |
| 6,166,469 A | 12/2000 | Osama et al. | |
| 6,211,591 B1 | 4/2001 | Kowalski et al. | |
| 6,242,832 B1 | 6/2001 | Lamb | |
| 6,337,527 B2 | 1/2002 | Lamb | |
| 6,380,648 B1 | 4/2002 | Hsu | |
| 6,492,753 B2 | 12/2002 | Zepp et al. | |
| 6,555,941 B1 | 4/2003 | Zepp et al. | |
| 6,737,786 B2 | 5/2004 | Hsu | |
| 6,759,780 B2 | 7/2004 | Liu et al. | |
| 7,482,903 B2 | 1/2009 | Kaumann et al. | |
| 7,497,285 B1 | 3/2009 | Radev | |
| 7,863,789 B2 | 1/2011 | Zepp et al. | |
| 7,965,006 B2 | 6/2011 | Kang et al. | |
| 8,269,389 B1 | 9/2012 | Somerville | |
| 8,415,910 B2 | 4/2013 | Fulton | |
| 8,608,521 B1 | 12/2013 | Snyder et al. | |
| 9,479,037 B2 | 10/2016 | Bailey et al. | |
| 2002/0163262 A1 | 11/2002 | Hsu | |
| 2003/0137149 A1 | 7/2003 | Northrup et al. | |
| 2005/0104469 A1 | 5/2005 | Zepp et al. | |
| 2008/0265702 A1 | 10/2008 | Yeh | |
| 2008/0272664 A1 | 11/2008 | Flynn | |
| 2009/0160392 A1 | 6/2009 | Mularcik | |
| 2009/0267434 A1 | 10/2009 | Park | |
| 2010/0007225 A1 | 1/2010 | Platon et al. | |
| 2010/0013346 A1 | 1/2010 | Peek | |
| 2010/0109448 A1 | 5/2010 | Mamba et al. | |
| 2010/0213778 A1 | 8/2010 | Knutson | |
| 2011/0227523 A1 | 9/2011 | Grantz | |
| 2012/0086380 A1 | 4/2012 | Krieger et al. | |
| 2014/0091746 A1 | 4/2014 | Fujishima et al. | |
| 2014/0232233 A1 | 8/2014 | Fukushima et al. | |

FOREIGN PATENT DOCUMENTS

| | | |
|---|---|---|
| EP | 2306621 A1 | 4/2011 |
| JP | 2008155313 A | 7/2008 |
| KR | 1020090060388 A | 6/2009 |

OTHER PUBLICATIONS

Office Action dated Jul. 21, 2016 for Taiwan Patent Appln. No. 104124994.

Goudarzi, N. et al., "Aerodynamic and Electromagnetic Analysis of a Variable Electromotive-Force Generator for a Wind Turbine", ASME 2012 International Mechanical Engineering Congress and Exposition, vol. 4: Dynamics, Control and Uncertainty, Parts A and B, Houston, Texas, USA, Nov. 9-15, 2012, pp. 1-14.

Nipp, Eckart, "Permanent Magnet Motor Drives with Switched Stator Windings", Royal Institute of Technology, Department of Electrical Power Engineering Electrical Machines and Drives, Stockholm 1999, TRITA-EMD-9905, ISSN-1102-0172, 315 pages.

https://duratracmotors.com/technical-papers/.

https://duratracmotors.com/patents/.

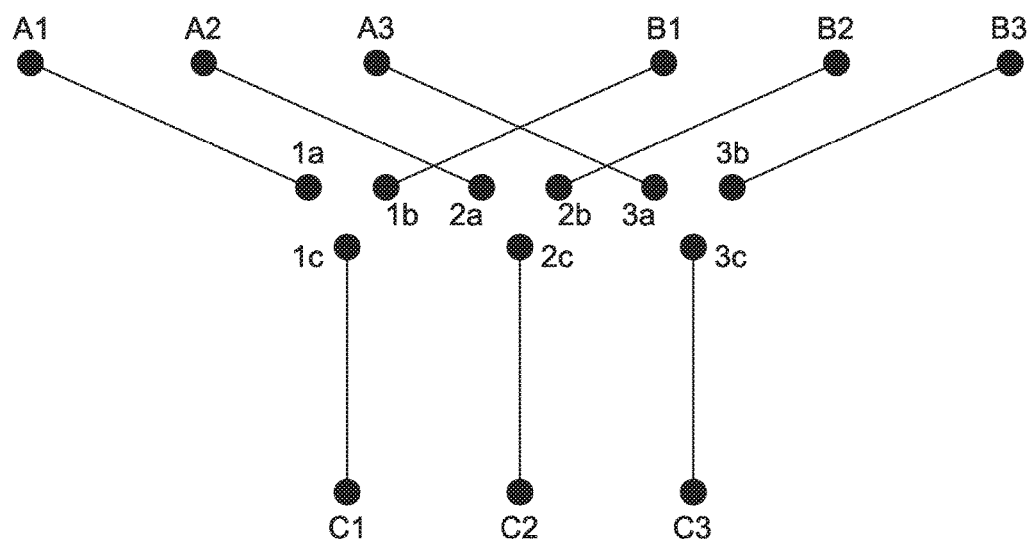
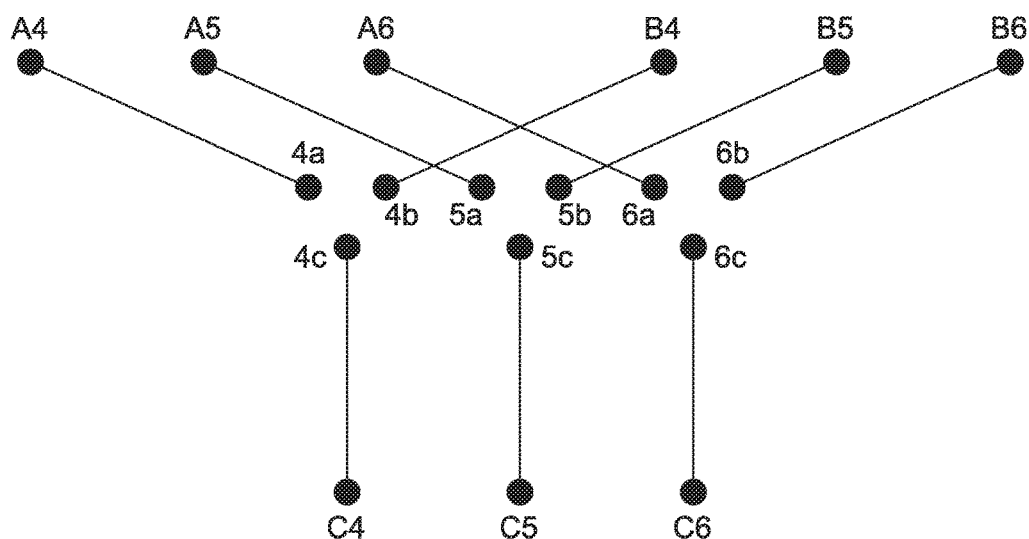
FIG. 28

VARIABLE TORQUE MOTOR/GENERATOR/TRANSMISSION

CROSS-REFERENCE TO RELATED APPLICATIONS

The present application is continuation under 35 U.S.C. § 120 of U.S. patent application Ser. No. 15/332,824 (U.S. Pat. No. 9,819,296), filed Oct. 24, 2016, which is a divisional under 35 U.S.C. § 120 of U.S. patent application Ser. No. 14/815,733 (U.S. Pat. No. 9,479,037), filed Jul. 31, 2015, entitled "VARIABLE TORQUE MOTOR/GENERATOR/TRANSMISSION," which claims the benefit under 35 U.S.C. § 119(e) of U.S. Provisional Application Ser. No. 62/032,468, filed Aug. 1, 2014, and titled "VARIABLE TORQUE GENERATOR/MOTOR;" U.S. Provisional Application Ser. No. 62/146,694, filed Apr. 13, 2015, and titled "VARIABLE TORQUE GENERATOR/MOTOR;" and U.S. Provisional Application Ser. No. 62/146,725, filed Apr. 13, 2015, and titled "HYBRID MARINE PROPULSION SYSTEM." U.S. Patent Application Serial Nos. 62/032,468; 62/146,694; and 62/146,725 are herein incorporated by reference in their entireties.

BACKGROUND

The conversion between rotational power and electrical power has very early beginnings. The first electrical generator demonstrated was a "Faraday Disk" developed by Michael Faraday between 1831 and 1832. Also in 1832 the "Dynamo" was introduced by Hippolyte Pixii and thus demonstrated the generator system used in industry having a field, rotor and commutator most of which are still common in modern generators, alternators and motors. During this same year 1832, a British inventor named William Sturgeon demonstrated the first direct current (DC) motor capable of turning machinery and soon after in 1837, Emily and Thomas Davenport patented the first commercialized version of the commutator type DC electric motor.

Most modern electrical generators and motors resemble the early ones with the exception of vast improvements in "air gap" distances where the older machines lost huge amounts of efficiency due to large "air gaps". Other advancements have been made to improve efficiency and commercial value throughout the years.

SUMMARY

A motor/generator/transmission can include one or more rotor/stator sets, where each rotor/stator set includes a rotor and two or more stators. In some embodiments, the rotor includes a ring of equally spaced magnets circumscribing a center axis, and the stators each include a ring of equally spaced cores with windings circumscribing a center axis coaxial with the magnet ring. In embodiments, the windings of the stator cores in the two or more stators are different and can produce different torque-to-revolutions per minute (torque/rpm) and/or amperage-to-voltage (amp/volt) ratios when energized by the magnetic field of the rotor. The rotor magnet ring may be radially inside a stator core ring or outside a stator core ring (e.g., so the magnets and the stator core faces are radially opposite one another and separated by a gap). The rotor and stators can be moved relative to one another in the axial direction to engage the magnetic field of the rotor magnets with the interactive field of first stator windings, second stator windings, possibly third or more stator windings, none of the stator windings, and so forth.

In some embodiments, the stators and/or the magnet rings can be moved by actuators controlled by a common interconnected controller for the rotor/stator sets. In some embodiments, the magnets may be permanent magnets, electromagnets, and so forth. A magnet ring can be segmented, where each segment includes one or more magnets, and where the number of segments can be rotationally and/or magnetically balanced. Thus, the segments can be moved in balanced sets to engage an electromagnetic field of the first stator, the second stator, or possibly additional stators, increasing or decrease the power of a rotor/stator set. In some embodiments, the stator cores can be wound in multi-phases, were the wires at a center tap are separated and connected to a switching mechanism and/or controller that can connect parallel, non twisted windings in all parallel, all series, or two or more combinations in between, changing the volt/amp and rpm/torque ratios of the rotor/stator sets. In some embodiments, there can be two (2), four (4), six (6), or more than six (6) parallel, non twisted wires in the core windings, producing two (2), three (3), four (4), or more than four (4) combinations of parallel, series or parallel/series combinations respectively.

In some embodiments, a motor/generator/transmission includes: a stator support extending longitudinally in a first direction, the stator support having a first interactive field element (e.g., a first stator) and a second interactive field element (e.g., a second stator) spaced apart from the first interactive field element in the first direction; a rotor rotatably coupled with the stator support, the rotor having an axis of rotation and a longitudinal support structure extending in the first direction; and at least a third interactive field element (e.g., a magnet, an electromagnet) slidably coupled with the longitudinal support structure to translate along the longitudinal support structure parallel to its axis of rotation between a first orientation where the first stator is engaged with the magnet, a second orientation where the second stator is engaged with the magnet, and a third orientation where neither the first stator nor the second stator is engaged with the magnet.

In some embodiments, a propulsion system includes: a propulsion device; an engine to selectively power the propulsion device; a variable torque motor/generator/transmission to selectively power the propulsion device; an energy storage device to store energy for powering the variable torque motor/generator/transmission; and a controller to selectively operate the propulsion system in a first mode where the variable torque motor/generator/transmission supplies power to the propulsion device, a second mode where the engine supplies power to both the propulsion device and the variable torque motor/generator/transmission, and/or a third mode where the engine and the variable torque motor generator both supply power to the propulsion device, where the variable torque motor/generator/transmission supplies energy for storage in the energy storage device when the propulsion system is operated in the second mode.

In some embodiments, a method of operating multi-phase stator windings of a motor/generator/transmission includes connecting two or more multi-phase stator windings of a stator of a motor/generator/transmission having a separated switchable center tap in series with one another; operating the motor/generator/transmission at a first torque while the two or more multi-phase stator windings are connected in series with one another; connecting the two or more multi-phase stator windings in parallel with one another; and operating the motor/generator/transmission at a second torque while the two or more multi-phase stator windings are connected in parallel with one another, the second torque different than the first torque. For example, the center tap of the multi-phase stator windings is separated by a switching system where sets of two or more, parallel non-twisted wires of stator core windings may be switched so the windings are in series with one another to operate the motor/generator/transmission at a first torque; switched so the windings are in parallel with each other to operate the motor/generator/transmission at a second torque; and switched so the windings are in pairs or sets of three, where each pair or set of three is connected to other pairs or sets of three in series to operate the motor/generator/transmission at a third torque or a fourth torque (e.g., between the first and second torques). In this manner, a motor/generator/transmission can be configured using electronics to switch the torque/rpm ratio and/or the amp/volt ratio.

In some embodiments of this disclosure, a motor/generator/transmission is mechanically and electronically reconfigurable to accommodate variable torques. The motor/generator/transmission can include: a stator having a first multi-phase stator winding and a second multi-phase stator winding separated at a switchable center tap; a rotor rotatably coupled with the stator, the rotor having an axis of rotation, at least one of the stator or the rotor configured to translate parallel to the axis of rotation between a first orientation where the stator is engaged with the rotor, and a second orientation where the stator is disengaged from the rotor; and switching circuitry configured to connect the first multi-phase stator winding and the second multi-phase stator winding in series in the first orientation while the motor/generator/transmission is operated at a first torque, and connect the first multi-phase stator winding and the second multi-phase stator winding in parallel in the first orientation while the motor/generator/transmission is operated at a second torque, the second torque different than the first torque.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

FIG. 28 is a diagrammatic illustration of a six-wire separated stator winding assembly in accordance with example embodiments of the present disclosure.

DETAILED DESCRIPTION

Figure 1:
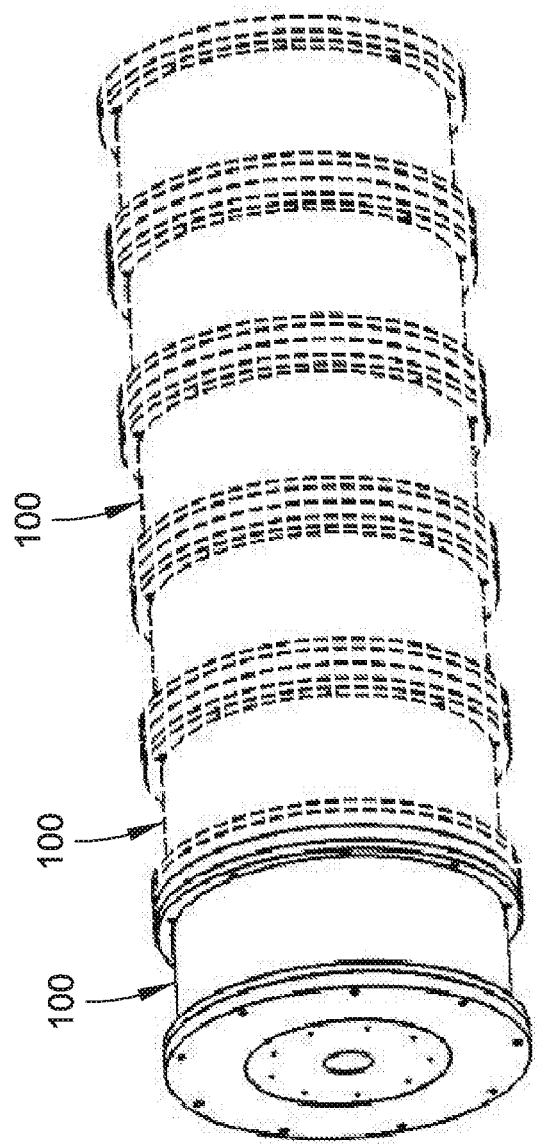
FIG. 1 is a perspective view illustrating an electric motor/generator/transmission, which may be connected to one or more additional electric motor/generator/transmissions in accordance with example embodiments of the present disclosure.

To date more than 99.9% of electricity generated worldwide is from some form of generator with rotational movement. Solar panels account for about 0.05%. Between 65 and 70% of the world industrial power and about 57% of all consumed power is used by electric motors. This relates to an estimated 16,000-plus terawatt-hours (TWh) annual consumption of electrical power worldwide. Due to this trend of consumption and efficiency improvement, conventional modern electrical generators and motors can operate in the 90 to 98% efficiency range near their rated revolutions per minute (RPM) and torque specifications. For this reason it is thought that the modern generator and motor industries are very mature and small incremental improvements can be made. However, while the narrow band of high efficiency rating in generators and motors is high, when these same generators and motors are operating outside the specified RPM and/or torque rating, the efficiencies dramatically decrease sometimes as low as 30 to 60%.

While most conventional generation systems use a continuous RPM and torque power source, renewable energies that are now emerging have much greater RPM and torque changes, as the power source is variable, untimely and most times unpredictable. As our capacity in conventional generation and distribution is reached, the need for generators in the renewable energies to be sensitive to this torque and still be efficient can be a very high priority. Likewise in the motor sector there exists a greater need for wider operating ranges with high efficiency for the industrial use and especially in the transportation sector as the demand for hybrid and "plug in" electric vehicles increases exponentially. An electrical motor's efficiency rarely stays constant, as the real world operating conditions require starts, stops and variable loads.

The modern day vehicle alternator converts some of the rotational power of the combustion engine into electrical power in order to operate the electronics and maintain battery charge. These alternators generally are 50 to 60% efficient. In 2007 there were about 806 million vehicles and today it is estimated to exceed a billion in operation. Almost 16% of manmade $CO_2$ comes from these vehicles. Even a small amount of efficiency improvement in these alternators can make a dramatic improvement in fewer emissions and a considerable decrease in fuel consumption. This alternator efficiency loss is due primarily to air gap and inefficiencies in the rotor coil system (electromagnet). Permanent magnets in the rotor are not generally used in vehicular alternators due to the inability to regulate the output for variable loads efficiently.

Permanent magnet alternators (PMA) are used in small wind machines today. They typically have a high startup speed, as cogging of the rotor and the natural magnetic attraction of the stator tend to require a substantial minimum wind speed in order to overcome this limitation. They also lack the RPM range required to produce efficient power in the lower speed range as well as having a current limitation at very high wind speeds. They do not have the ability to regulate their output as the construction allows maximum power production at a given RPM. The stator selection limits the maximum current or voltage; it has a very limited efficiency range.

With medium to large wind systems, they use large generators that are converted to DC, and then power invertors that follow the power grid and distribute this current to the grid. This conversion comes with lost efficiency and heat production. This also limits the turbine startup speed and maximum output power. In large wind turbines, synchronous 3-phase generators can be used that usually have the rotor powered by the electrical grid in order to tie into the power grid frequency. While using the power inverter system to regulate the output power, they lose efficiency as well as limiting the turbine RPM range. Other renewable energy system generators such as tidal and wave generators have the same problems with efficiency loss due to limited RPM and torque ranges for the wide variations in RPM and torque range of these systems.

The use of permanent magnet motors in hybrid and "plug-in" electric vehicles has a very limited efficiency range as well. These motors like their PMA counterparts are limited by their construction in RPM, torque and current usage. They also have a problem with back EMF and extreme drag while in coast mode due to the permanent magnet passing continuously by the iron core of the stator.

The present disclosure is directed to an electric generator and motor transmission system that is capable of operating with high energy, wide operating range and extremely variable torque and RPM conditions. This disclosure utilizes the variability of renewable resources such as inconsistent wind speed, untimely ocean wave movement or braking energy in a hybrid vehicle and more efficiently increases the generating potential that conventional generators cannot do. On the motor side, the disclosure produces a variable range of torque/RPM possibility to more efficiently meet the requirements of hybrid vehicles. The system can actually dynamically change the output "size" of the motor/generator by modularly engaging and disengaging rotor/stator sets as power demands increase or decrease and as torque/RPM or amperage/voltage requirements change activate one stator or another within the rotor/stator sets and can change from parallel to series winding or the reverse through sets of 2, 4, 6 or more parallel, three phase, non-twisted coil windings to meet the torque/RPM or amperage/voltage requirements at optimum or nearly optimum efficiency. The disclosed motor system also increases the variability of hybrid and "plug-in" electric vehicles, e.g., by increasing the operating range, battery life, longevity of the device, cost effectiveness and ease of retrofitting.

Figure 2:
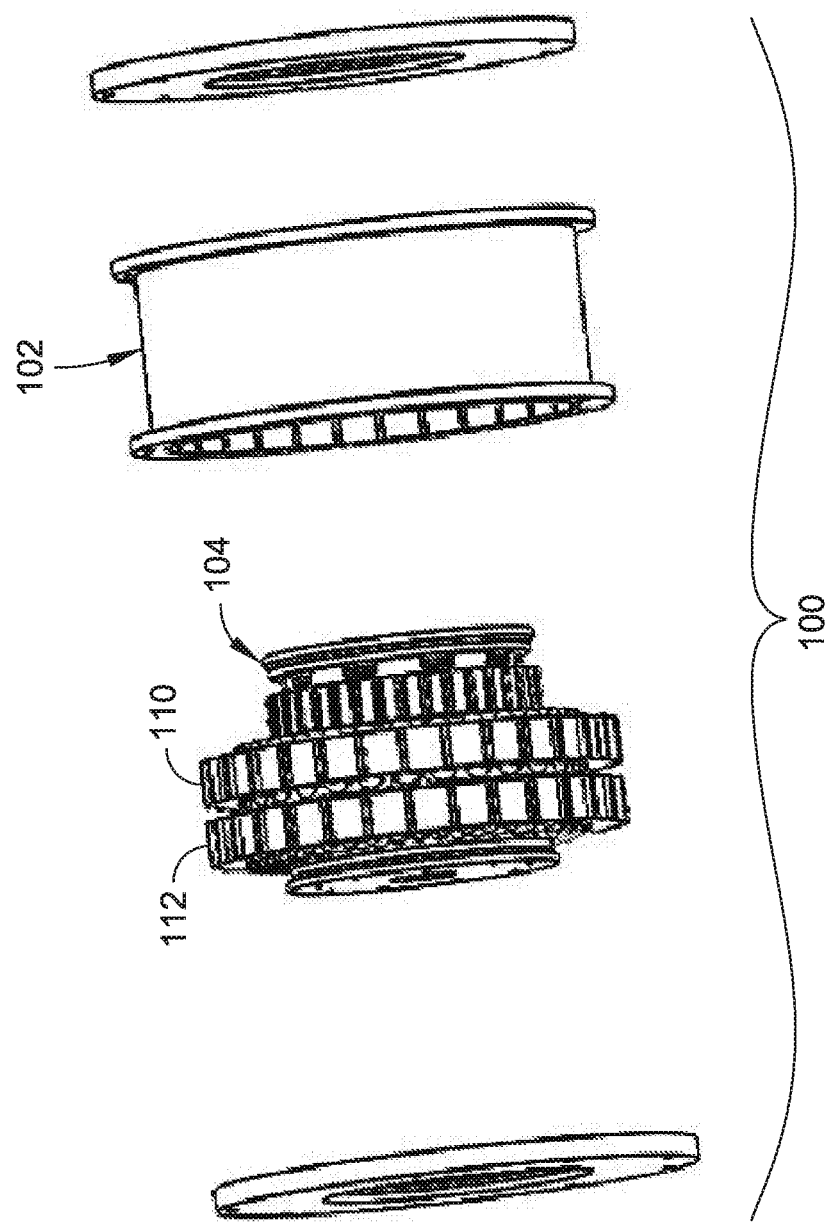
FIG. 2 is an exploded perspective view of an electric motor/generator/transmission, such as the electric motor/generator/transmission illustrated in FIG. 1, in accordance with an example embodiment of the present disclosure.
Figure 3:
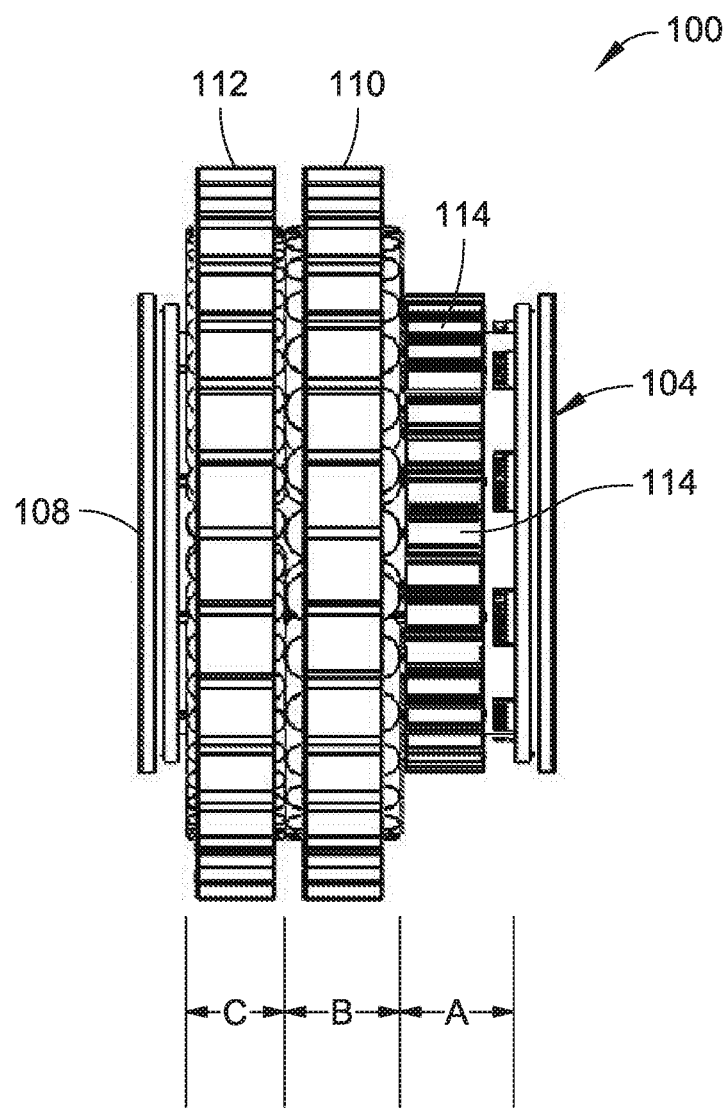
FIG. 3 is a partial side elevation view of an electric motor/generator/transmission, such as the electric motor/generator/transmission illustrated in FIG. 1, in accordance with an example embodiment of the present disclosure.
Figure 4:
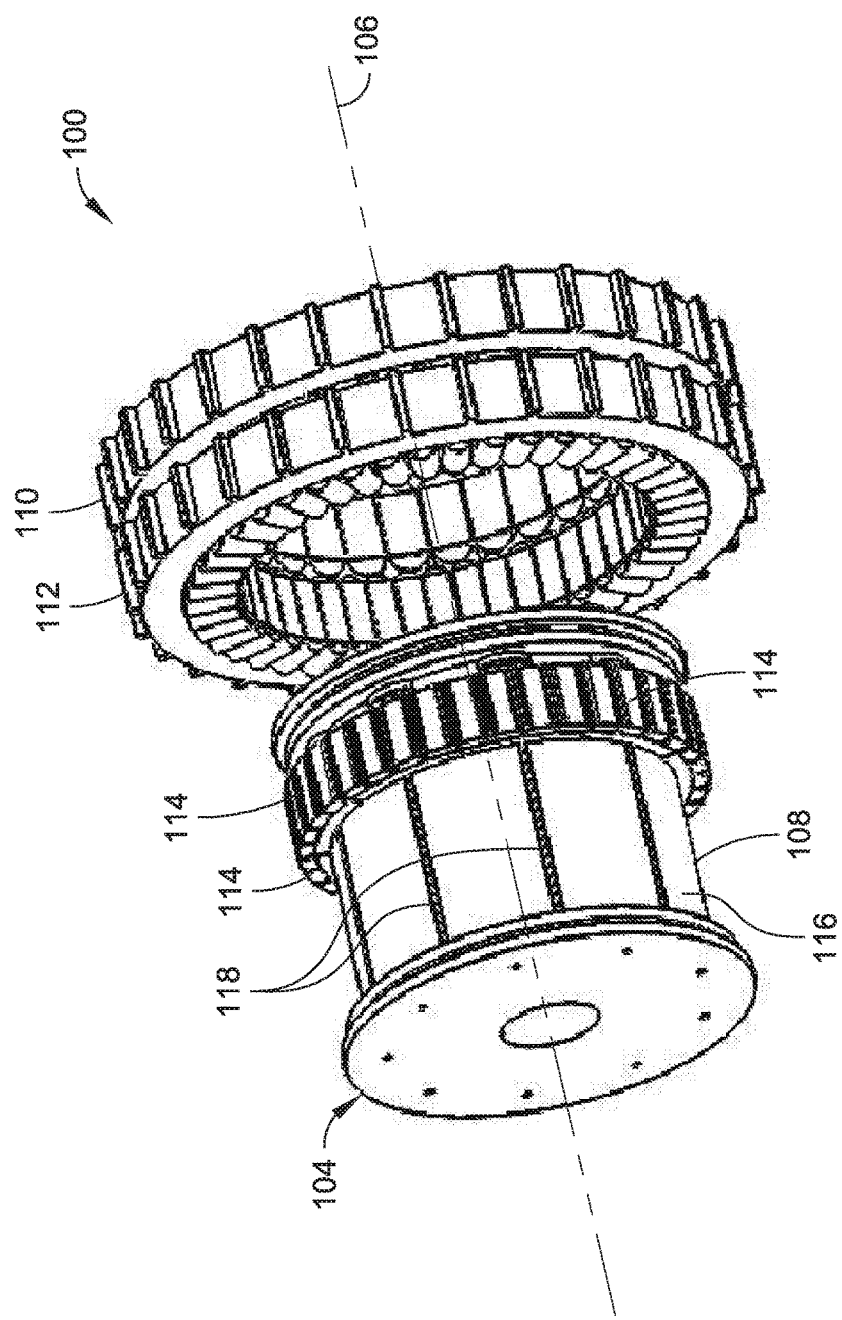
FIG. 4 is a partial exploded perspective view of an electric motor/generator/transmission, such as the electric motor/generator/transmission illustrated in FIG. 1, in accordance with an example embodiment of the present disclosure.
Figure 5:
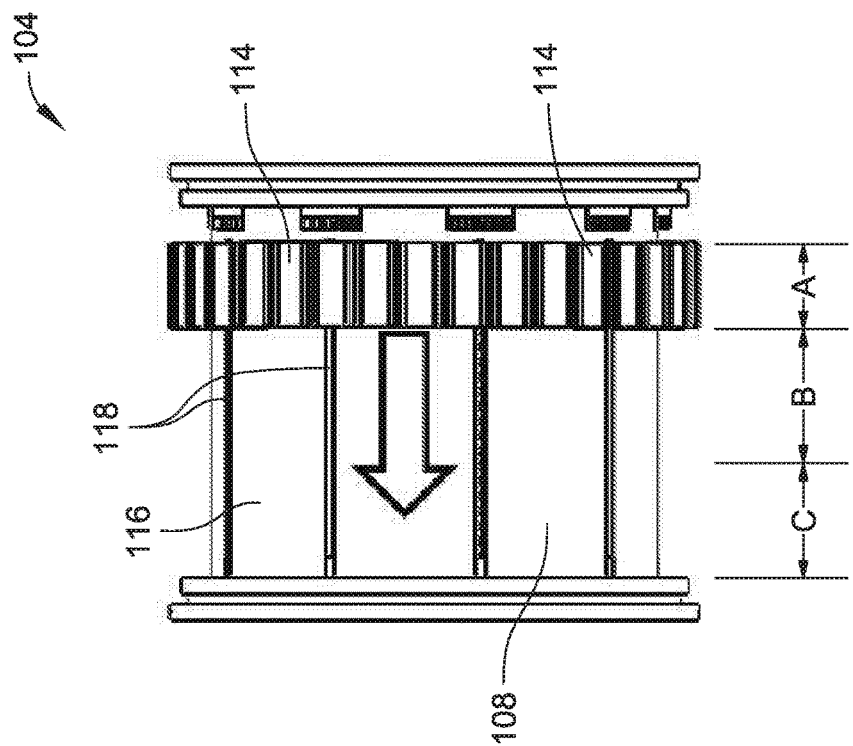
FIG. 5 is a side elevation view of a rotor for an electric motor/generator/transmission, such as the electric motor/generator/transmission illustrated in FIG. 1, where magnets shown in a neutral position can be moved in sets.
Figure 6:
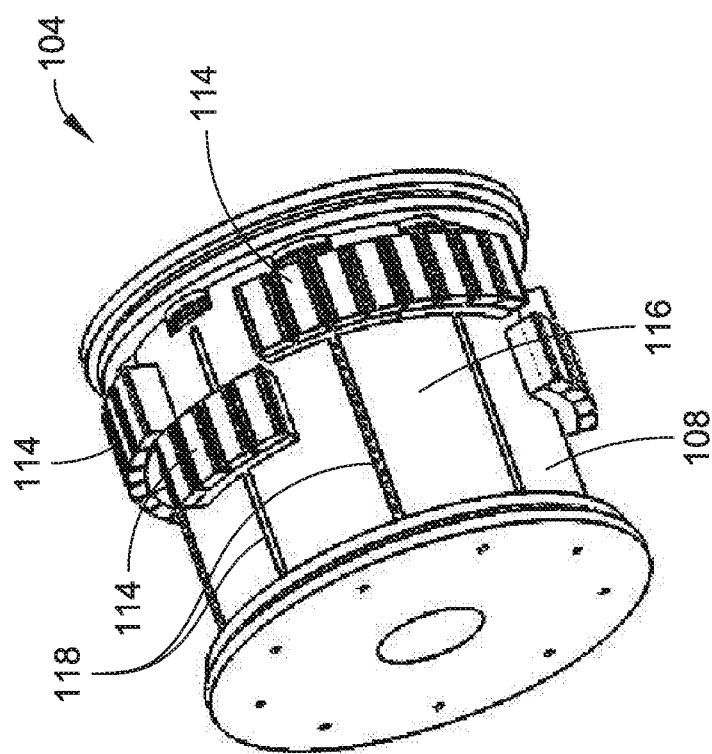
FIG. 6 is a perspective view of the rotor illustrated in FIG. 5, where three (3) sets of four (4) magnets each are moved from the neutral position to be engaged with a stator.

Example Implementations—Motor/Generator Including Rotor(s) with Selectively Moveable Interactive Field Elements Referring generally to FIGS. 1 through 12, electric motor/generator/transmissions are described in accordance with embodiments of this disclosure. FIG. 1 shows an electric motor/generator/transmission 100, which in some embodiments can be connected to one or more additional electric motor/generator/transmissions 100. As shown in FIG. 2, electric motor/generator/transmission 100 includes a rotor/stator housing 102 and a rotor 104 rotatably coupled with the rotor/stator housing 102. The rotor 104 has an axis of rotation 106 and a longitudinal support structure 108 that extends in a first direction (e.g., in the direction of the axis of rotation 106). The rotor/stator housing 102 also extends longitudinally in the first direction and includes two or more stators (e.g., a first stator 110, a second stator 112, and possibly a third stator, and so on), where each stator includes a set of interactive field elements (e.g., stator coils or windings). In embodiments of the disclosure, the interactive field elements are spaced apart from one another in the first direction. In some embodiments, the rotor/stator housing 102 can be implemented using a housing and/or casing, which may provide, for instance, three or more stator positions, such as stator positions A, B, and/or C described with reference to FIG. 3. In this example, the stator 110 and/or the stator 112 can be firmly secured to an inner wall of a casing in the stator positions A, B, and/or C.

The rotor 104 includes multiple interactive field elements (e.g., magnets 114, which can be, for example, permanent magnets, electromagnets, etc.) slidably coupled with the longitudinal support structure 108 to translate along the longitudinal support structure 108 parallel to the axis of rotation 106. In some embodiments, the rotor 104 may provide, for instance, three or more positions for the magnets 114. For example, a magnet 114 can be positioned at one of the stator positions A, B, and/or C. As described herein, one of the positions can be a neutral position, such as stator position A, which does not correspond to a stator. In this example, stator position B corresponds to stator 110, and stator position C corresponds to stator 112.

As used herein, the term "interactive field element" can include a field element of a rotor or a stator that is configured to electromagnetically interact with a complimentary field element. For example, interactive field elements can include magnets (e.g., permanent magnets or electromagnets) configured to interact with coils or vice versa. In some embodiments, a rotor can include magnets configured to interact with stator coils. In other embodiments, the stator can include magnets configured to interact with rotor coils. The foregoing embodiments are provided by way of example; however, it is noted that any combination of complimentary interactive field elements can be implemented in a rotor/stator set.

In embodiments of the disclosure, the stator 110 and the stator 112 may each have different cores and/or winding configurations so that operating characteristics of an electric motor/generator/transmission 100 can be changed when a magnet 114 translates between an orientation corresponding to stator position C, where the stator 112 is engaged with the magnet 114; an orientation corresponding to stator position B, where the stator 110 is engaged with the magnet 114; and an orientation corresponding to stator position A, where neither the stator 110 nor the stator 112 is engaged with the magnet 114. It should be noted that the order of stator positions A, B, and C is provided by way of example and is not meant to limit the present disclosure. In other embodiments, a neutral stator position can be positioned between two stators. A neutral stator position can also be at a different end of the electric motor/generator/transmission 100. Further, an electric motor/generator/transmission 100 can include more than one neutral position and so forth.

Referring now to FIGS. 4 through 8, an electric motor/generator/transmission 100 may include a central shaft (e.g., a large diameter rotor shaft 116) that defines rotor shaft magnet slideways 118. In some embodiments, the rotor shaft 116 may be hollow, defining one or more cavities, which can include additional equipment for an electric motor/generator/transmission 100. In some embodiments, one or more of the magnets 114 can include multiple permanent magnets supported in holders, which can be slidably attached to an outer surface of the rotor shaft 116, forming a peripheral ring around the circumference of the rotor shaft 116. The magnets 114 can be axially located on the shaft in the neutral stator position A, and can be moved (e.g., in sets of magnets) to stator position B and/or stator position C. For example, with reference to FIG. 6, three (3) sets of four (4) permanent magnets each are moved from the neutral stator position A to be engaged by the stator 110. In embodiments of the disclosure, the magnets 114 can be equally spaced on the periphery of the rotor shaft 116 and can be moved by an actuator to stator position B, where the outer peripheral surface of the magnets 114 is at a defined minimal distance (e.g., gap) from the inner peripheral surface of the stator 110 core surface, causing electricity to flow in the stator 110 as the rotor 104 rotates if acting as a generator, or causing the rotor 104 to rotate if electric current is supplied to the stator 110 from an external source.

Figure 7:
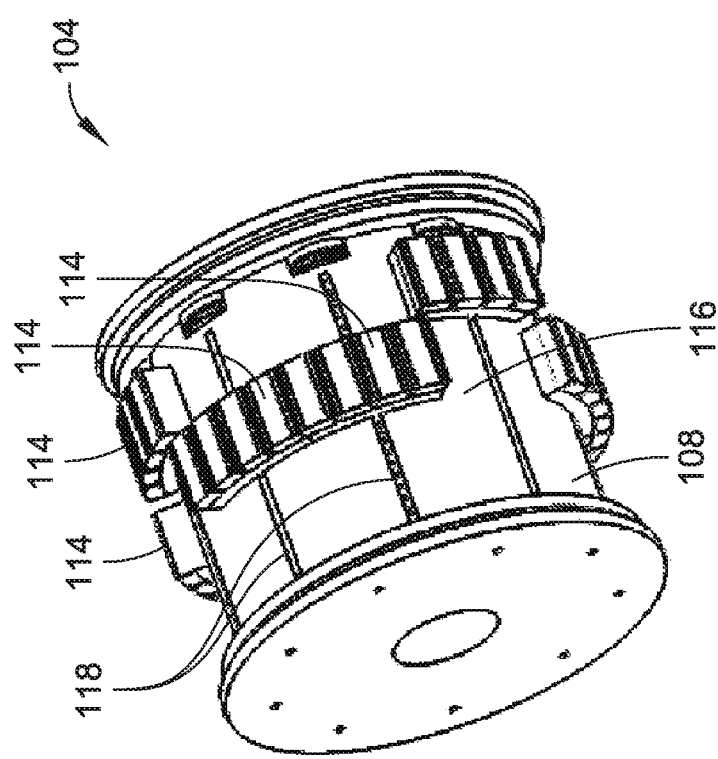
FIG. 7 is a perspective view of the rotor illustrated in FIG. 5, where three (3) additional sets of four (4) magnets each are moved from the neutral position to be engaged with a stator.

With reference to FIG. 7, three (3) additional sets of four (4) permanent magnets each can be moved from the neutral stator position A to be engaged by the stator 110. In this configuration, the power output of the electric motor/generator/transmission 100 can be at least approximately doubled when acting as a generator with respect to the configuration described with reference to FIG. 6. In another example, the torque of the electric motor/generator/transmission 100 can be at least approximately doubled when acting as a motor under constant voltage with respect to the configuration described with reference to FIG. 6. Further, when the remaining three (3) sets of four (4) permanent magnets each are moved from the neutral stator position A to be engaged by the stator 110, the power output of the electric motor/generator/transmission 100 can be at least approximately tripled when acting as a generator, and/or the torque of the electric motor/generator/transmission 100 can be at least approximately tripled when acting as a motor under constant voltage.

Figure 8:
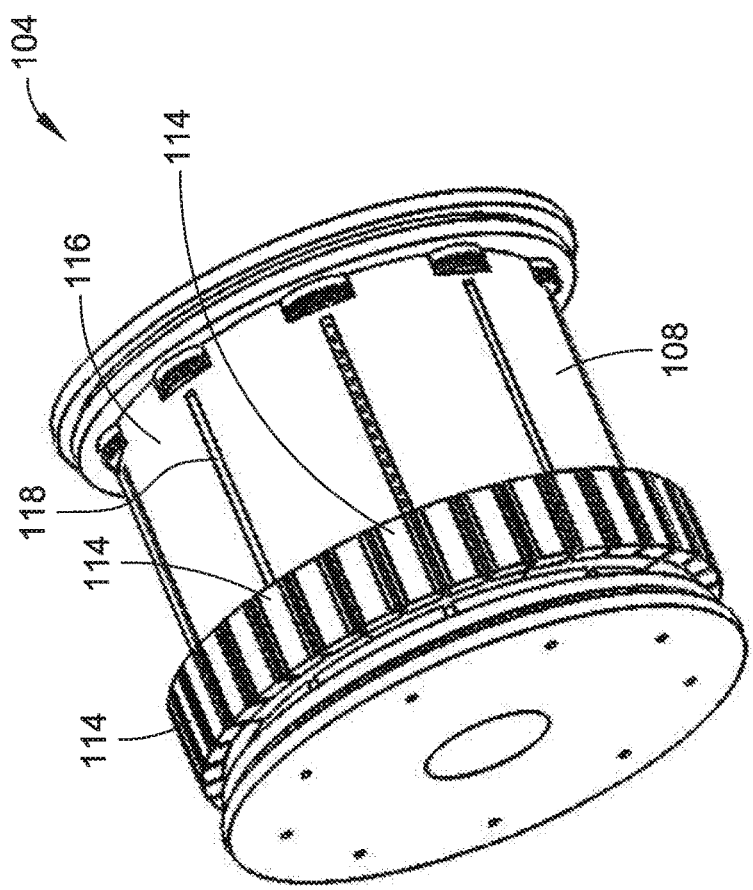
FIG. 8 is a perspective view of the rotor illustrated in FIG. 5, where all of the sets of magnets are moved from the neutral position to be engaged with a second stator.

However, these examples are not meant to limit the present disclosure. In other embodiments, one magnet can be implemented per holder, with an actuator moving each magnet independently. In a further example, all of the magnets can be included in a single ring holder, which can move the magnets from position to position as a unit (e.g., actuated by a single actuator and/or multiple actuators). For example, a magnet configuration can be selected to balance centrifugal, magnetic, and/or electrical forces acting on the system. With reference to FIG. 8, all sets of the permanent magnets (e.g., nine (9) total) on the periphery of the rotor shaft 116 can be moved from the neutral stator position A to stator position C to be engaged by the stator 112. Note they can be moved to the second stator as a group from neutral or individually but when moving from a first stator to a second stator the electrical connection to or from the first stator is disconnected prior to engaging the second stator except where the first and second stators are wired separately. In another embodiment, the system includes a second electric bus to and from the second stator. As described herein, the different stator windings 110 and 112 can provide different power, torque, amperage, and/or voltage capacities and efficiencies. In some embodiments, a controller can be used to send commands to the actuators of each set of magnets to move them in and out of stator positions to achieve enhanced efficiency under widely varying input and output conditions, such as wind powered generators, motors for city busses, and so forth.

Figure 9:
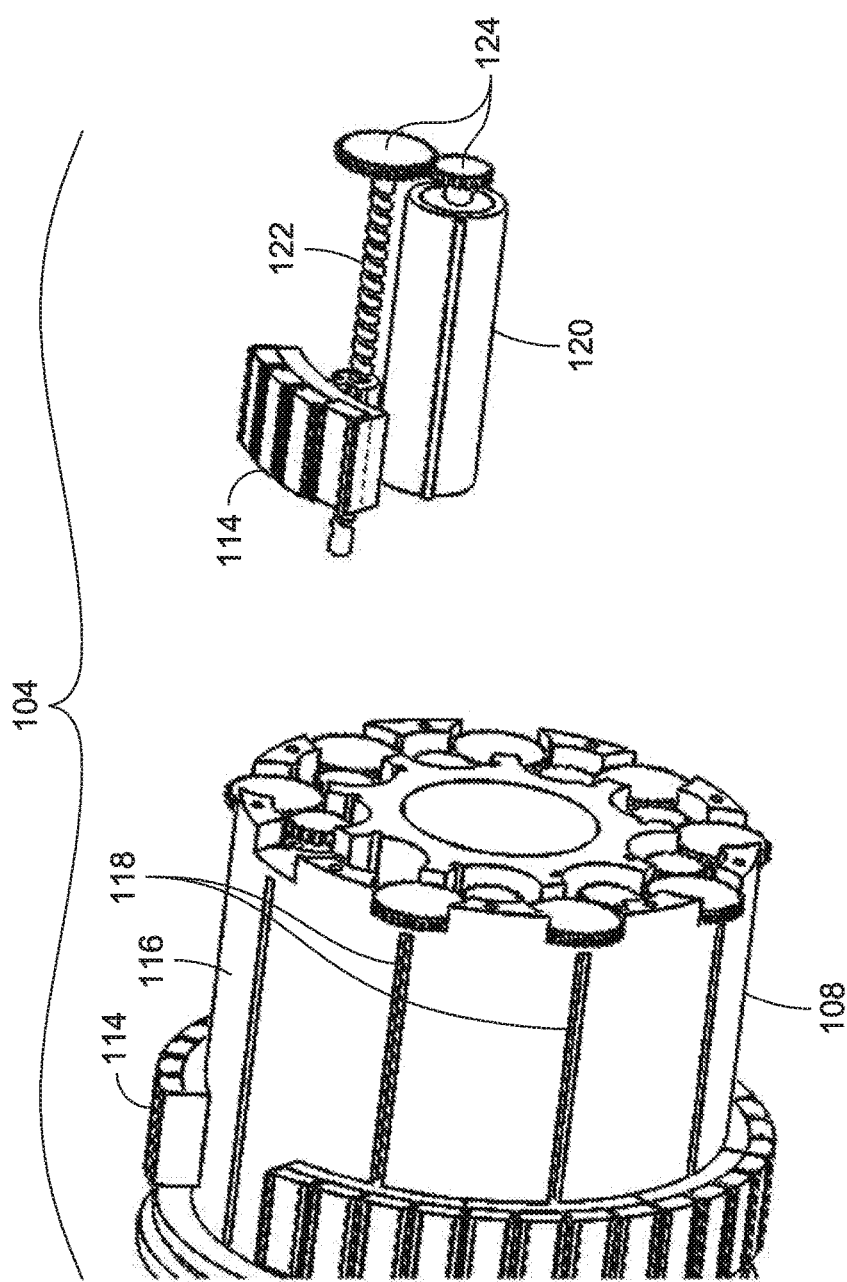
FIG. 9 is a partial exploded perspective view of a rotor for an electric motor/generator/transmission, such as the rotor illustrated in FIG. 5, in accordance with an example embodiment of the present disclosure, where an actuator for translating a set of magnets along a slideway is shown in detail.
Figure 10:
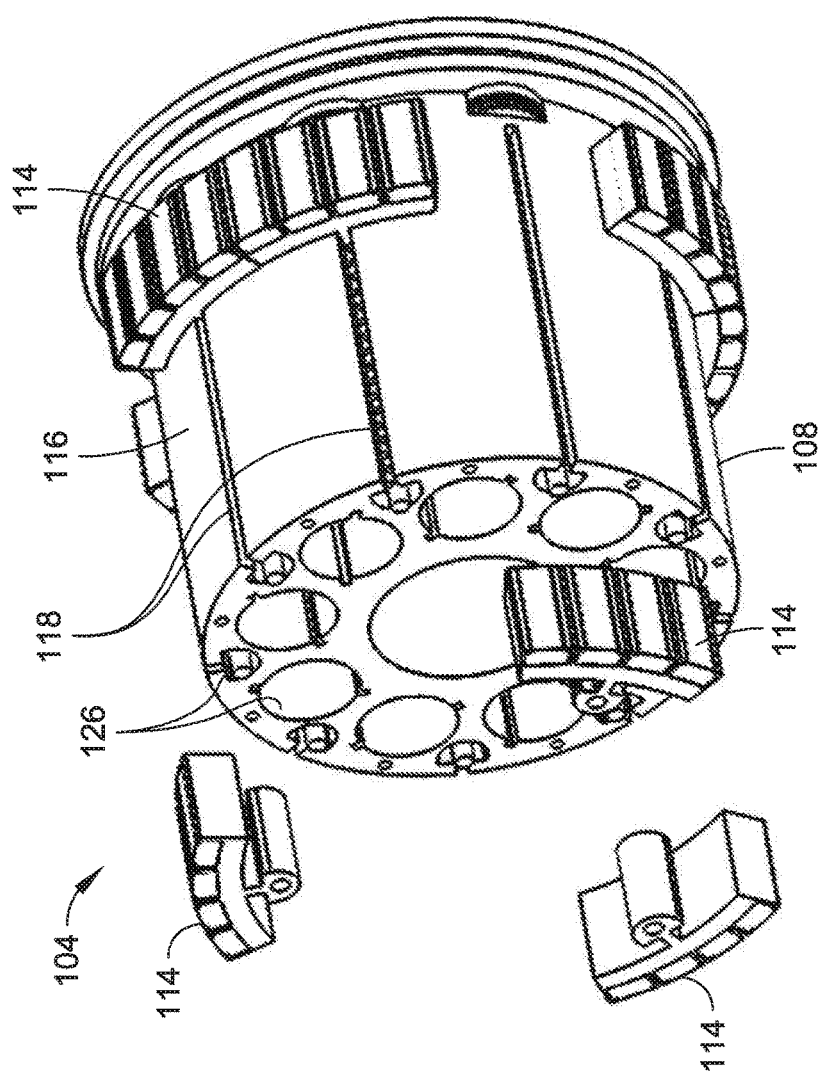
FIG. 10 is a partial exploded perspective view of a rotor for an electric motor/generator/transmission, such as the rotor illustrated in FIG. 5, in accordance with an example embodiment of the present disclosure, where sets of magnets configured to translate along a slideway are shown in detail.
Figure 11:
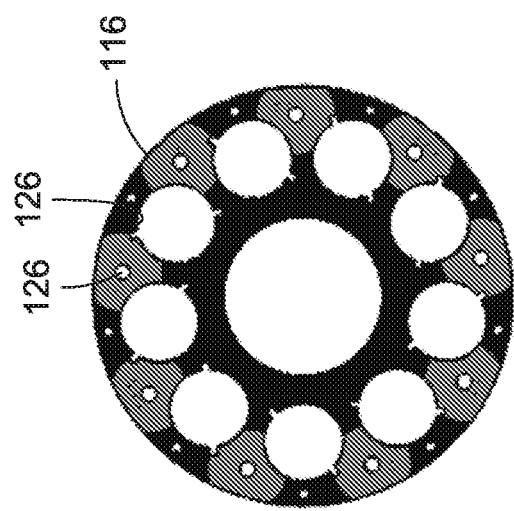
FIG. 11 is a top plan view of a rotor for an electric motor/generator/transmission, such as the rotor illustrated in FIG. 5, in accordance with an example embodiment of the present disclosure, where the rotor includes cavities for receiving a plurality of actuators and corresponding sets of magnets.

Referring now to FIGS. 9 through 11, an actuator 120 (e.g., a stepper motor, linear actuator, or the like) can be directly or indirectly coupled with a magnet or set of magnets 114. In some embodiments (e.g., as shown in FIG. 9), the actuator 120 can be configured to rotate one or more gears 124 to turn a threaded shaft 122, thereby causing the magnets 114 to move up or down the shaft 122 to a desired position. As shown in FIGS. 10 and 11, the rotor shaft 116 can include a plurality of cavities 126 for receiving a plurality of actuators 120 and associated components (e.g., threaded shaft 122 and one or more gears 124).

In embodiments of the disclosure, multiple electric motor/generator/transmissions 100 can be connected together (e.g., end-to-end as described with reference to FIG. 1). For example, the longitudinal support structure 108 of the rotor 104 can be configured as a modular shaft, and multiple modular shafts can be connected together to form, for instance, a common axle. In some embodiments, each electric motor/generator/transmission 100 can include one or more endplates 128 (e.g., such the endplates 128 illustrated in FIG. 12), which can include bearings (e.g., rotary bearings) for the rotor 104. In some embodiments, the endplates 128 of two or more electric motor/generator/transmissions 100 can be connected together to allow additional electric motor/generator/transmissions 100 to be added inline (e.g., under a common control system to form larger and more powerful units with variable torque and/or power capabilities).

In some embodiments, modular rotor endplates 128 fixedly connected to individual rotors 104 can be connected together when the endplates 128 are connected, e.g., by interfacing one or more features on a surface of one rotor endplate 128, such as machined indentations 130, with one or more matching features on a surface of another rotor endplate 128, such as protrusions 132 (e.g., as described with reference to FIG. 12). The protrusions 132 can be mated with the indentations 130 when the end of one electric motor/generator/transmission 100 is joined to the end of a second electric motor/generator/transmission 100, causing the torque and rotation of the rotor 104 of one rotor/stator set to be transferred to the rotor 104 of the second rotor/stator set through the rotor endplates 128, and causing large diameter rotor shafts of both electric motor/generator/transmissions 100 to act as a common axle. In some embodiments, a rotor endplate 128 can also include bearings (e.g., rotary bearings) for the rotor 104. In some embodiments, a rotor endplate 128 in union with another endplate 128 can include rotor bearings.

Figure 12:
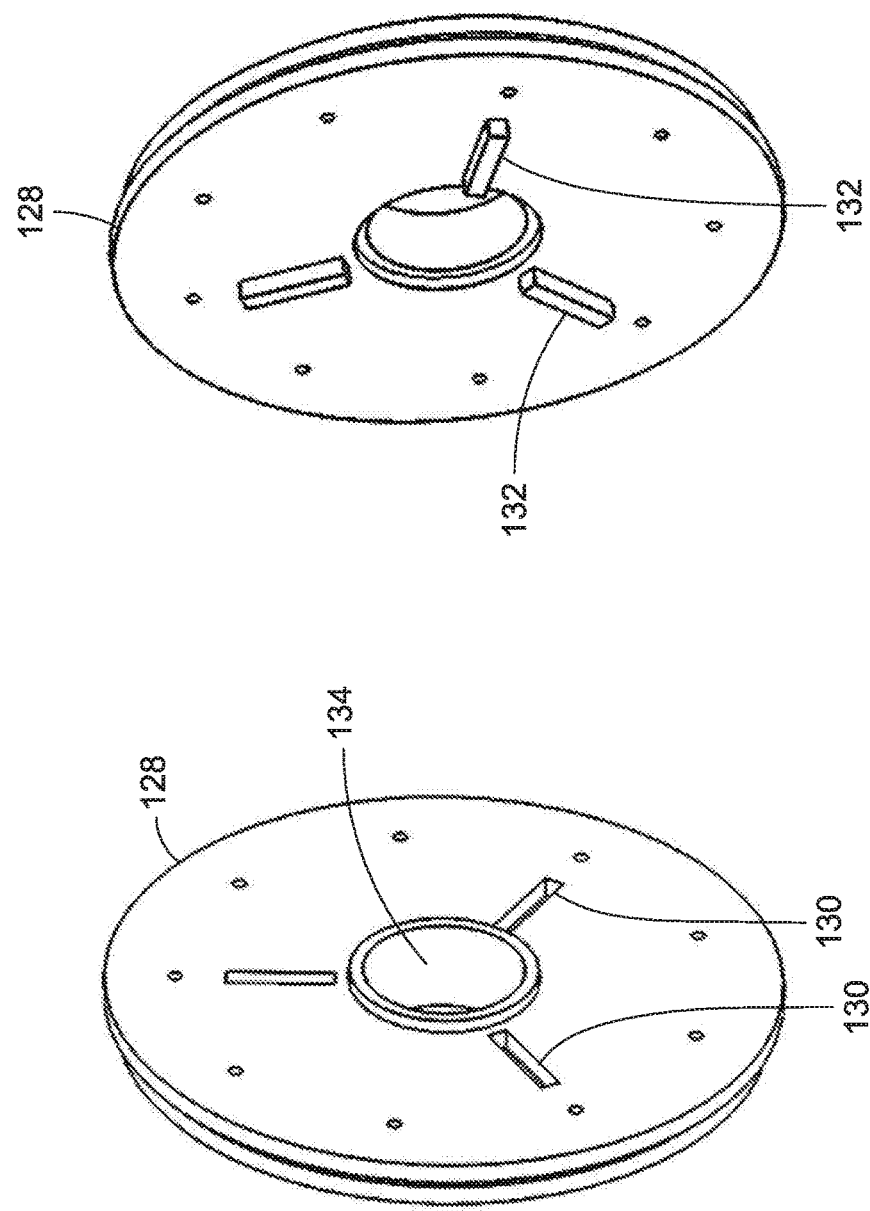
FIG. 12 is a perspective view of two rotor end caps of modular rotors for an electric motor/generator/transmission, such as the electric motor/generator/transmission illustrated in FIG. 1, in accordance with an example embodiment of the present disclosure, where the rotor end caps includes opposing surface features for linking the rotor end caps of two or more adjacent rotors together.

However, the configuration described with reference to FIG. 12 is provided by way of example only and is not meant to limit the present disclosure. In other embodiments, one electric motor/generator/transmission 100 set can be connected to another electric motor/generator/transmission 100 using a different technique. For example, in some embodiments, a central opening 134 in a rotor endplate 128 can be shaped (e.g., machined to create a spline and/or a keyed coupling) so that multiple rotor endplates 128 of respective electric motor/generator/transmissions 100 can be connected to, for instance, a common axle extending through the centers of the electric motor/generator/transmissions 100. In this configuration, the rotor endplates 128 may structurally accommodate the maximum torque generated by a single electric motor/generator/transmission 100, e.g., as opposed to the combined torque of multiple units transferred by mated rotor endplates 128 (as described with reference to FIG. 12). Further, in some embodiments, an electric motor/generator/transmissions 100 may not necessarily include rotor endplates 128, e.g., where an interior of the longitudinal support structure 108 of the rotor 104 is shaped (e.g., machined to create a spline and/or a keyed coupling) so that multiple longitudinal support structures 108 of respective electric motor/generator/transmissions 100 can be connected to, for instance, a common axle. In some embodiments, the matching key ways shown on the rotor endplates 128 may not be needed, for example, where the shaft 108 is splined or otherwise connected to a through axel. Note that the hollow shaft with the large center hole can also serve the purpose of retrofitting an existing vehicle since the means of connecting it to the drive system is to run the drive shaft through the hollow shaft and connect it with friction bearings or otherwise.

Example Implementations—Motor/Generator Including Selectively Moveable Rotor(s)

Figure 13:
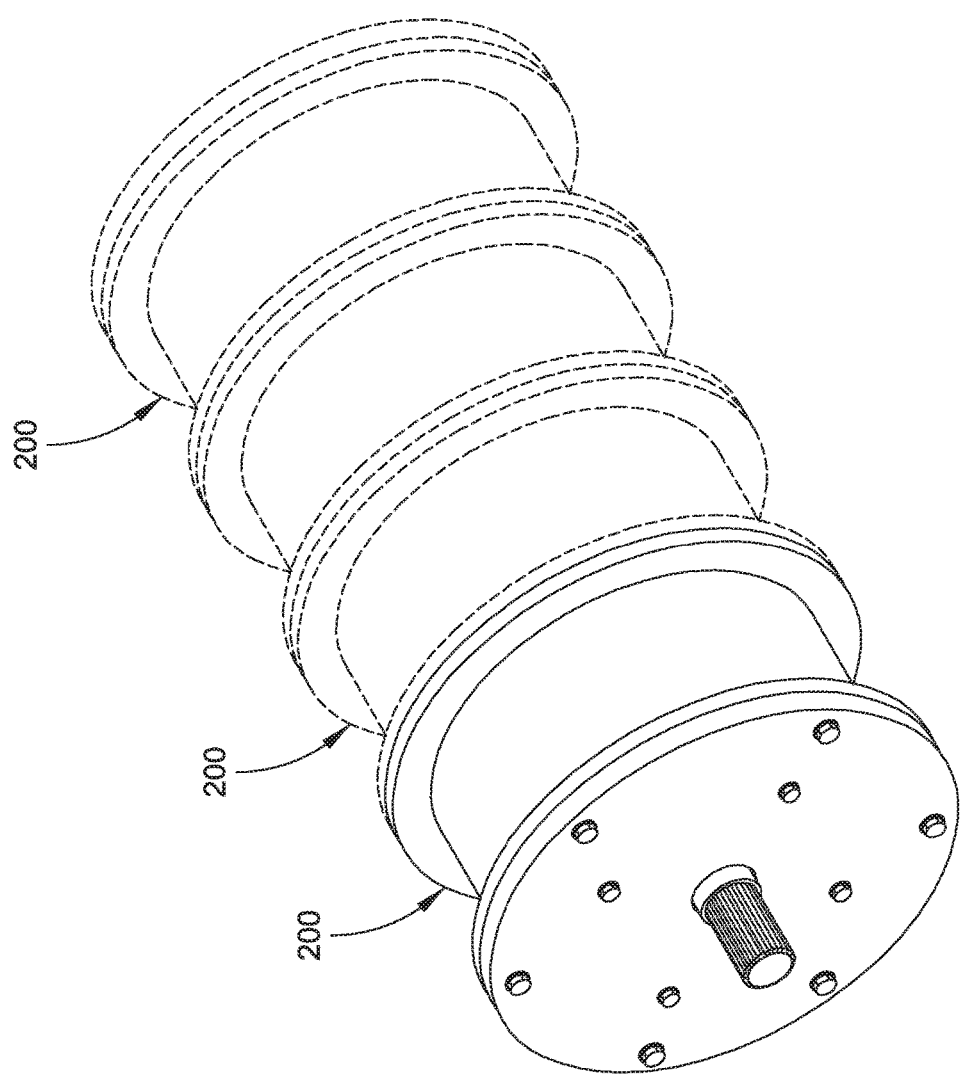
FIG. 13 is a perspective view illustrating an electric motor/generator/transmission, which may be connected to one or more additional electric motor/generator/transmissions in accordance with example embodiments of the present disclosure.
Figure 14:
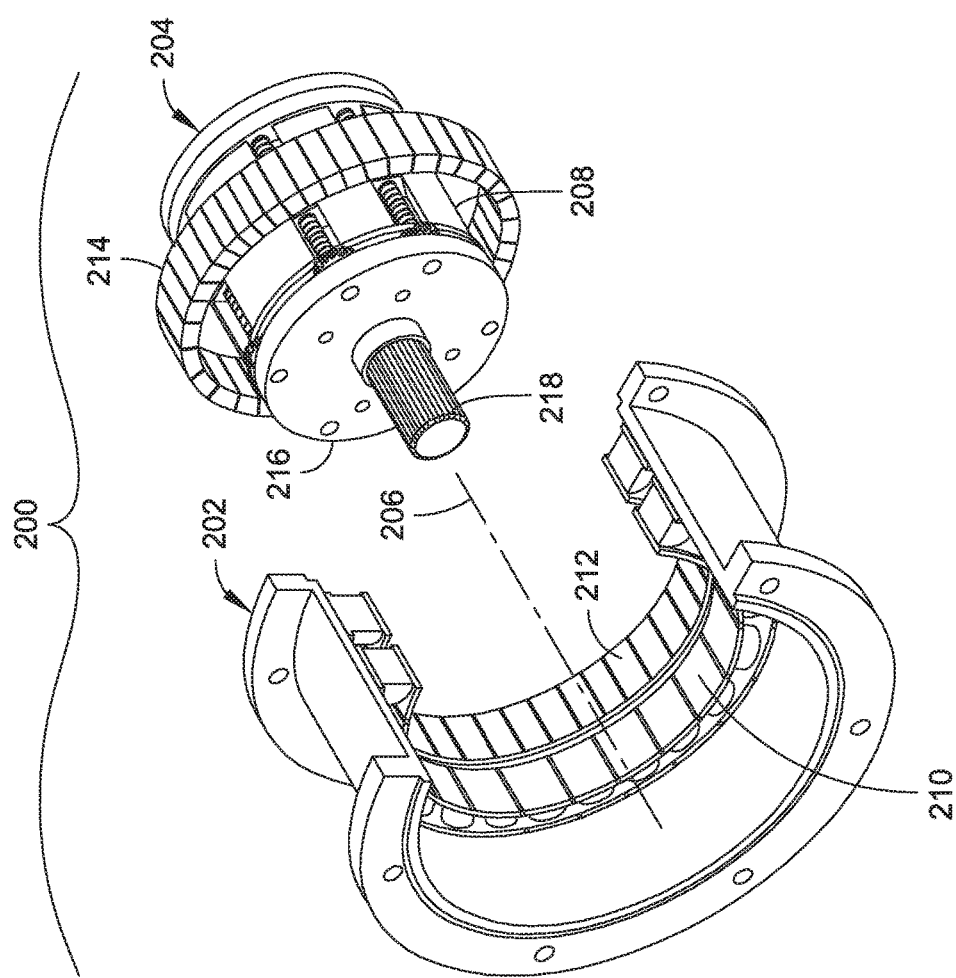
FIG. 14 is an exploded perspective view of an electric motor/generator/transmission, such as the electric motor/generator/transmission illustrated in FIG. 13, in accordance with an example embodiment of the present disclosure.
Figure 15:
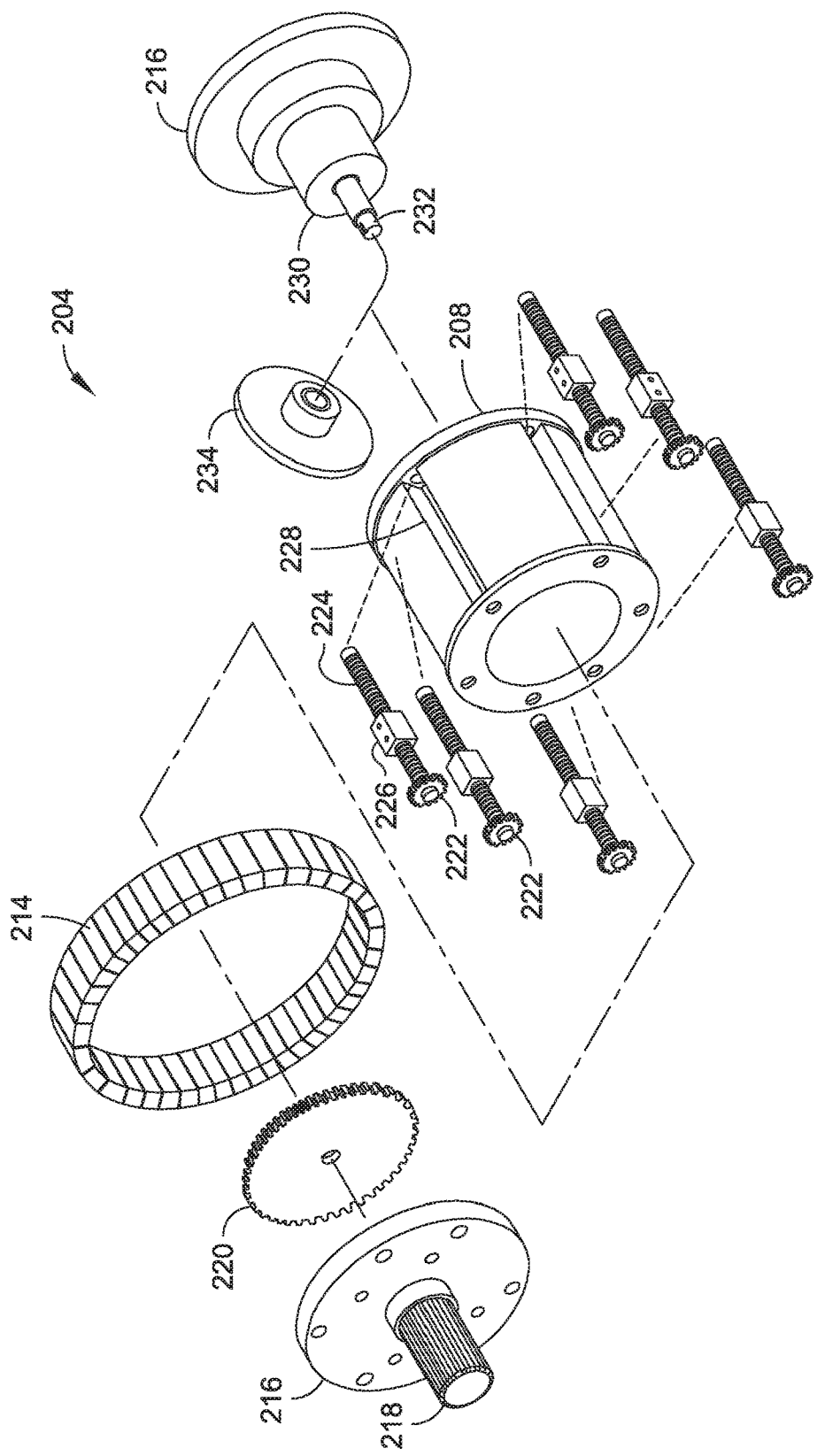
FIG. 15 is an exploded perspective view of a rotor for an electric motor/generator/transmission, such as the electric motor/generator/transmission illustrated in FIG. 13, in accordance with an example embodiment of the present disclosure.
Figure 16:
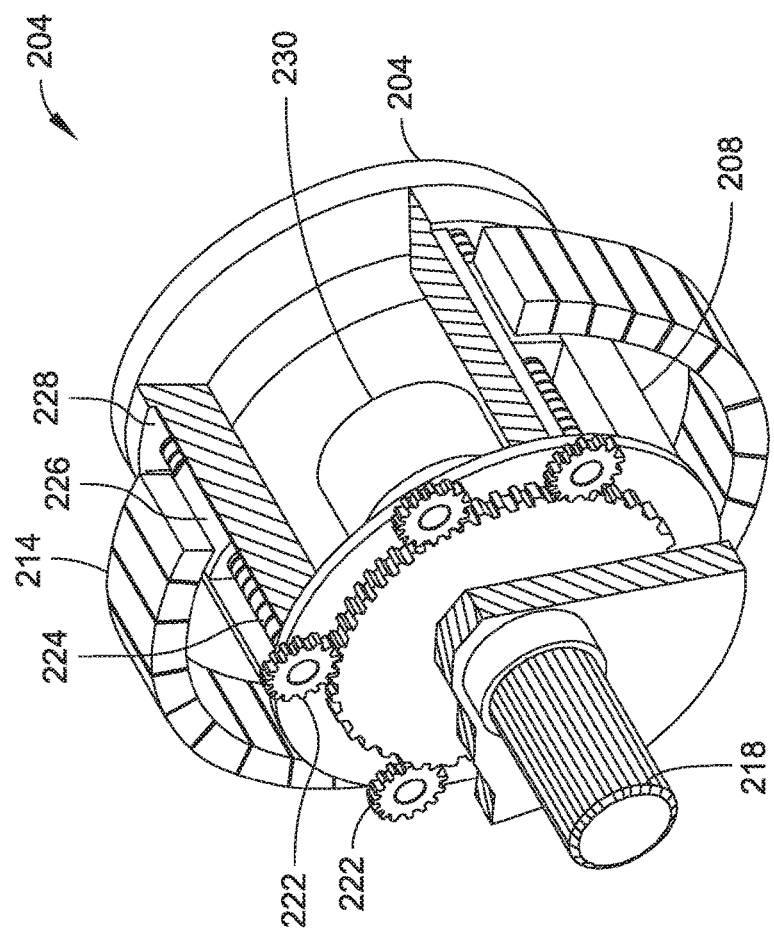
FIG. 16 is a perspective view of a rotor for an electric motor/generator/transmission, such as the electric motor/generator/transmission illustrated in FIG. 13, in accordance with an example embodiment of the present disclosure.
Figure 17:
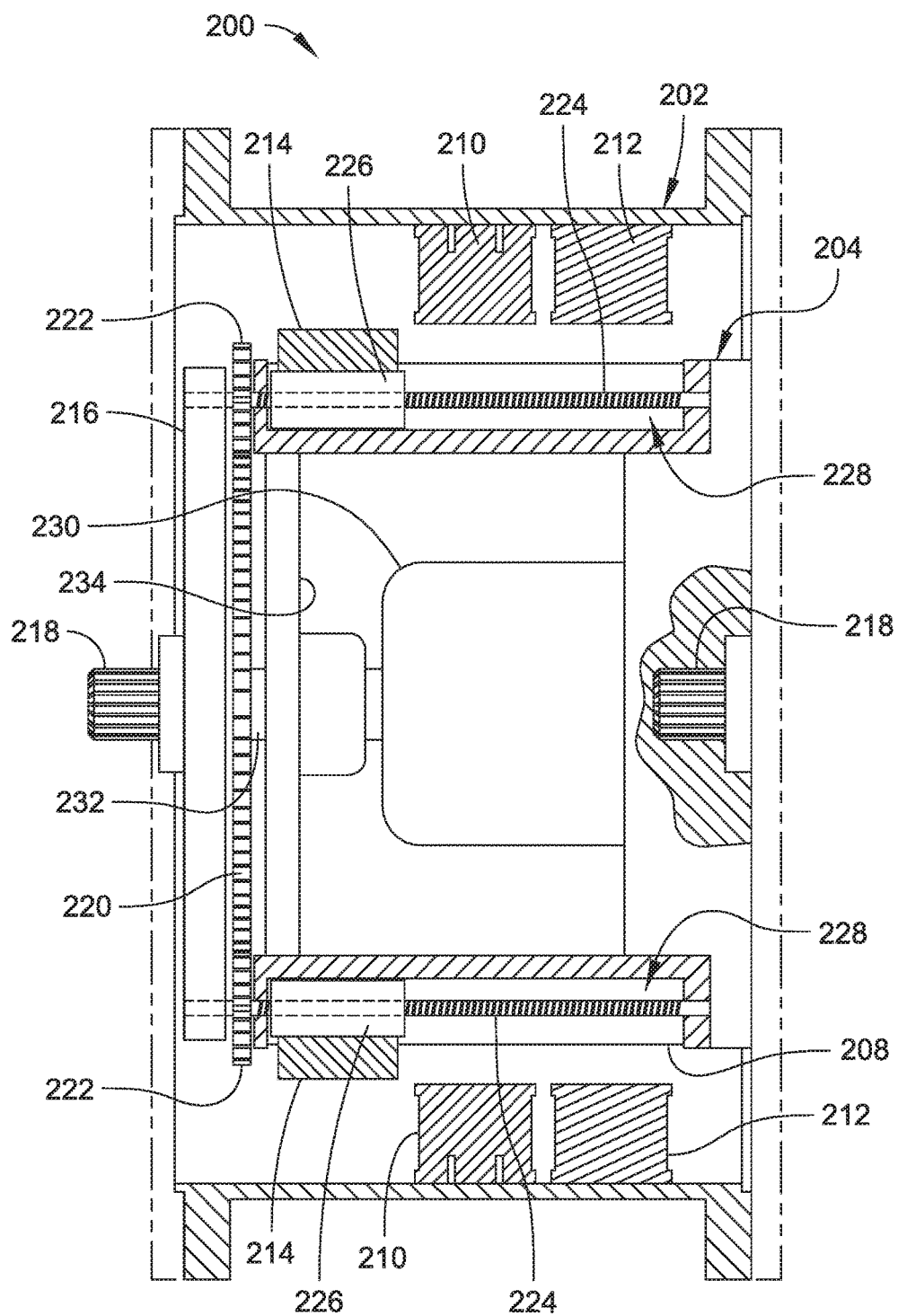
FIG. 17 is a cross-sectional side elevation view of an electric motor/generator/transmission, such as the electric motor/generator/transmission illustrated in FIG. 13, in accordance with an example embodiment of the present disclosure, where a rotor includes a set of magnets, shown in a neutral position.
Figure 18:
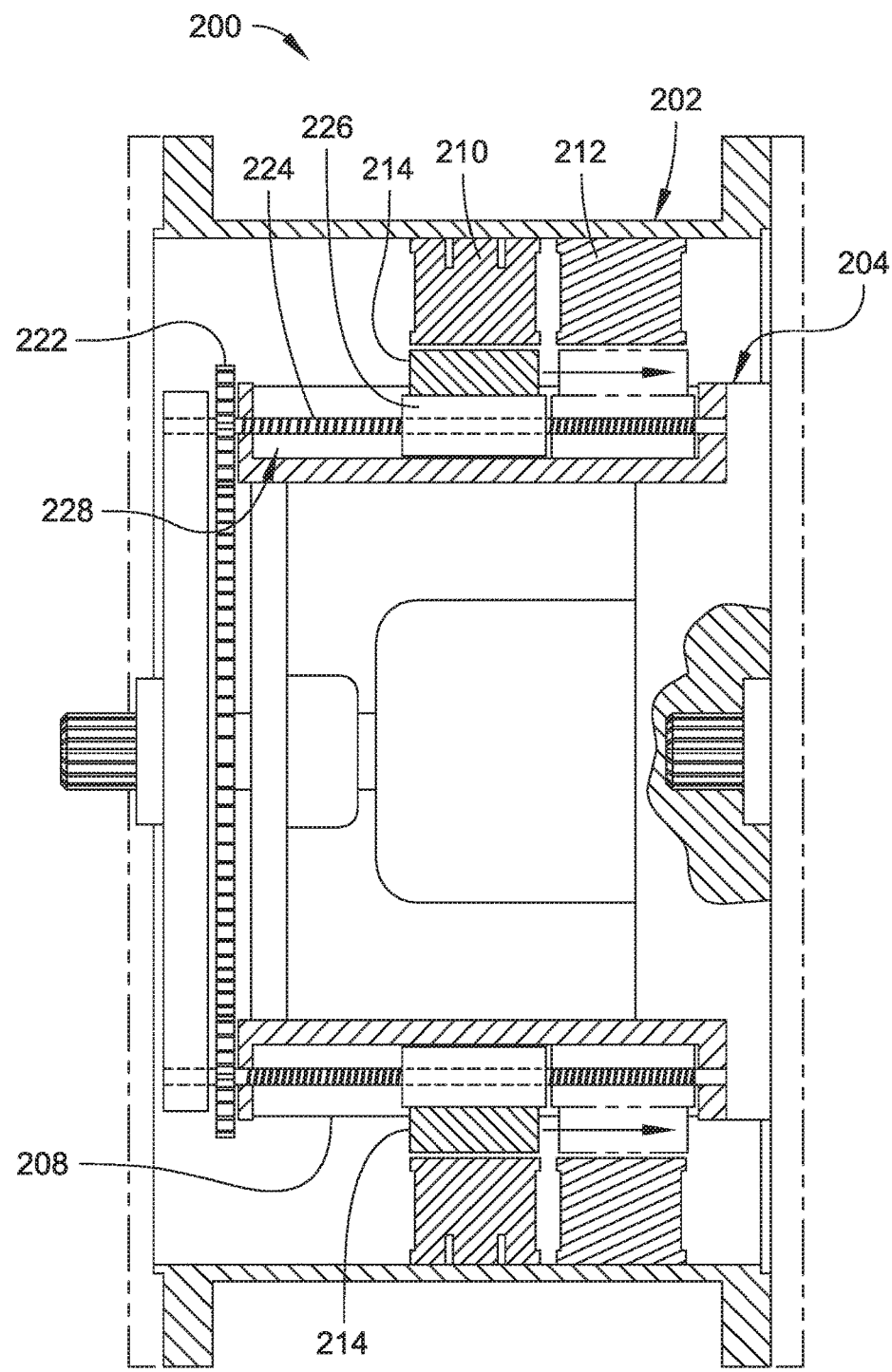
FIG. 18 is cross-sectional side elevation view of the electric motor/generator/transmission illustrated in FIG. 17, where the set of magnets is moved from the neutral position to be engaged with a first stator.

Referring generally to FIGS. 13 through 18, electric motor/generator/transmissions are described in accordance with additional embodiments of this disclosure. FIG. 13 shows an electric motor/generator/transmission 200, which in some embodiments can be connected to one or more additional electric motor/generator/transmissions 200. As shown in FIG. 14, electric motor/generator/transmission 200 includes a stator 202 and a rotor 204 rotatably coupled with the stator 202. The rotor 204 has an axis of rotation 206 and a longitudinal support structure 208 that extends in a first direction (e.g., in the direction of the axis of rotation 206). The stator 202 also extends longitudinally in the first direction and includes one or more interactive field elements (e.g., a first interactive field element 210, a second interactive field element 212, and possibly a third interactive field element, a fourth interactive field element, and so on). In embodiments of the disclosure, the interactive field elements are spaced apart from one another in the first direction. The rotor 204 includes one or more interactive field elements (e.g., an interactive field element 214) slidably coupled with the longitudinal support structure 208 to translate along the longitudinal support structure 208 parallel to the axis of rotation 206.

In embodiments of the disclosure, the stator winding 210 and the stator winding 212 may each have different cores and/or winding configurations so that operating characteristics of an electric motor/generator/transmission 200 can be changed when the interactive field element 214 translates between an orientation corresponding to a first stator position, where the stator winding 212 is engaged with the interactive field element 214; an orientation corresponding to a second stator position, where the stator winding 210 is engaged with the interactive field element 214; and an orientation corresponding to a third position, where neither the stator winding 210 nor the stator winding 212 is engaged with the interactive field element 214. It should be noted that the order of stator positions is provided by way of example and is not meant to limit the present disclosure. In other embodiments, a neutral stator position can be positioned between two stators. A neutral stator position can also be at a different end of the electric motor/generator/transmission 200 or between stators. Further, an electric motor/generator/transmission 200 can include more than one neutral position and so forth.

Referring now to FIGS. 15 through 18, the electric motor/generator/transmission 200 may include a central shaft (e.g., a large diameter rotor shaft 208) that defines rotor shaft magnet slideways 228. In some embodiments, the rotor shaft 208 may be hollow, defining one or more cavities, which can include additional equipment for an electric motor/generator/transmission 200. In some embodiments, the interactive field element 214 can include multiple permanent magnets supported by a holder, which can be slidably attached to an outer surface of the rotor shaft 208, forming a peripheral ring around the circumference of the rotor shaft 208. The magnets 214 can be axially located on the shaft in the neutral stator position, and can be moved (e.g., in sets of magnets) to the first stator position B and/or second stator position. For example, with reference to FIGS. 17 and 18, the interactive field element 214 can be moved from the neutral stator position to be engaged by the stator winding 210. In embodiments of the disclosure, the magnets 214 can be equally spaced on the periphery of the rotor shaft 208 and can be moved by an actuator, where the outer peripheral surface of the magnets 214 is at a defined minimal distance (e.g., gap) from the inner peripheral surface of the stator winding 210 core surface, causing electricity to flow in the stator winding 210 as the rotor 204 rotates if acting as a generator, or causing the rotor 204 to rotate if electric current is supplied to the stator winding 210 from an external source.

As described herein, the different stator windings 210 and 212 can provide different power, torque, amperage, and/or voltage capacities and efficiencies. In some embodiments, a controller can be used to send commands to the actuator the magnets to move them in and out of stator positions to achieve enhanced efficiency under widely varying input and output conditions, such as wind powered generators, motors for city busses, and so forth. In embodiments, an actuator 230 (e.g., a stepper motor, linear actuator, or the like) can be directly or indirectly coupled with the interactive field element 214. For example, the actuator 230 can include a driving end 232 and a mounting plate 234 configured to engage a primary driving gear 220. In some embodiments, the actuator 230 can be configured to rotate one or more gears (e.g., gear 220 which drives gears 222) to turn threaded shaft 224 having holders 226 mounted to the interactive field element 214, thereby causing the interactive field element 214 to move up or down the shaft 228 to a desired position. In embodiments, the rotor shaft 208 can include a central cavity for receiving the actuator 230 and can include additional cavities for receiving associated components (e.g., threaded shafts 224 coupled with gears 222).

In embodiments of the disclosure, multiple electric motor/generator/transmissions 200 can be connected together (e.g., end-to-end as described with reference to FIG. 13). For example, the longitudinal support structure 208 of the rotor 204 can be configured as a modular shaft, and multiple modular shafts can be connected together to form, for instance, a common axle. In some embodiments, each electric motor/generator/transmission 200 can include one or more endplates 216, which can include bearings (e.g., rotary bearings) for the rotor 204. In some embodiments, the endplates 216 of two or more electric motor/generator/transmissions 200 can be connected together to allow additional electric motor/generator/transmissions 200 to be added inline (e.g., under a common control system to form larger and more powerful units with variable torque and/or power capabilities).

In some embodiments, a central opening in a rotor endplate 216 can be shaped (e.g., machined to create a spline and/or a keyed coupling) so that multiple rotor endplates 216 of respective electric motor/generator/transmissions 200 can be connected to, for instance, a common axle extending through the centers of the electric motor/generator/transmissions 200. For example, the longitudinal support structure 208 (e.g., rotor shaft) of a first electric motor/generator/transmissions 200 can include a driving member 218 configured to extend into a receiving cavity of a rotor endplate 216 of an adjacently positioned second electric motor/generator/transmissions 200. In other embodiments, an electric motor/generator/transmission 200 may not necessarily include rotor endplates 216, e.g., where an interior of the longitudinal support structure 208 of the rotor 204 is shaped (e.g., machined to create a spline and/or a keyed coupling) so that multiple longitudinal support structures 208 of respective electric motor/generator/transmissions 200 can be connected to, for instance, a common axle.

Example Implementations—Motor/Generator Including Selectively Moveable Stator(s)

Figure 19:
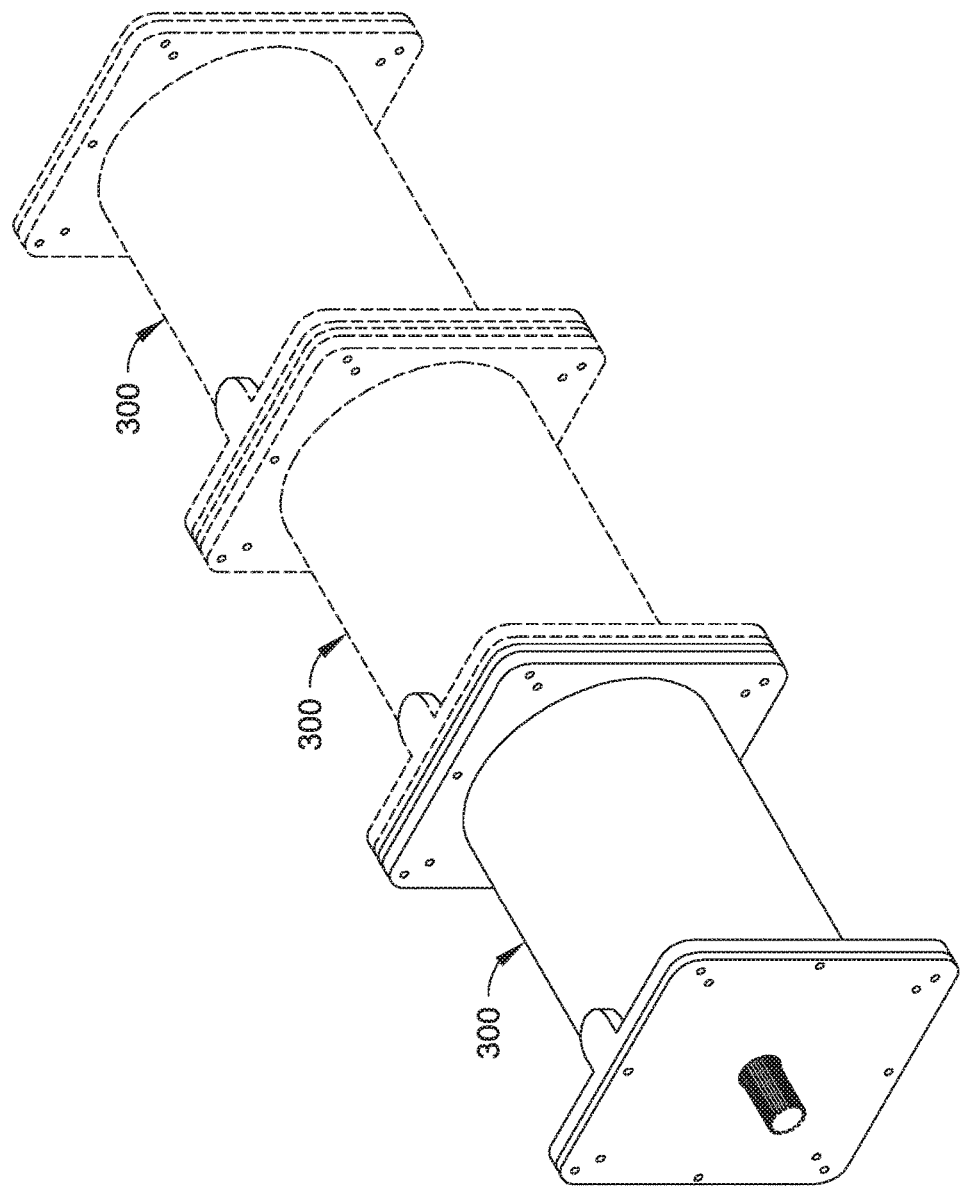
FIG. 19 is a perspective view illustrating an electric motor/generator/transmission, which may be connected to one or more additional electric motor/generator/transmissions in accordance with example embodiments of the present disclosure.
Figure 20:
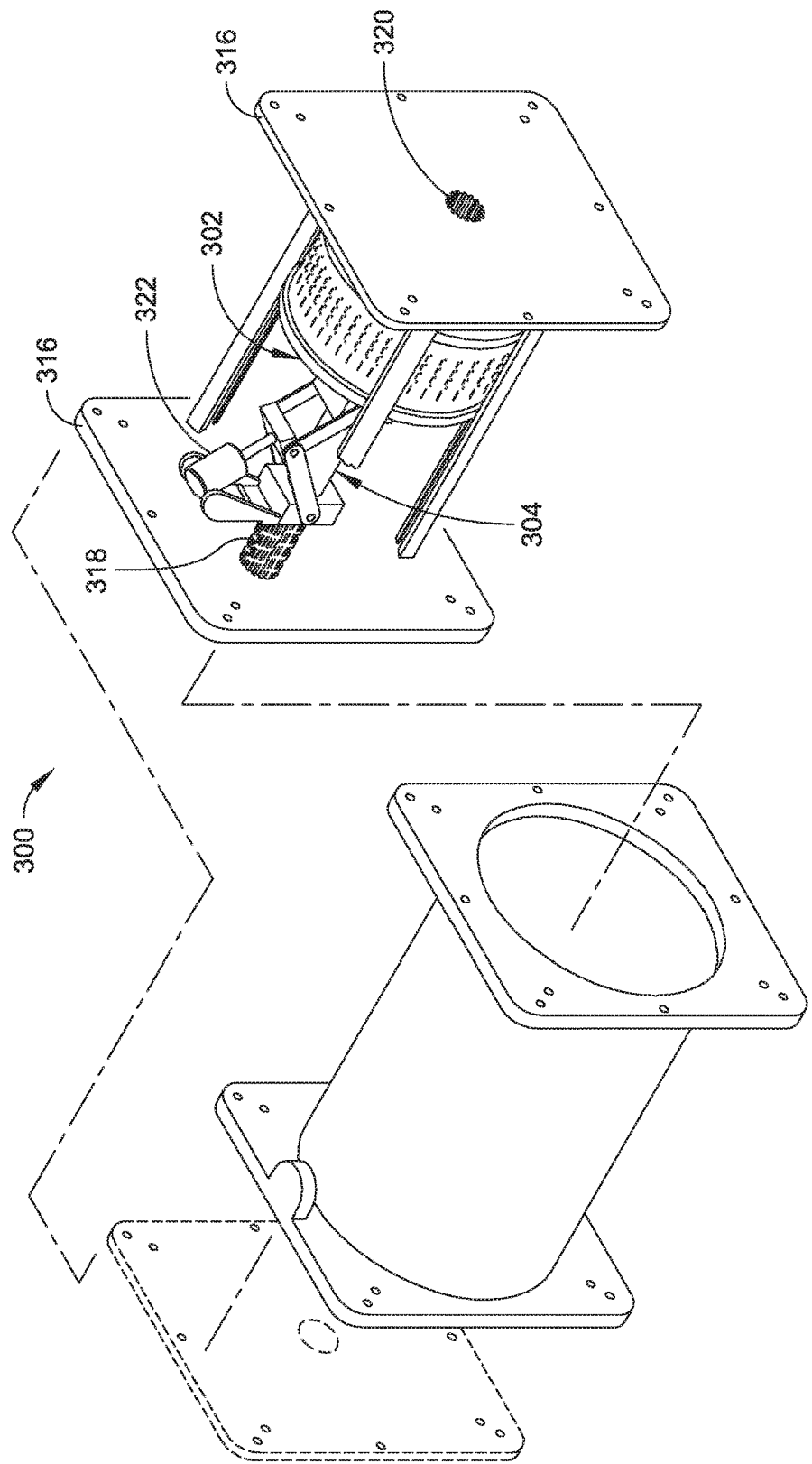
FIG. 20 is an exploded perspective view of an electric motor/generator/transmission, such as the electric motor/generator/transmission illustrated in FIG. 19, in accordance with an example embodiment of the present disclosure.
Figure 21:
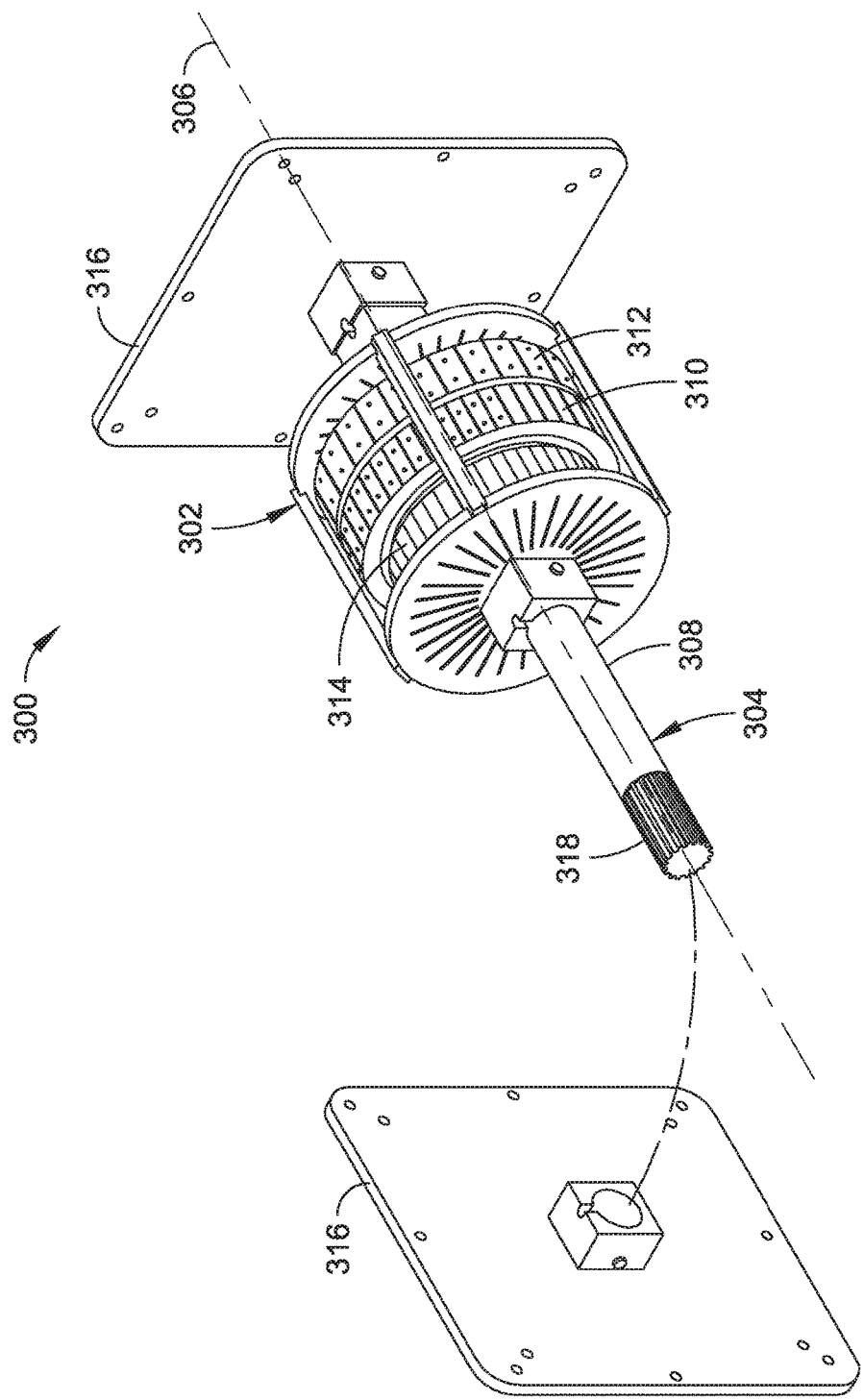
FIG. 21 is a partial exploded perspective view of an electric motor/generator/transmission, such as the electric motor/generator/transmission illustrated in FIG. 19, in accordance with an example embodiment of the present disclosure.
Figure 22:
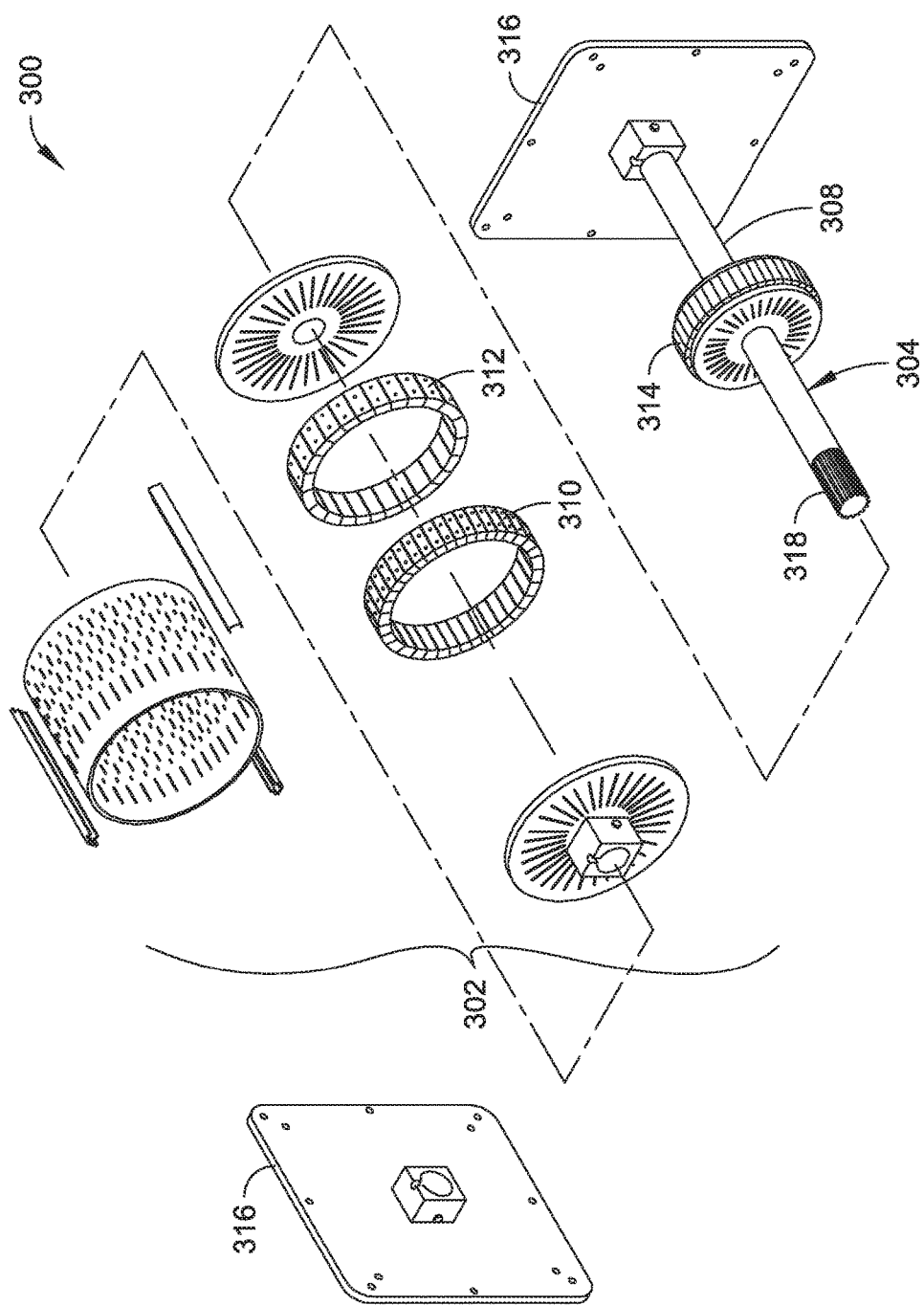
FIG. 22 is a partial exploded perspective view of an electric motor/generator/transmission, such as the electric motor/generator/transmission illustrated in FIG. 19, in accordance with an example embodiment of the present disclosure.
Figure 23:
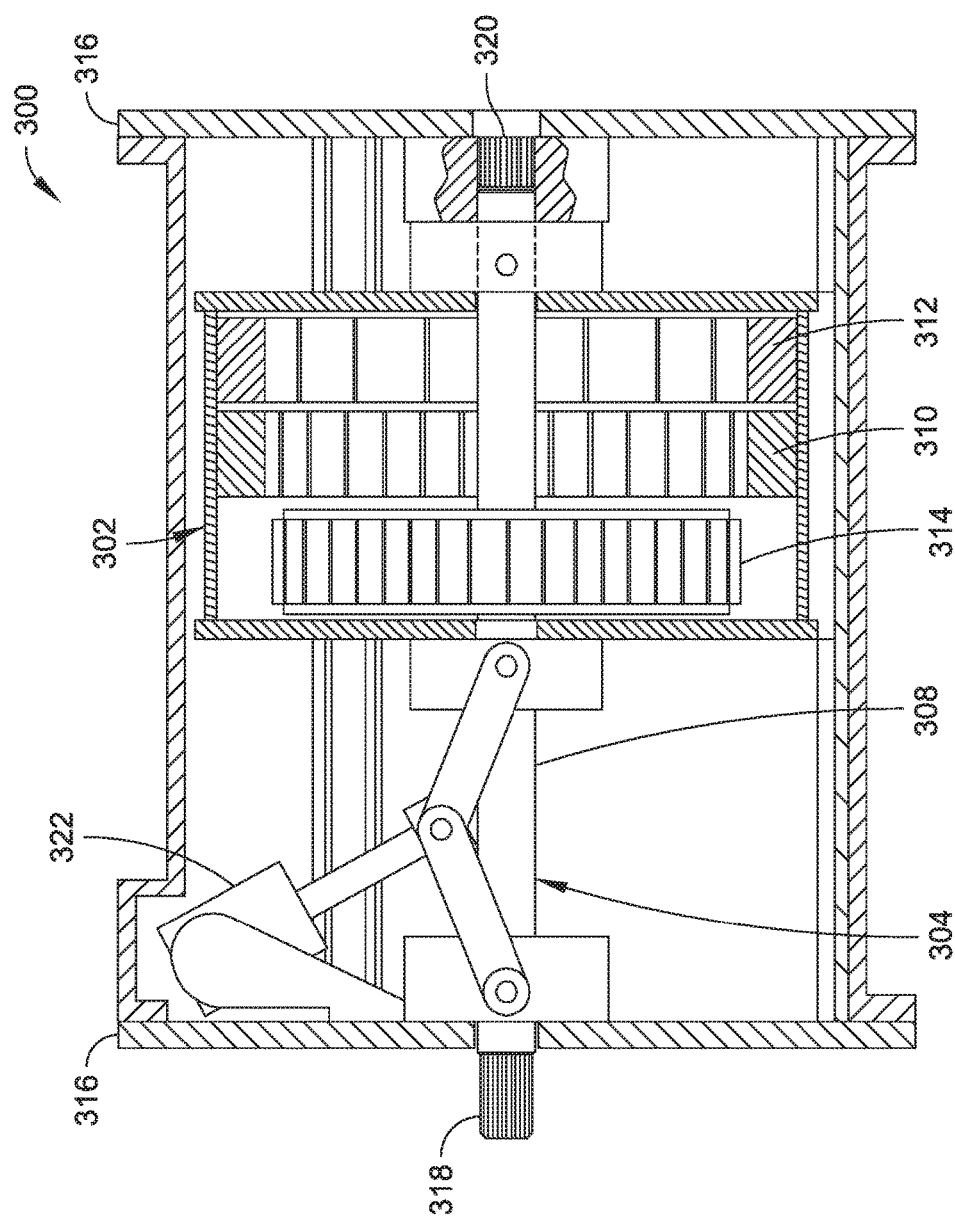
FIG. 23 is a cross-sectional side elevation view of an electric motor/generator/transmission, such as the electric motor/generator/transmission illustrated in FIG. 19, in accordance with an example embodiment of the present disclosure, where a rotor includes a set of magnets, shown in a neutral position.
Figure 24:
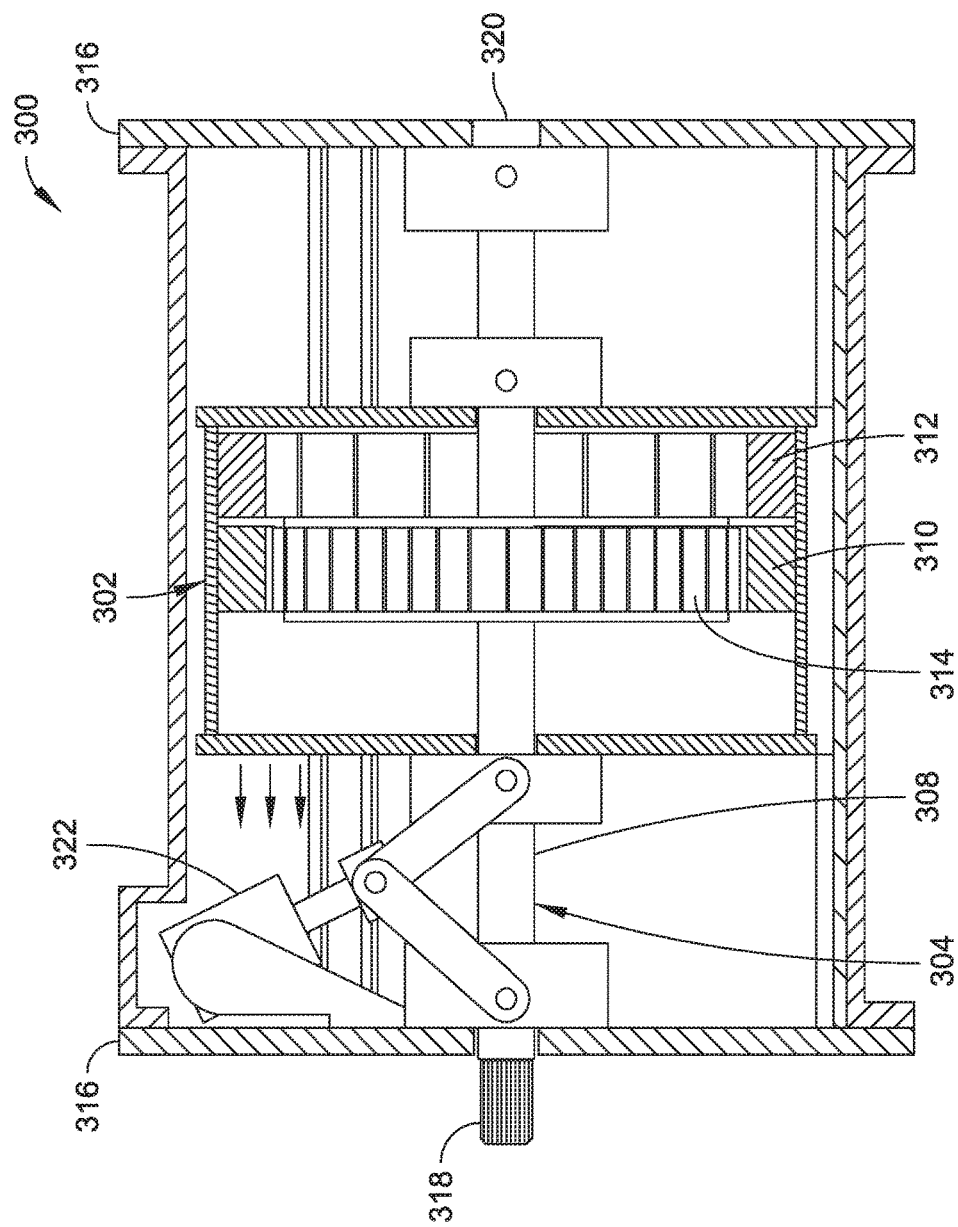
FIG. 24 is cross-sectional side elevation view of the electric motor/generator/transmission illustrated in FIG. 23, where the set of magnets is moved from the neutral position to engage the first stator with the rotor.

Referring generally to FIGS. 19 through 24, electric motor/generator/transmissions are described in accordance with additional embodiments of this disclosure. FIG. 19 shows an electric motor/generator/transmission 300, which in some embodiments can be connected to one or more additional electric motor/generator/transmissions 300. As shown in FIGS. 20 through 24, the electric motor/generator/transmission 300 includes a stator 302 and a rotor 304 rotatably coupled with the stator 302. The rotor 304 has an axis of rotation 306 and a longitudinal support structure 308 that extends in a first direction (e.g., in the direction of the axis of rotation 306). The stator 302 also extends longitudinally in the first direction and includes one or more interactive field elements (e.g., a first interactive field element 310, a second interactive field element 312, and possibly a third interactive field element, a fourth interactive field element, and so on). In embodiments of the disclosure, the interactive field elements are spaced apart from one another in the first direction. The rotor 304 includes one or more interactive field elements (e.g., an interactive field element 314 coupled with the longitudinal support structure 308.

In embodiments of the disclosure, the stator winding 310 and the stator winding 312 are actuatable between three or more positions. The stator winding 310 and the stator winding 312 can be contained within a stator cage or coupled to any other support structure that is moveable by an actuator. The stator winding 310 and the stator winding 312 may each have different cores and/or winding configurations so that operating characteristics of an electric motor/generator/transmission 300 can be changed when the stator winding 310 and the stator winding 312 translate between an orientation corresponding to a first stator position, where the stator winding 312 is engaged with the interactive field element 314; an orientation corresponding to a second stator position, where the stator winding 310 is engaged with the interactive field element 314; and an orientation corresponding to a third position, where neither the stator winding 310 nor the stator winding 312 is engaged with the interactive field element 314. It should be noted that the order of stator positions is provided by way of example and is not meant to limit the present disclosure. In other embodiments, a neutral stator position can be positioned between two stators. A neutral stator position can also be at a different end of the electric motor/generator/transmission 300. Further, an electric motor/generator/transmission 300 can include more than one neutral position and so forth. In embodiments of the disclosure, the magnets 314 can be equally spaced on the periphery of the rotor shaft 308, where the outer peripheral surface of the magnets 314 is at a defined minimal distance (e.g., gap) from the inner peripheral surface of the stator winding 310 core surface, causing electricity to flow in the stator winding 310 as the rotor 304 rotates if acting as a generator, or causing the rotor 304 to rotate if electric current is supplied to the stator winding 310 from an external source.

As described herein, the different stator windings 310 and 312 can provide different power, torque, amperage, and/or voltage capacities and efficiencies. In some embodiments, a controller can be used to send commands to the actuators of the stator windings to move them in and out of stator positions to achieve enhanced efficiency under widely varying input and output conditions, such as wind powered generators, motors for city busses, and so forth. In embodiments, an actuator 322 (e.g., a stepper motor, linear actuator, or the like) can be directly or indirectly coupled with the stator winding 310 and the stator winding 312. In some embodiments, the actuator 230 can include an arm configured to drive the stator cage containing the stator winding 310 and the stator winding 312, thereby causing stator winding 310 and the stator winding 312 to move relative to the interactive field element 214 to a desired position.

In embodiments of the disclosure, multiple electric motor/generator/transmissions 300 can be connected together (e.g., end-to-end as described with reference to FIG. 19). For example, the longitudinal support structure 308 of the rotor 304 can be configured as a modular shaft, and multiple modular shafts can be connected together to form, for instance, a common axle. In some embodiments, each electric motor/generator/transmission 300 can include one or more endplates 316, which can include bearings (e.g., rotary bearings) for the rotor 304. In some embodiments, the endplates 316 of two or more electric motor/generator/transmissions 300 can be connected together to allow additional electric motor/generator/transmissions 300 to be added inline (e.g., under a common control system to form larger and more powerful units with variable torque and/or power capabilities).

In some embodiments, a central opening 320 in a rotor endplate 316 can be shaped (e.g., machined to create a spline and/or a keyed coupling) so that multiple rotor endplates 316 of respective electric motor/generator/transmissions 300 can be connected to, for instance, a common axle extending through the centers of the electric motor/generator/transmissions 300. For example, the longitudinal support structure 308 (e.g., rotor shaft) of a first electric motor/generator/transmissions 300 can include a driving member 318 configured to extend into a receiving cavity of an endplate 316 of an adjacently positioned second electric motor/generator/transmissions 300. In other embodiments, an electric motor/generator/transmission 300 may not necessarily include rotor endplates 316, e.g., where an interior of the longitudinal support structure 308 of the rotor 304 is shaped (e.g., machined to create a spline and/or a keyed coupling) so that multiple longitudinal support structures 308 of respective electric motor/generator/transmissions 300 can be connected to, for instance, a common axle.

Example Implementations—Variable Stator Winding Configurations

Figure 25:
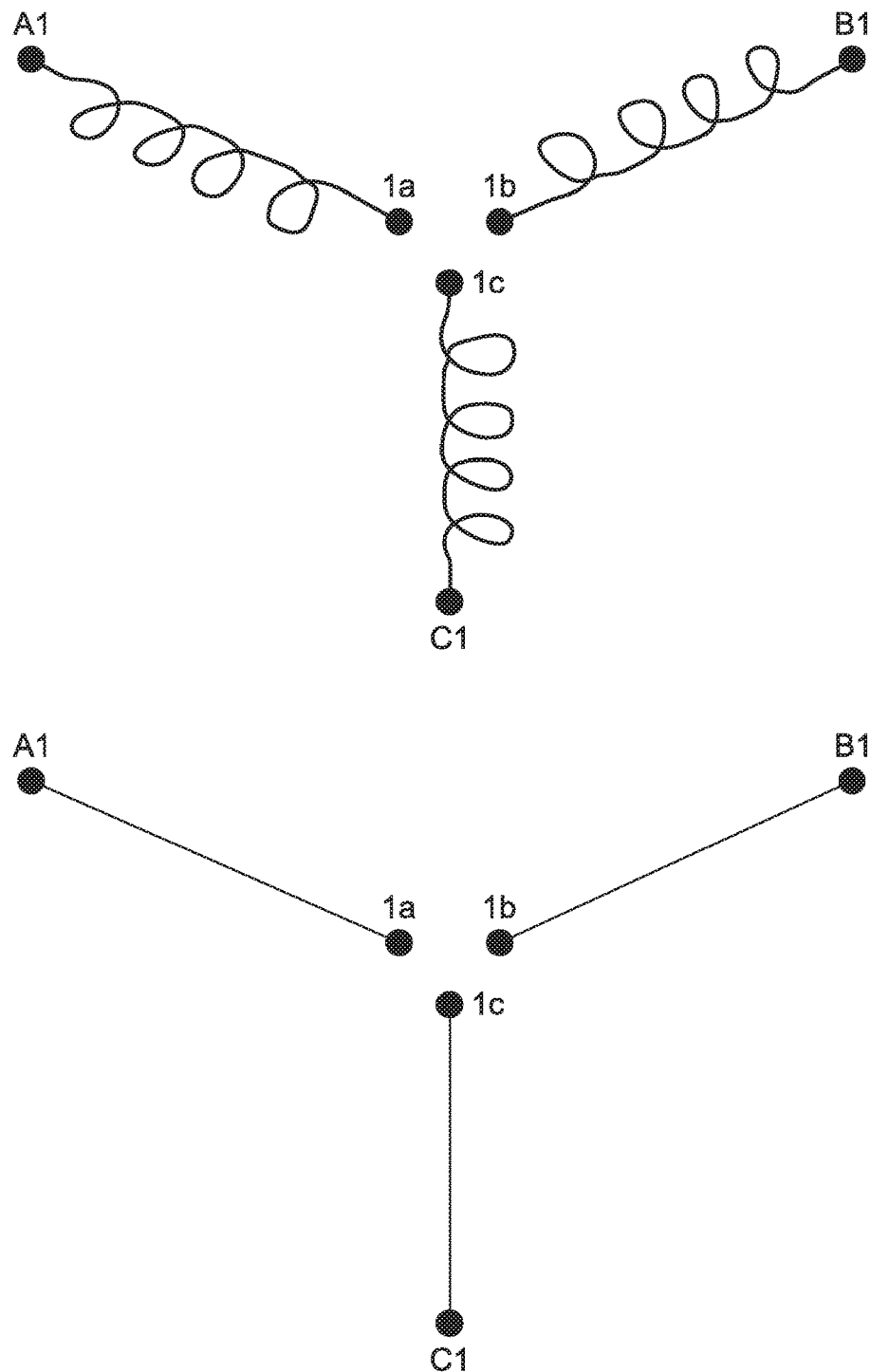
FIG. 25 is a diagrammatic illustration of separated center three-phase stator winding assemblies in accordance with example embodiments of the present disclosure.

Referring now to FIGS. 25 through 32, a stator configuration can comprise a separated center 3-phase wiring (e.g., as shown in FIG. 25). The 3-phase stator's center connections 1a, 1b, and 1c are configured to link three phases (e.g., phases 1, 2, and 3) to one point when coupled together. The live end of phase 1 is illustrated as A1, the live end of phase 2 is illustrated as B1, and the live end of phase 3 is illustrated as C1. As shown in FIG. 25, the phases can be separated such that the center connections 1a, 1b, and 1c are to be selectively connected (e.g., ends 1a, 1b, and 1c can be connected together or connected to other 3-phase windings).

Figure 26:
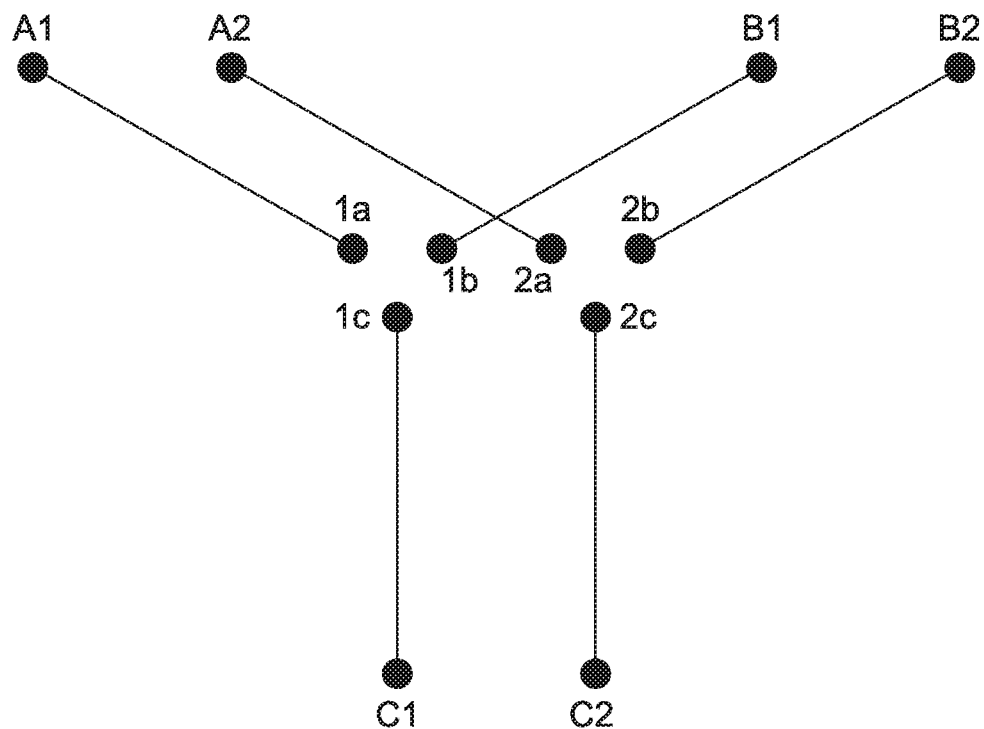
FIG. 26 is a diagrammatic illustration of a two-wire separated stator winding assembly in accordance with example embodiments of the present disclosure.

In some embodiments, a separated center 3-phase wiring including a 2-wire configuration (e.g., as shown in FIG. 26). Phase 1, phase 2 and phase 3 for each of the two windings have separated center connections (e.g., center connections 1a, 1b, and 1c for a first winding and center connections 2a, 2b and 2c for a second winding). The live end of phase 1 is illustrated as A1 and A2 for each of the first and second windings, respectively. The live end of phase 2 is illustrated as B1 and B2 for each of the first and second windings, respectively. The live end of phase 3 is illustrated as C1 and C2 for each of the first and second windings, respectively. In this 2-wire scenario the winding A1 and A2 are in parallel around the iron cores and end in the central connections 1a and 2a likewise are B1 with B2, central connection 1b with 2b likewise are C1 with C2, central connection 1c with 2c.

In the 2-wire configuration there are parallel (Gear #4) and series (Gear #1) modes available. The individual winding sections while operating in parallel mode (Gear #4) can include connecting A1 to A2, B1 to B2, C1 to C2, and the central connections 1a, 1b, 1c, 2a, 2b and 2c can be connected together. The individual winding sections while operating in series mode (Gear #1) can include connecting 1a to A2, 1b to B2, 1c to C2, and the central connections 2a, 2b and 2c can be connected together. In this configuration, each active winding section carries half the voltage of the parallel mode (Gear #4) and two times the current found in the parallel mode configuration.

Figure 27:
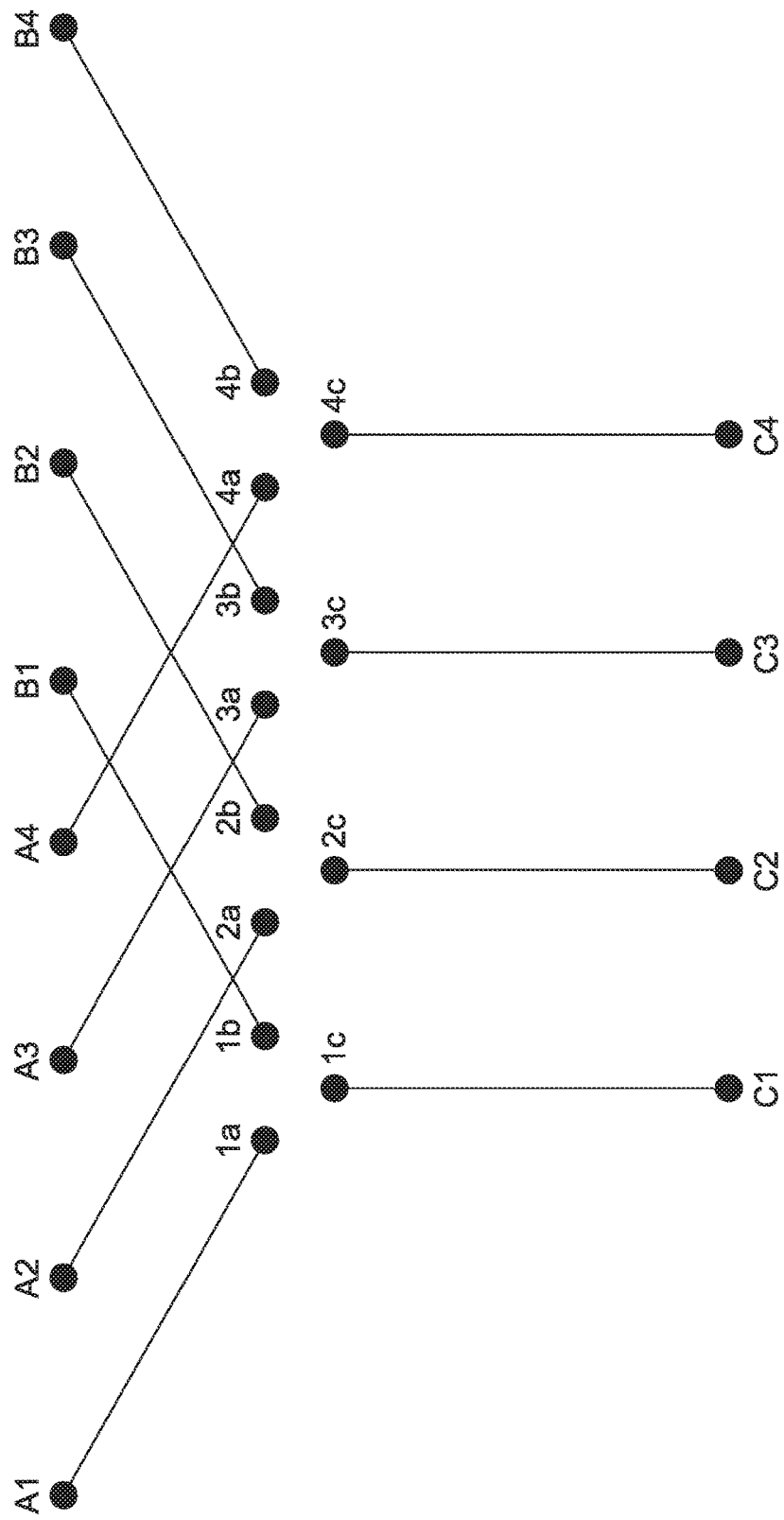
FIG. 27 is a diagrammatic illustration of a four-wire separated stator winding assembly in accordance with example embodiments of the present disclosure.
Figure 29:
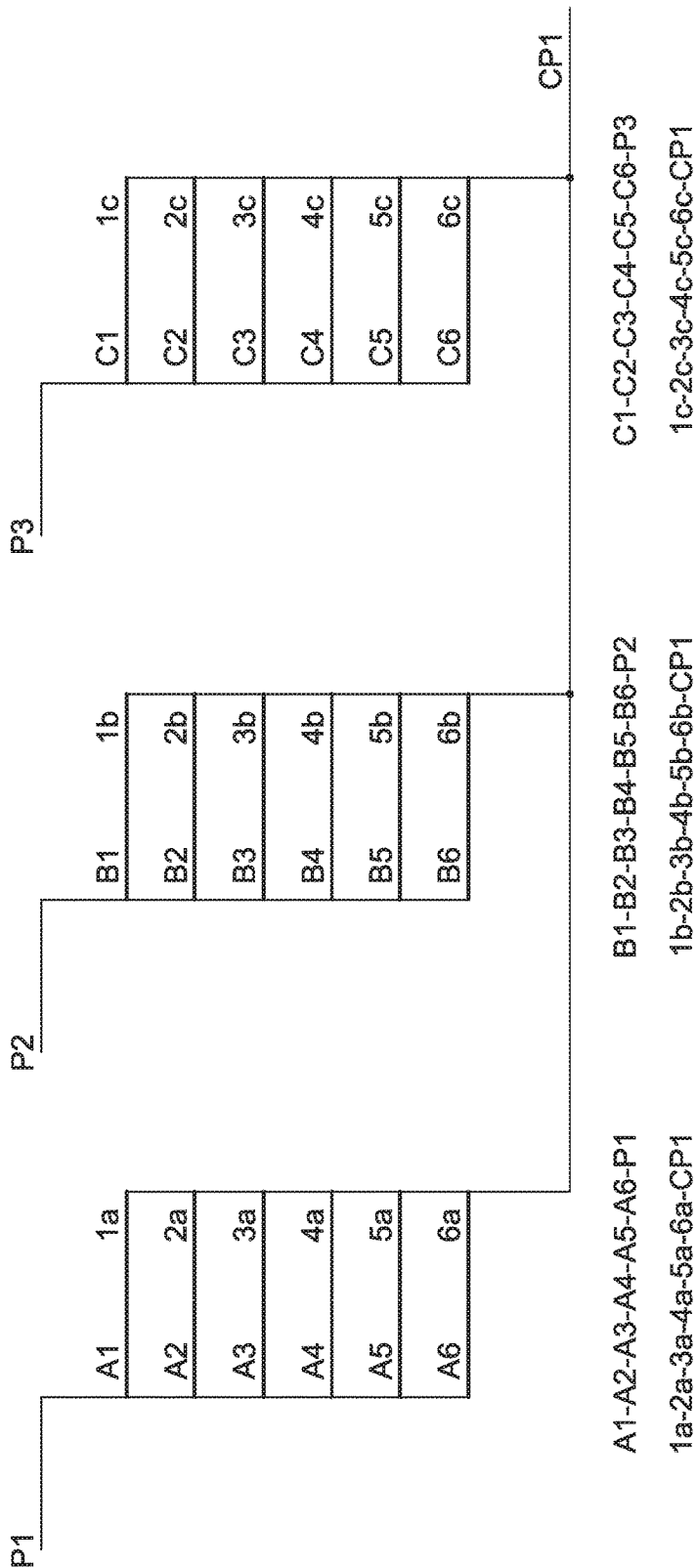
FIG. 29 is a diagrammatic illustration of stator winding sets in a parallel gear configuration in accordance with example embodiments of the present disclosure.
Figure 30:
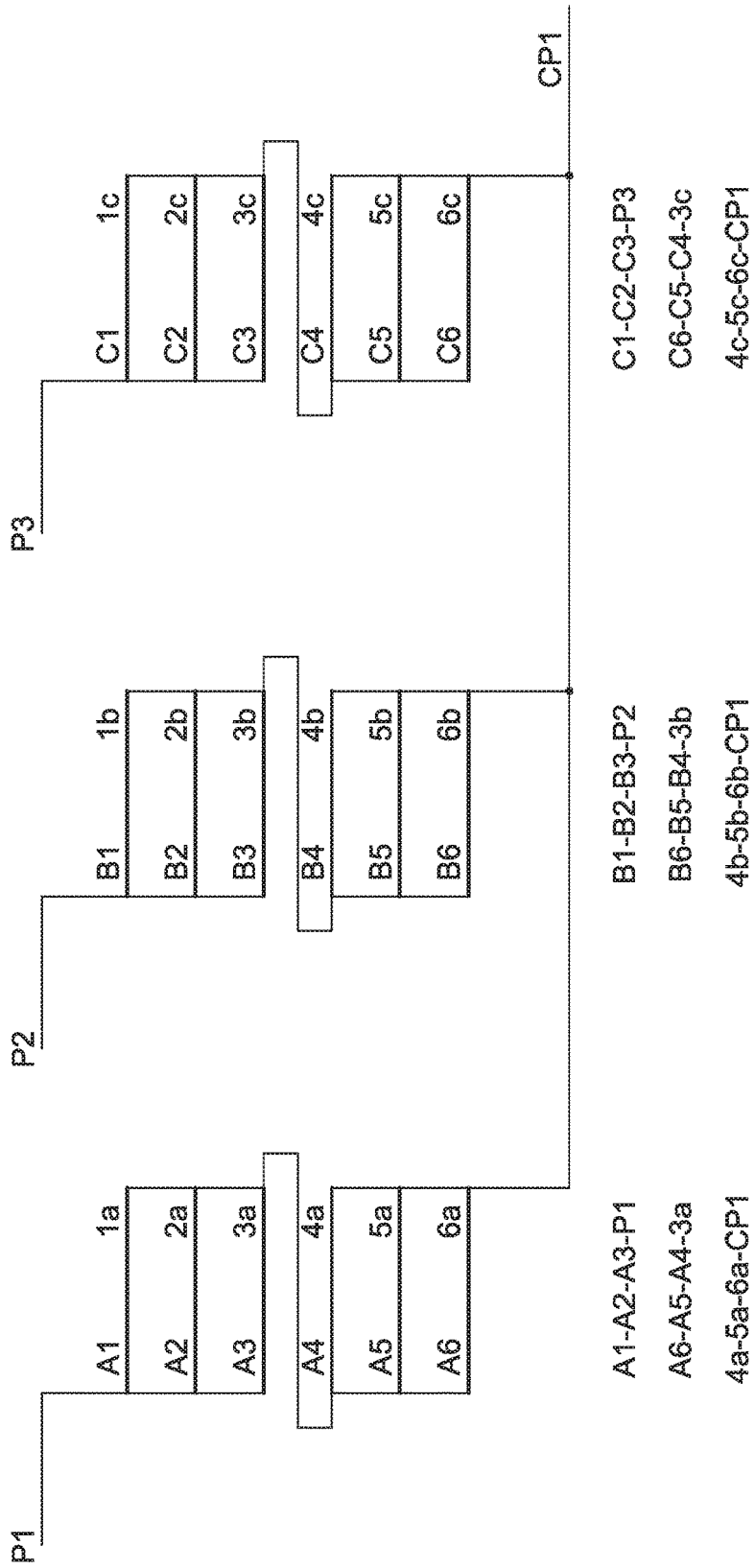
FIG. 30 is a diagrammatic illustration of stator winding sets in a partially parallel/partially series gear configuration in accordance with example embodiments of the present disclosure.
Figure 31:
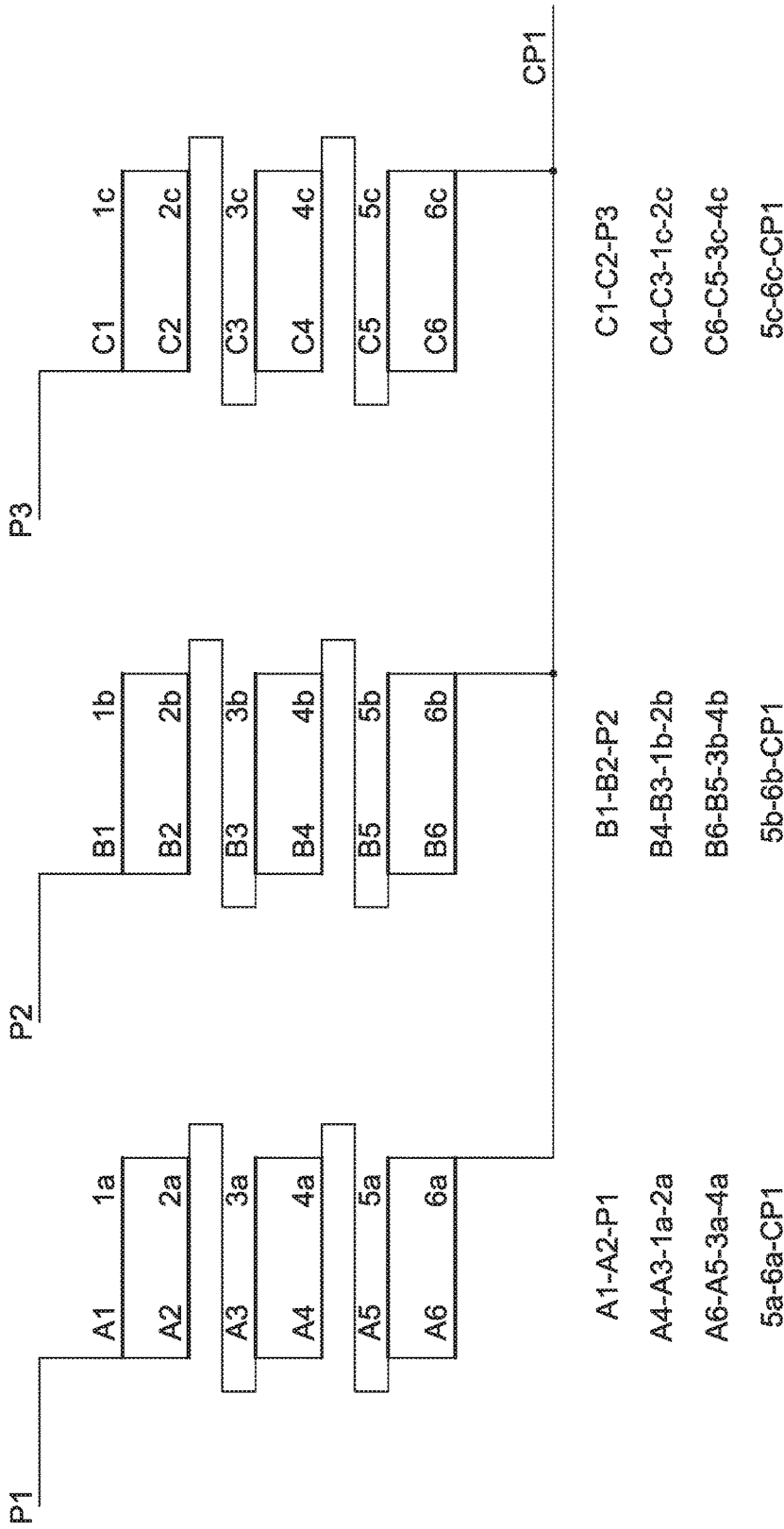
FIG. 31 is another diagrammatic illustration of stator winding sets in a partially parallel/partially series gear configuration in accordance with example embodiments of the present disclosure.
Figure 32:
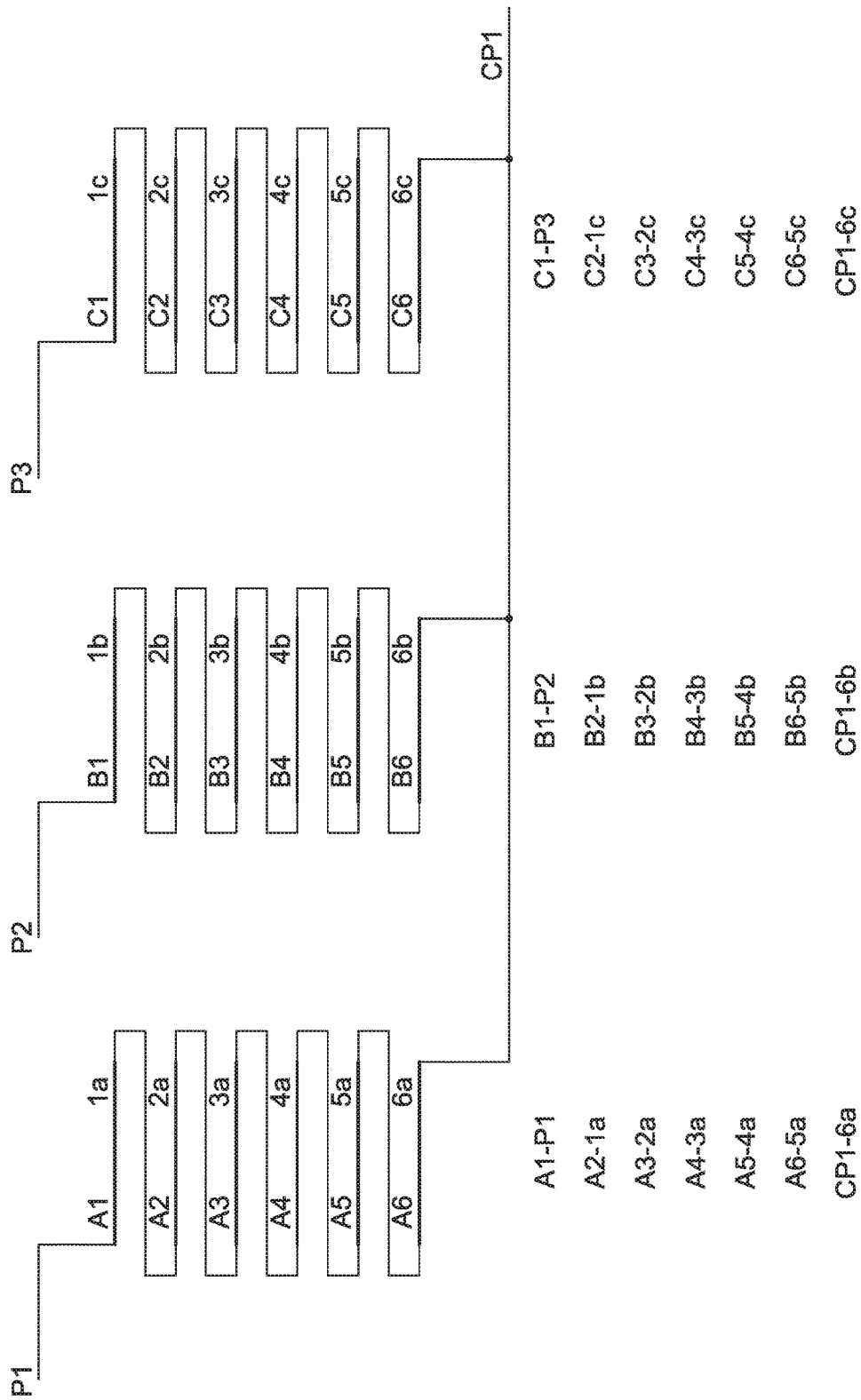
FIG. 32 is a diagrammatic illustration of stator winding sets in a series gear configuration in accordance with example embodiments of the present disclosure.

In another embodiment, a stator configuration can comprise a separated center 3-phase wiring including a 4-wire configuration (e.g., as shown in FIG. 27). Phase 1, phase 2 and phase 3 for each of the four windings can have separated center connections (e.g., center connections 1a, 1b, and 1c for a first winding, center connections 2a, 2b and 2c for a second winding, center connections 3a, 3b, and 3c for a third winding, and center connections 4a, 4b and 4c for a fourth winding). The live end of phase 1 is illustrated as A1, A2, A3 and A4 for each of the first, second, third, and fourth windings, respectively. The live end of phase 2 is illustrated as B1, B2, B3 and B4 for each of the first, second, third, and fourth windings, respectively. The live end of phase 3 is illustrated as C1, C2, C3 and C4 for each of the first, second, third, and fourth windings, respectively. In this 4-wire scenario the windings A1, A2, A3 and A4 are in parallel around the iron cores and end in the central connections 1a, 2a, 3a and 4a, likewise are B1, B2, B3 with B4 ending in central connections 1b, 2b, 3b with 4b, and likewise are C1, C2, C3 with C4 ending with central connection 1c, 2c, 3c with 4c.

In the 4-wire configuration there are parallel (Gear #4), parallel/series (Gear #2), and series (Gear #1) modes available. The individual winding sections while operating in parallel mode (Gear #4) can include connecting A1, A2 and A3 to A4; B1, B2 and B3 to B4; C1, C2 and C3 to C4, and the central connections 1a, 2a, 3a, 4a, 1b, 2b, 3b, 4b, 1c, 2c, 3c and 4c can be connected together. The individual winding sections while operating in series/parallel mode (Gear #2) can include connecting A1 to A2; 1a, 2a, A3 and A4; B1 to B2; 1b, 2b, B3 and B4; C1 to C2; 1c, 2c, C3 and C4; 3a, 4a, 3b, 4b, 3c and 4c. In this configuration (Gear #2), each active winding section carries half the voltage of the parallel mode (Gear #4) and two times the current found in the parallel mode (Gear #4) configuration. The individual winding sections while operating in series mode (Gear #1) can include connecting 1a to A2, 2a to A3, 3a to A4, 1b to B2, 2b to B3, 3b to B4, 1c to C2, 2c to C3, 3c to C4, and 4a, 4b and 4c together. In this configuration (Gear #1), each active winding section carries one fourth the voltage of the parallel mode (Gear #4) and four times the current found in the parallel mode configuration.

In another embodiment, the stator configuration includes a separated center 3-phase wiring including a 6-wire configuration (e.g., as shown in FIG. 28). Phase 1, phase 2 and phase 3 for each of the six windings can have separated center connections (e.g., center connections 1a, 1b, and 1c for a first winding, center connections 2a, 2b and 2c for a second winding, center connections 3a, 3b, and 3c for a third winding, center connections 4a, 4b and 4c for a fourth winding, center connections 5a, 5b, and 5c for a fifth winding, and center connections 6a, 6b and 6c for a sixth winding). The live end of phase 1 is illustrated as A1, A2, A3, A4, A5 and A6 for each of the first, second, third, fourth, fifth, and sixth windings, respectively. The live end of phase 2 is illustrated as B1, B2, B3, B4, B5 and B6 for each of the first, second, third, fourth, fifth, and sixth windings, respectively. The live end of phase 3 is illustrated as C1, C2, C3, C4, C5 and C6 for each of the first, second, third, fourth, fifth, and sixth windings, respectively. In this 6-wire scenario the winding A1, A2, A3, A4, A5 and A6 are in parallel around the iron cores and end in the central connections 1a, 2a, 3a, 4a, 5a and 6a, likewise are B1, B2, B3, B4, B5 with B6 ending in central connections 1b, 2b, 3b, 4b, 5b with 6b, and likewise are C1, C2, C3, C4, C5 with C6 ending with central connection 1c, 2c, 3c, 4c, 5c with 6c.

In the 6-wire configuration there are parallel (Gear #4), first parallel/series (Gear #3), second parallel/series (Gear #2), and series (Gear #1) modes available. The individual winding sections while operating in parallel mode (Gear #4, illustrated in FIG. 29) can include connecting A1, A2, A3, A4, A5, and A6 together, B1, B2, B3, B4, B5, and B6 together, C1, C2, C3, C4, C5, and C6 together, and the central connections 1a, 1b, 1c, 2a, 2b, 2c, 3a, 3b, 3c, 4a, 4b, 4c, 5a, 5b, 5c, 6a, 6b and 6c can be connected together.

The individual winding sections while operating in series/parallel mode (Gear #3, illustrated in FIG. 30) can include connecting A1, A2 and A3 together, 1a, 2a, 3a, A4, A5 and A6 together, B1, B2 and B3 together, 1b, 2b, 3b, B4, B5 and B6 together, C1, C2 and C3 together, 1c, 2c, 3c, C4, C5 and C6 together, 4a, 5a, 6a, 4b, 5b, 6b, 4c, 5c and 6c together. In this configuration (Gear #3), each active winding section carries half the voltage of the parallel mode (Gear #4) and two times the current found in the parallel mode (Gear #4) configuration.

The individual winding sections while operating in another series/parallel mode (Gear #2, illustrated in FIG. 31) can include connecting: A1 to A2; 1a, 2a, A3 and A4 together; 3a, 4a, A5 and A6 together; B1 to B2; 1b, 2b, B3 and B4 together; 3b, 4b, B5 and B6 together; C1 to C2; 1c, 2c, C3 and C4 together; 3c, 4c, C5 and C6 together; and 5a, 6a, 5b, 6b, 5c and 6c together. In this configuration (Gear #2), each active winding section carries one third the voltage of the parallel mode (Gear #4) and three times the current found in the parallel mode (Gear #4) configuration.

The individual winding sections while operating in series mode (Gear #1, illustrated in FIG. 32) can include connecting: 1a to A2; 2a to A3; 3a to A4; 4a to A5; 5a to A6; 1b to B2; 2b to B3; 3b to B4; 4b to B5; 5b to B6; 1c to C2; 2c to C3; 3c to C4; 4c to C5; 5c to C6; and 6a, 6b and 6c together. In this configuration (Gear #1), each active winding section carries one sixth the voltage of the parallel mode (Gear #4) and six times the current found in the parallel mode (Gear #4) configuration.

For further example, the voltage carried by each of the core coils of a 12 volt, six-wire system would be: 2 volts in Gear 1 (all series); 4 volts in Gear 2; 6 volts in Gear 3; and 12 volts in Gear 4 (all parallel). The corresponding amperage would also change with each gear, as explained above, while the power remains constant. The foregoing voltages are provided for illustrative purposes, and those skilled in the art will appreciate that different voltages and additional configurations can be provided to achieve any number of gears.

In some embodiments, for a three-phase motor/generator, six (or four or eight or more) parallel, non-twisted wires are wound around the stator cores of each stator, in the same manner as the stator cores would be wound with one wire. However, the six wires may have fewer wraps around each core before the available space is filled. In a three-phase motor, the wires (sometimes referred to a legs or branches) of each circuit phase normally come together at a common point. According to various embodiments of this disclosure, six wires are disconnected or separated at the common point and are run through a switching system (e.g., a plurality of logic controlled switches) configured to cause the wires to be in series, parallel or a combination thereof but remain in three-phase configuration (as described above). The same or a similar switching system can also be applied to connections between the common stators in successive sets, in addition to the connections between the wires within the stators.

In some embodiments, a single electric motor/generator/transmission can have one or more rotor stator sets of two or more differently wound stators with one rotor per set and mechanical shifting to place the magnetic field of the rotor in contact with the electromagnetic field of one or the other stator. In some embodiments, an electronic shifting capability is provided within for each stator of any stator and rotor combination including both: a motor/generator having multiple stators with a rotor for each stator and no mechanical shifting; and an electric motor/generator/transmission with one or more rotor/stator sets as described herein. In both cases, with multiple stators or multiple stator sets, similarly wired stators may be wired together in parallel or series. When there are four stators, the stators may be configured as follows: all stators may be connected in parallel (Gear #4); two sets of stators may be connected in parallel and the sets connected in series (Gear #3); or all stators may be connected in series (Gear #1). When there are six stators, the stators may be configured as follows: all may be connected in parallel (Gear #4); there can be two sets of three stators wired in parallel and the sets connected in series (Gear #3); three sets of two stators wired in parallel and the sets connected in series (Gear #2); or all sets connected in series (Gear #1).

When the stators are electrically connected to each other on a common shaft the rotors may need to be identical and the stators may need to be identically wired and radially oriented or the voltages, torque and phase from each stator rotor combination can conflict. In some embodiments, for example, in a system with six commonly wired stators, all of the stators may need to be energized together. If one or more are electrically disconnected, the motor/generator can experience inefficiency from the induced drag and there is no neutral. There are four levels of torque/voltage when the connections between the stators are switched as above described, but there is no further torque/voltage adjustment within the stators themselves, nor is there an ability to adjust the power capacity of the motor/generator.

In embodiments of six rotor/stator sets with two or more stators per set, the total power of the electric motor/generator can be increased or decreased by activating more or less rotor/stator sets within the units and further adjusted by shifting the rotor's magnetic field to the next stator of different wiring and even further adjusted by adjusting the number of magnets in the rotating magnetic field as described above. In cases where there are two or more rotor stator sets in operation, the active stator in each of the sets, the rotor magnets in each of the sets, and the stator wiring in each of the sets must be identically set and radially oriented, then additional adjustments in torque and voltage may be made by switching the parallel/series connections between the stators as above described.

In some embodiments, the mechanical shifting in the rotor/stator sets is implemented with the electronic shifting of the stator wiring, and when there are multiple stator sets, the sets are connected with the ability to switch the connections between them from series to parallel and the noted combinations thereof. For further clarification, when a second set of two or more stators is added to a first set of two or more stators, both sets must be in either series or parallel for the same voltage to run through both of them and generate the same torque for the common shaft. As stated above, stators can run all in series or all in parallel or equal sets of two or three stators in parallel where the sets are connected in series. When shifting between series and parallel the stators should all be shifted together.

Moreover, when additional sets of stators are added to the motor/generator, the power capacity of the generator is increased and the motor/generator will also have a different torque. This can be done by having multiple rotor/stator sets that each have a neutral or idle position, where the magnetic field of the rotor is not engaged with the electro-magnetic field of any of the stators in the multi-set motor/generator, and then as the power available or required increases, the stators in the sets are brought on line as needed. The power capacity of the motor/generator can also be increased or decreased by shifting to differently wound stators within the sets and further fine-tuned by adjusting the number of rotor magnets engaged in the flux field at any one time. The ability to add or subtract active stators from the motor/generator and change between stator windings, and to add and subtract magnets from the rotors, and then further change the windings from series to parallel and combinations thereof, provides the motor/generator with an ability to dynamically adapt to widely varying sources of energy. This serves to optimize motor/generator configuration for improved electrical generation and to adapt to widely varying demands for motor power in hybrid vehicles and similar uses.

The motor/generators as described herein can include modular components, comprising modular stator cage and housing sections, rotors, stators, end caps, actuators, electrical connections, power switching, electronic sensors, controls and user interface, where the motor/generator can be assembled to comprise single or multiple rotor/stator sets with two or more stators per set serving as one motor/generator. In some embodiments, the motor generator can include five or more rotor/stator sets.

In embodiments, the motor/generators as described herein can have a rotor section comprised of laminated steel encasement that includes multiple permanent magnets located on the outermost radius in alternating polarities from north to south (e.g., evenly spaced). The rotors and/or stators can include permanent magnets comprised of neodymium iron boron (NdFeB) or comparable magnetic strength and/or coercivity composition of magnets or magnet with increased magnetic strength and/or coercivity.

The motor/generators as described herein can have bearings that contain the axle and rotor assembly for rotational movement but limit linear movement in relation to the end caps and main housing. In some embodiments, the bearings can be of sufficient accuracy as to limit rotational wobble and vibration to 0.003 inch and linear movement to 0.001 inch as to provide and maintain a maximum air gap between the rotor and stator of 0.010 inch as to provide for high efficiency where the smaller air gap can provide better efficiencies.

The motor/generators as described herein can have a linear actuating stator section comprised of a 3-phase stator winding or multiples of similar 3-phase stator windings to match the number of rotor sections. In embodiments, the stator sections can be comprised of laminated iron cores and 3-phase wire windings located inside the innermost diameter of the laminated iron cores and separated into multiple (e.g., 14 or more) positions equally spaced on the innermost radius. In some embodiments, iron cores can have an inner diameter of 0.010 inch larger than said rotor sections to maintain an air gap sufficient to allow tolerances, movement and distortion an operating distance apart and still provide for an efficient power conversion. The 3-phase wire windings comprising multiples of said individual wire winding sections (2, 4, 8, 16, 24 individual wire sections, etc.) can be electrically separated, non-twisted, of smaller diameter but still in the 3-phase design as to have the total combined wire sections in parallel equal the maximum current requirements of the motor/generator. When said windings are switched into series/parallel or series configurations they can increase the voltage at lower RPM's.

In some embodiments, the motor/generators as described herein can have multiple rotor sections, where said rotor sections have no radial offset to include the stator sections aligned radially.

The motor/generators as described herein can have stator housing slip rings comprising an aluminum housing to radially encase the stator whereby allowing the stator move linearly inside the main housing while maintaining radial stability to 0.003 inch as to support an air gap of 0.010 inch between the outermost rotor diameter and the innermost stator diameter. The housing slip rings can include multiples of stator sections (e.g., from 2 to 5 or more sections) that can be interlinked linearly as to move as one stator cage assembly.

Actuators or actuation assemblies described herein can include mechanical mechanisms for linearly moving the stator assembly to engage or disengage operations with the said rotor assembly or combinations of multiple rotor assemblies whereas these movements can be operated by way of external lead screw, internal lead screw, electrical linear motor, hydraulic actuator or other mechanical mechanisms. This stator movement can be variable as to be fully engaged or in line with the rotor at one extreme and disengaged or completely out of the rotor flux path for the other extreme.

The motor/generators as described herein can have a main housing comprising a rigid outer encasement of aluminum, steel, plastic or other firm material to securely contain the stator assemblies and rotor assemblies with less than 0.001 inch distortion in nominal operating conditions to maintain air gap requirements and motor/generator functions. Modular end caps or endplates can include rigid outer encasements of aluminum, steel, plastic or other firm material whereas to securely contain and align the bearings and connect the main housing to other machinery and frameworks. As described above, the modular end caps can include connections for multiples of motor/generator combinations, where they can operate as one motor/generator when attached. These can include rotor connections and linear actuating stator connections.

The motor/generators as described herein can have modular electrical connections comprising standard electrical connectors that can be modified to be attached to the said modular end caps as to electrically connect multiple motor/generator units together as one unit. The motor/generators as described herein can also have power switching transistors for the generator mode also comprising standard 3-phase motor control invertors for various motor modes (as described above) utilizing both variable frequency and pulse width modulation schemes for motor functions. In embodiments, power switching transistors are in a configuration where a 15-phase output in generator mode comprises separate output transistors for each of the 15 phases, where the output frequency can be selected from the 15 phases and adjusted independent of the rotor RPM to build the new frequency as minimum RPM can support a maximum frequency desired.

The motor/generators as described herein can have electronic sensors such as Hall Effect, optical or other resolving sensors attached to the rotor that can calculate and report the RPM, direction and actual position of the rotor or multiple rotor assemblies to the control unit. The motor/generators can have controls and a user interface comprising a computer whereby the RPM, direction, acceleration, torque, generator mode, coast mode, motor mode and stator multiple wire series/parallel configurations are calculated and adjusted according to the user preset parameters and other input devices such as wind speed indicators, brake devices, accelerator devices, failsafe devices, and other input devices.

In some embodiments, the stator sets or rotors for each set are radially offset from each other by the number of sets divided by 360 degrees and the opposing stator sets or rotors are radially aligned where each set of 3-phase windings produces a sine power curve that is offset from the adjacent power curve by the number of degrees that the stators or rotors are radially offset where the output frequency of the multiple phases can be selected from the multiple phases and adjusted independent of the rotor RPM to build a new frequency so long as the minimum RPM can be maintained.

Various embodiments of motor/generators and motor/generator/transmissions have been described herein. Such motor/generators and motor/generator/transmissions can be implemented in a variety of power generation and power management applications. For example, the motor/generators and motor/generator/transmissions described herein can be implemented in generation devices (e.g., windmills, hydropower generators, and the like) and vehicles or motor-driven devices with multiple power sources, such as hybrid vehicles (e.g., cars, motorcycles, etc.), hybrid marine vessels, hybrid airplanes, and so forth. Some example applications are discussed below.

Example Implementations—Wind Power Generation System

In an example application where a motor/generator as described herein is implemented in a windmill or wind turbine, an operating scenario can start with no wind at the wind turbine and the stator cage in the inactive "stopped" condition. In this scenario, an actuator has moved the stator cage (or the rotor field element) to the furthest position where the blank space is over the rotor and the stator windings are disengaged from the magnetic field of the rotor. As the wind speed starts to increase, the sensor can measure the RPM and "shift" or move the first stator section (or rotor field element) from the neutral mode into a position where the magnetic field of the rotor engages the least amount of stator coils and is 100% parallel requiring the least amount of torque, allowing rotation of the windmill to begin at very low wind speeds and generate electricity much sooner than conventional generators can "startup". The computer interface can collect data from the wind speed sensors and the rotational speed of the windmill. As the wind speed increases, the computer can shift from Gear #4, 100% parallel to Gear #3, two sets of three parallel wires connected in series, and so on to Gears #2 and #1, increasing the torque required to turn the windmill blades until either a preset rotational speed is achieved or the resisting torque of the stator/rotor set is equal to the power of the wind and the wind mill blades are turning at a constant speed. Upon shifting to full series winding and maximum torque of the first stator in the stator/rotor set, the computer can cause the actuator to shift the second stator with a greater number of stator coils in the stator/rotor set in line with the rotor and go through the same parallel to series shifting process until the stator windings in the second stator are full series windings and maximum resisting torque. If there is a third stator in the set the process can be repeated.

As the computer monitors the wind speed and power available from the wind it can engage the actuators of 1, 2, 3 or more stator/rotor sets to match the power of the wind concurrently shifting each of the stator/rotor sets through their various gears and stators/rotors as above described until equilibrium in the rotational speed of the windmill blades is achieved and the power of the wind is matched with an optimum or nearly optimum generating capacity of the wind power generator and maintaining needed line voltage. As the wind speed increases and it is desired to bring additional stator sets online, say from three sets to four sets, the computer can determine what gear the four sets can be in and what stator activated, then momentarily electrically disconnect the three sets, place the four sets in the new configuration and electrically reconnect the four sets to be concurrently shifted with the same voltage emanating from each stator set Final adjustments and fine tuning is achieved by fine adjustment of the alignment of the stators with the rotor in the sets. This also applies when minor adjustments are required to accommodate minor variations in the wind speed.

When the wind velocity subsides and the number of stator sets on line is to be decreased from four to three, the last stator to come on line is electrically disconnected, its stator repositioned to neutral and the three remaining stator sets adjusted to match the wind power then being generated by the windmill. In this manner systems and techniques in accordance with the present disclosure can accurately, swiftly and efficiently balance the power output of the motor generator with the available wind speed at levels of wind speed and produce generated electric power from the wind at high efficiency rate. Generally, the total number of stator/rotor sets in the motor generator in full series setting acting together can correspond to the maximum structural and mechanical capabilities of the wind mill and its blades. At the point of maximum capacity as with some generators it can automatically shut down. But unlike generators that have a narrow band of wind speeds where they operate efficiently, techniques in accordance with the present disclosure can extract increased power from the wind at high efficiency throughout the entire range of wind speeds up to the structural capacity of the wind mill. When the wind speed starts to slow down and the output voltage drops, the unit can switch down to the next stator-wiring mode to increase the voltage/power collection. When the wind speed drops to a very slow condition, and although not much power is generated, the unit can still capture this and help with the annual wind turbine output for greater overall machine efficiency where conventional generators may have to shut down.

Another operational function can be described in a larger scaled up version as in megawatt sized wind turbines. This scenario can behave the same as in the small wind example but the configuration of the generator can be much larger, may have as many as 12 or more stator/rotor sets in a 3-phase configuration to enable a smooth transition in RPM changes do to highly variable wind. The stator engagement process can also be the same or similar, with the exception of extra user controls, sensors for power grid control and monitoring systems to sense the load and adjust to customer demand.

Another feature of this disclosure is the addition of larger stator/rotor sets and the ability to offset each of the stator/rotor sets rotationally by a few degrees as to make the number of stator and rotor section equal the evenly spaced out rotational offsets. This can help with generator "cogging" and enable a design of this disclosure whereby the multiple stator windings can be controlled to have an onboard insulated gate bipolar transistors (IGBTs) select the different high and low voltage points and using pulse width modulation (PWM) schemes, build and create a 3-phase sine wave at a set frequency of 60 hz. When sensing RPM changes and fluctuations, the controls can adjust the stator winding section to keep and maintain this frequency even when moderate RPM changes are noticed. This is a solution for a variable rotational power source and a constant frequency generated output for a local grid or emergency power source without conversion losses due to AC-to-DC and large inverter systems power consumption. To understand this process, an example of a large stator set of multiple pole 3-phase winding and 12 stator and rotor sets is provided. In this example, the stator sets are aligned with each other but the rotor sets are rotationally offset by $\frac{1}{12}^{th}$ of the multiple pole rotational angle. This can provide 12 separate 3-phase outputs equally spaced in oscillation offset. The computer system can then take the current RPM, acceleration, load, back EMF (electromagnetic force), output frequency and target frequency and use the PWM switching IGBT's to select upcoming power potentials from the multiple phases and produce the target frequency from the high and low points of the generated multiple phases, possibly regardless of the source RPM (e.g., as long as the RPM is sufficient to maintain the target voltage and power output). The same linear actuation of the stator sections can regulate the torque and changing wind speed rotor RPM's while producing efficient power for the conditions of gusts and very low wind speed plus conditions in between.

The disclosure's operational function in the application of other renewable energy sources such as tidal and wave generation machines can utilize this same variability in RPM to increase efficiency where the source is intermittent and unreliable, for example, where wave and possible tidal generation machines may also turn a generator one direction and then immediately change rotational direction and continue to generate power efficiently. This disclosure has the ability to add additional rotor/stator set to increase and/or decrease the power capacity and then fine-tune the output with the stator linear movement to coincide with the gradual oscillating output power source and direction changes and further adjust the volt/amp ratios to increase the efficiency of the unit to match the variable input at an instant of time, by switching between stators and parallel or series winding.

Example Implementations—Hybrid Vehicle Propulsion System

Figure 33:
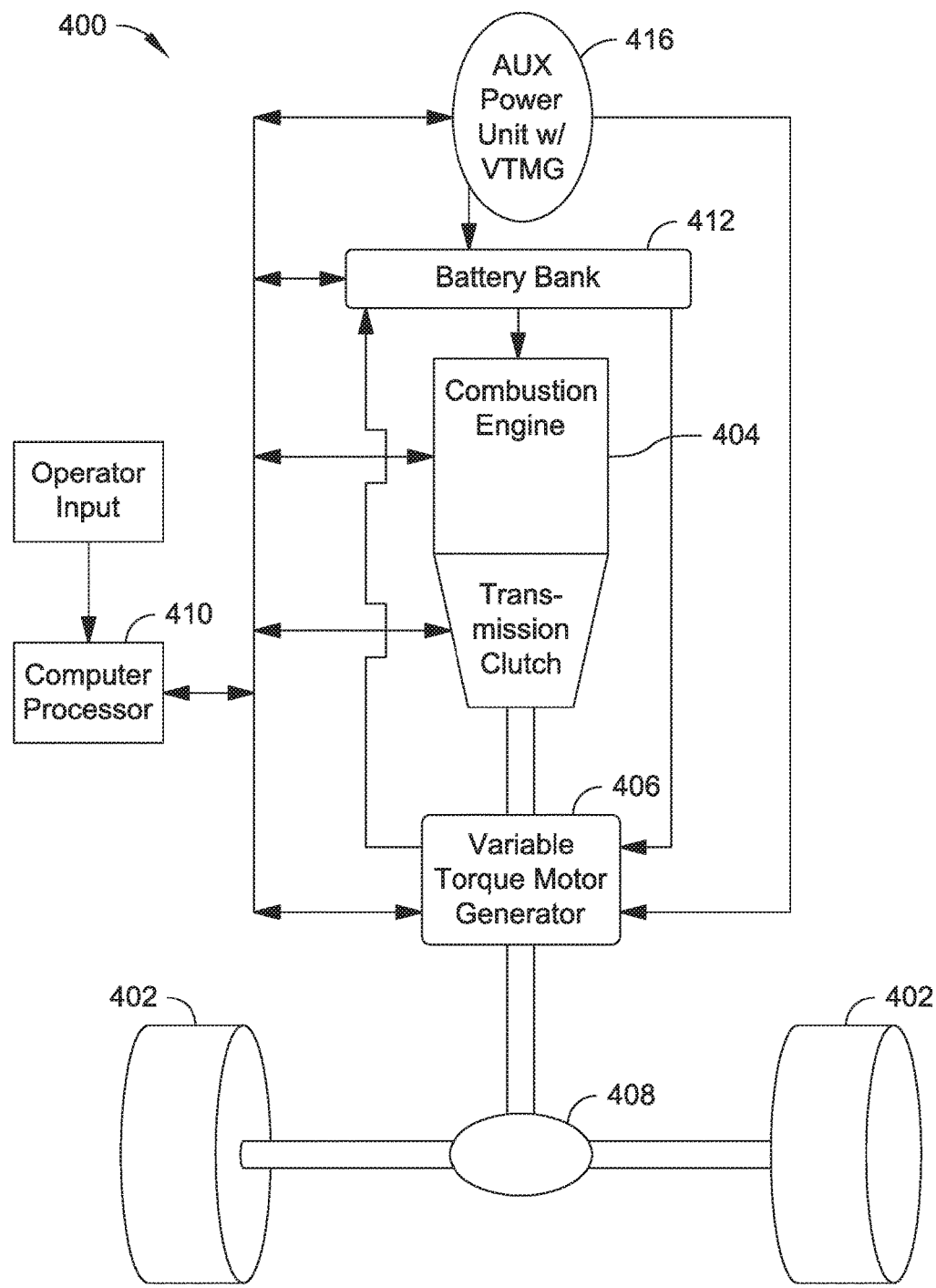
FIG. 33 is a diagrammatic illustration of an electric motor/generator/transmission, such as the electric motor/generator/transmission illustrated in any of FIGS. 1 through 24, in a hybrid vehicle in accordance with example embodiments of the present disclosure.

Referring generally to FIG. 33, a hybrid vehicle (e.g., hybrid car or motorcycle) propulsion system 400 is described. The propulsion system 400 includes a propulsion device (e.g., vehicle drivetrain 408 configured to accelerate one or more wheels 402) and an engine (e.g., an internal combustion engine 404, such as a diesel or gas engine) to selectively power the vehicle drivetrain 408. The propulsion system 400 also includes a variable torque electric motor/generator/transmission 406 (e.g., as previously described herein with reference to FIGS. 1 through 32) to selectively power the vehicle drivetrain 408, and an energy storage device (e.g., a battery or battery bank 412) to store energy for powering the electric motor/generator/transmission 406.

The propulsion system 400 also includes a controller 410 to selectively operate the propulsion system 400 in a first mode (e.g., an electric mode) where the electric motor/generator/transmission 406 supplies power to the vehicle drivetrain 408, and a second mode (e.g., a hybrid mode) where the internal combustion engine 404 supplies power to both the vehicle drivetrain 408 and the electric motor/generator/transmission 406. In embodiments of the disclosure, when the propulsion system 400 is operated in the hybrid mode, the electric motor/generator/transmission 406 supplies energy for storage in the battery 412. For example, the electric motor/generator/transmission 406 can be used to recharge the battery 412. When the propulsion system 400 is operated in the electric mode, the electric motor/generator/transmission 406 can be powered by energy stored in the battery 412.

In some embodiments, the electric motor/generator/transmission 406 alone can supply power to the propulsion system 400 in the electric mode. In other embodiments, the electric motor/generator/transmission 406 can supplement the internal combustion engine 404 in supplying power to the vehicle drivetrain 408. For instance, the electric motor/generator/transmission 406 and the internal combustion engine 404 can both supply power to the vehicle drivetrain 408 in the first mode. As described herein, the electric motor/generator/transmission 406 can power the vehicle drivetrain 408 over a wide range of torque and power requirements with enhanced efficiency. In this manner, operating costs (e.g., a total annual operating cost) of, for example, a hybrid vehicle can be reduced.

As described herein, the controller/computer processor 410 can include control circuitry communicatively coupled with one or more sensors that monitor functions of a vehicle, including, but not necessarily limited to: engine speed, shaft speed, shaft torque at an internal combustion engine 404, shaft torque at an electric motor/generator/transmission 406, vehicle speed, RPM, battery status, operator input, and so forth. The control circuitry can compare vehicle and/or drivetrain performance against operator input and make adjustments to the internal combustion engine 404 and/or to the electric motor/generator/transmission 406 to vehicle performance with operator input. For instance, the control circuitry can operate the internal combustion engine 404 to facilitate enhanced efficiency and/or life expectancy, supplementing engine power with power from an electric motor/generator/transmission 406 at a torque and speed selected to meet operator input requirements.

In some embodiments, when operator input (e.g., pressure applied to a gas pedal) indicates a desired acceleration and/or high power that may not otherwise be obtainable from the internal combustion engine 404, power supplied by the electric motor/generator/transmission 406 can be used to supplement power supplied by the internal combustion engine 404, e.g., where the electric motor/generator/transmission 406 shifts its configuration (e.g., coil/wiring configuration) to meet the power, torque, and/or speed desired. When operator input indicates that less power, torque, and/or speed is desired from the internal combustion engine 404, the electric motor/generator/transmission 406 may shift its configuration (e.g., coil/wiring configuration) to meet the torque and speed of the shaft as it rotates to provide charging power for the battery 412. As the operator desires to slow the vehicle, he will press on the brake pedal and this pressure sensed by the load cell will turn on the stator windings and linearly move the stator coils and rotor magnets in alignment with each other to develop torque and produce energy to charge batteries or other storage device. The actual rpm of the rotor and computer algorithm will determine the series/parallel settings for the generator/motor invention. An example of this setting would be traveling at highway speeds the stator would be configured to 75% parallel and 25% series. As the need for deceleration is required by the operator, he will depress the brake pedal with more force and this will further engage the stator windings with the rotor sections. Also as rpm changes, the stator windings will change in series/parallel configurations to attempt to match the optimal torque needed by the operator. At full stop, the generator/motor will fully engage the stator sets and switch the stator windings into the 100% series mode for anticipated acceleration.

Further, if the control circuitry determines that the internal combustion engine 404 and the electric motor/generator/transmission 406 are insufficient to meet the desired input of the operator and/or maintain an operator determined charge level on the battery bank 412, the control circuitry can activate a second internal combustion engine 416 and a second electric motor/generator/transmission to supplement power to the electric motor/generator/transmissions 406 and/or to charge the battery bank 412.

Example Implementations—Hybrid Marine Propulsion System

Figure 34:
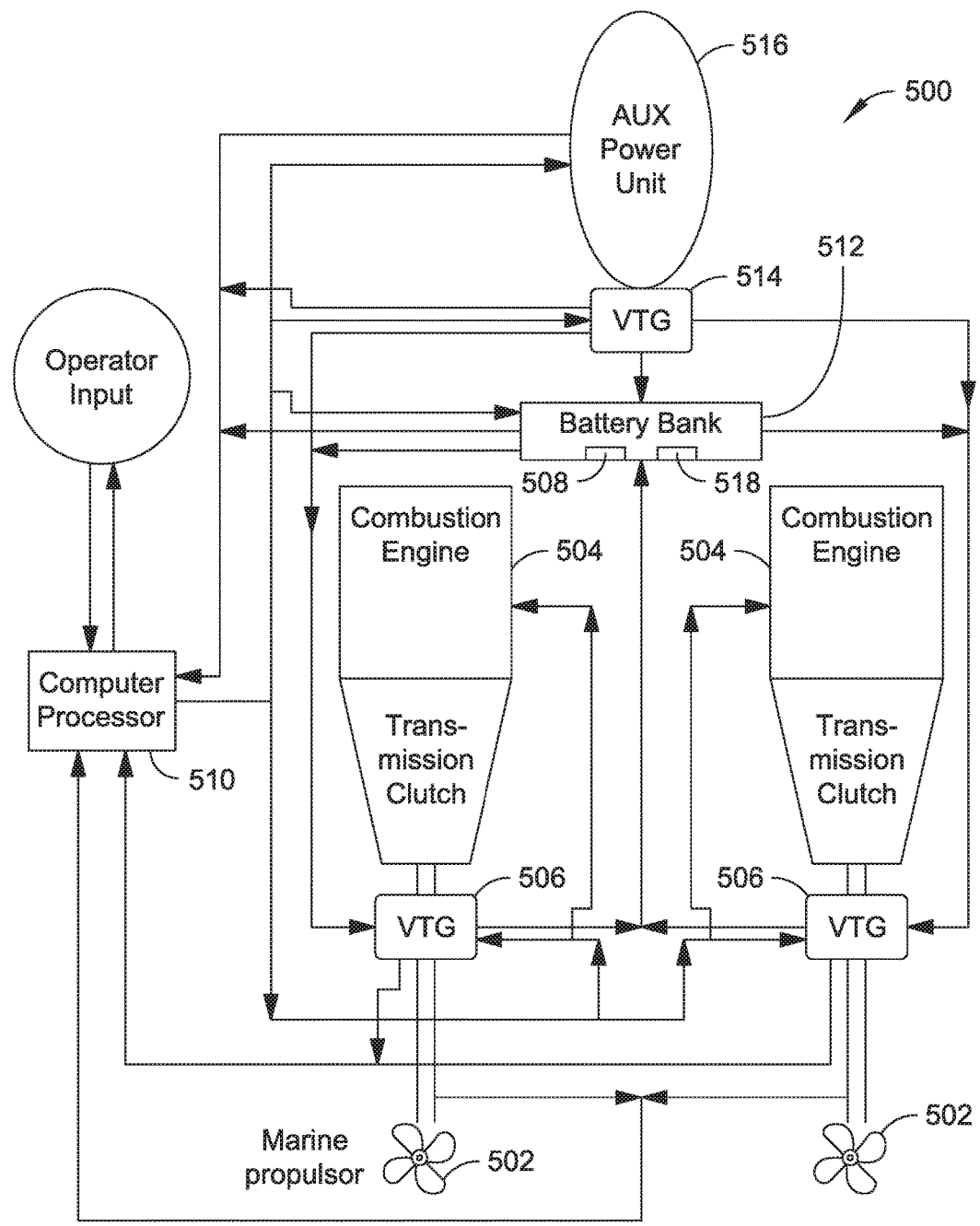
FIG. 34 is a diagrammatic illustration of an electric motor/generator/transmission, such as the electric motor/generator/transmission illustrated in any of FIGS. 1 through 24, in a hybrid marine propulsion system in accordance with example embodiments of the present disclosure.
Figure 35:
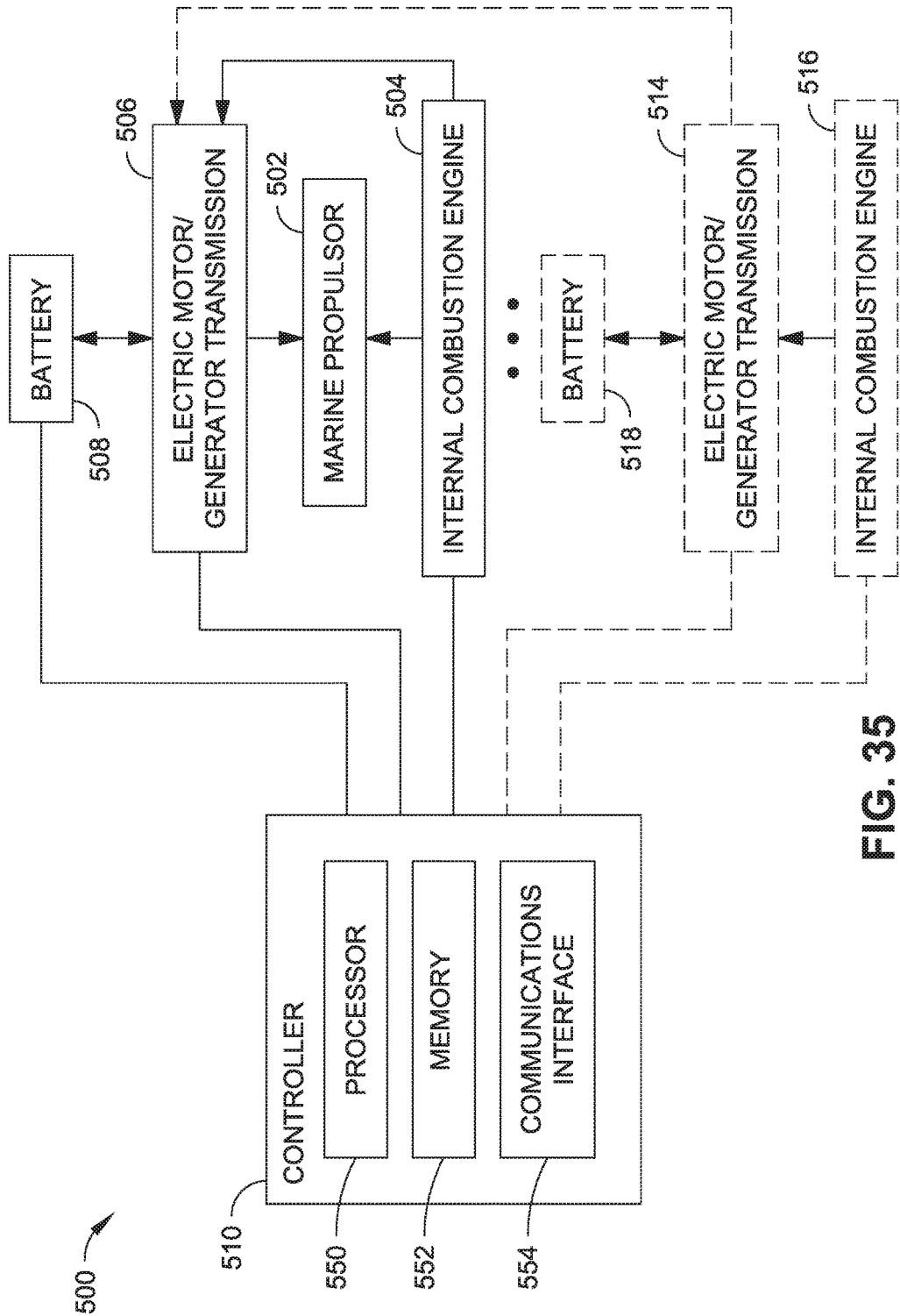
FIG. 35 is another diagrammatic illustration of an electric motor/generator/transmission, such as the electric motor/generator/transmission illustrated in any of FIGS. 1 through 24, in a hybrid marine propulsion system in accordance with example embodiments of the present disclosure.

Referring generally to FIGS. 34 and 35, propulsion systems 500 are described. A propulsion system 500 can be implemented as, for example, a hybrid propulsion system for a marine vessel. The propulsion system 500 includes a propulsion device (e.g., a marine propulsor 502 such as a propeller or water jet) and an engine (e.g., an internal combustion engine 504, such as a diesel engine) to selectively power the marine propulsor 502. The propulsion system 500 also includes a variable torque electric motor/generator/transmission 506 (e.g., as previously described herein with reference to FIGS. 1 through 32) to selectively power the marine propulsor 502, and an energy storage device (e.g., a battery 508, a battery bank 512) to store energy for powering the electric motor/generator/transmission 506.

The propulsion system 500 also includes a controller 510 to selectively operate the propulsion system 500 in a first mode (e.g., an electric mode) where the electric motor/generator/transmission 506 supplies power to the marine propulsor 502, and a second mode (e.g., a hybrid mode) where the internal combustion engine 504 supplies power to both the marine propulsor 502 and the electric motor/generator/transmission 506. In embodiments of the disclosure, when the propulsion system 500 is operated in the hybrid mode, the electric motor/generator/transmission 506 supplies energy for storage in the battery 508. For example, the electric motor/generator/transmission 506 can be used to recharge the battery 508. When the propulsion system 500 is operated in the electric mode, the electric motor/generator/transmission 506 can be powered by energy stored in the battery 508.

In some embodiments, the electric motor/generator/transmission 506 alone can supply power to the propulsion system 500 in the electric mode. In other embodiments, the electric motor/generator/transmission 506 can supplement the internal combustion engine 504 in supplying power to the marine propulsor 502. For instance, the electric motor/generator/transmission 506 and the internal combustion engine 504 can both supply power to the propulsion system 500 in the first mode. As described herein, the electric motor/generator/transmission 506 can power the marine propulsor 502 over a wide range of torque and power requirements with enhanced efficiency. In this manner, operating costs (e.g., a total annual operating cost) of, for example, a marine vessel can be reduced.

As described herein, the controller 510 can include control circuitry communicatively coupled with one or more sensors that monitor functions of a marine vessel, including, but not necessarily limited to: engine speed, shaft speed, shaft torque at an internal combustion engine 504, shaft torque at an electric motor/generator/transmission 506, boat speed through the water, battery status, operator input, and so forth. The control circuitry can compare boat and/or propulsor performance against operator input and make adjustments to the internal combustion engine 504 and/or to the electric motor/generator/transmission 506 to match boat performance with operator input. For instance, the control circuitry can operate the internal combustion engine 504 to facilitate enhanced efficiency and/or life expectancy, supplementing engine power with power from an electric motor/generator/transmission 506 at a torque and speed selected to meet operator input requirements.

In some embodiments, when operator input indicates a desired acceleration and/or high power that may not otherwise be obtainable from the internal combustion engine 504, power supplied by the electric motor/generator/transmission 506 can be used to supplement power supplied by the internal combustion engine 504, e.g., where the electric motor/generator/transmission 506 shifts its configuration (e.g., coil/wiring configuration) to meet the power, torque, and/or speed desired. When operator input indicates that less power, torque, and/or speed is desired from the internal combustion engine 504, the electric motor/generator/transmission 506 may shift its configuration (e.g., coil/wiring configuration) to meet the torque and speed of the shaft as it rotates to provide charging power for the battery 508.

It should be noted that systems that employ a single propulsion device, a single engine, a single electric motor/generator/transmission, a single energy storage device, and so forth are provided by way of example only and are not meant to limit the present disclosure. In other embodiments, a propulsion system 500 can use one or more marine propulsors 502, one or more internal combustion engines 504 to selectively power one or more marine propulsors 502, one or more electric motor/generator/transmissions 506 to selectively power one or more marine propulsors 502 (and possibly to supplement power supplied by one or more internal combustion engines 504), one or more batteries to store energy for powering one or more electric motor/generator/transmissions 506, and so on.

In some embodiments, two or more marine propulsors 502 can be selectively powered by two or more internal combustion engines 504, and two or more electric motor/generator/transmissions 506 can also selectively power the two or more marine propulsors 502 (and possibly supplement power supplied by the two or more internal combustion engines 504). The two or more internal combustion engines 504 can also supply power to the two or more electric motor/generator/transmissions 506, which can supply energy for storage in one or more batteries (e.g., a battery bank 512). Each of the two or more electric motor/generator/transmissions 506 can be powered by energy stored in the battery bank 512 and/or by energy from another electric motor/generator/transmission, which, in turn, can be powered by one or more additional internal combustion engines. For example, in some embodiments, a propulsion system 500 can include a second electric motor/generator/transmission 514 that can be powered by a second engine (e.g., a second internal combustion engine 516, such as a gas powered turbine engine with a high power to weight ratio), where the second electric motor/generator/transmission 514 can be used to supply power to the electric motor/generator/transmission 506 (e.g., in addition to or instead of power supplied by one or more batteries). The second electric motor/generator/transmission 514 and the second internal combustion engine 516 can be used when extended high speed is required and/or when widely fluctuating power demands draw down the battery bank 512 to a level where the electric motor/generator/transmission 506 may not keep the battery bank 512 charged at a predetermined level.

Further, control circuitry communicatively coupled with one or more sensors that monitor functions of a marine vessel (e.g., engine speed, shaft speed, shaft torque at an internal combustion engine 504, shaft torque at an electric motor/generator/transmission 506, boat speed through the water, battery status, operator input, and so forth) can compare boat and/or propulsor performance against operator input and make adjustments to two or more internal combustion engines 504 and/or to two or more electric motor/generator/transmissions 506 to match boat performance with operator input. For instance, the control circuitry can operate two or more internal combustion engines 504 to facilitate enhanced efficiency and/or life expectancy, supplementing engine power with power from two or more electric motor/generator/transmissions 506 at a torque and speed selected to meet operator input requirements. Further, a second electric motor/generator/transmission 514 can be used to supply power to an electric motor/generator/transmission 506 (e.g., in addition to or instead of power supplied by one or more batteries) as determined based upon operator input demands.

In some embodiments, when operator input indicates a desired acceleration and/or high power that may not otherwise be obtainable from the two or more internal combustion engines 504, power supplied by the two or more electric motor/generator/transmissions 506 can be used to supplement power supplied by the two or more internal combustion engines 504, e.g., where the two or more electric motor/generator/transmissions 506 shift their configurations (e.g., coil/wiring configurations) to meet the power, torque, and/or speed desired. When operator input indicates that less power, torque, and/or speed is desired from the two or more internal combustion engines 504, the two or more electric motor/generator/transmissions 506 may shift their configurations (e.g., coil/wiring configurations) to meet the torque and speed of the shaft as it rotates to provide charging power for the battery bank 512.

Further, if the control circuitry determines that the two or more internal combustion engines 504 and the two or more electric motor/generator/transmissions 506 are insufficient to meet the desired input of the operator and/or maintain an operator determined charge level on the battery bank 512, the control circuitry can activate the second internal combustion engine 516 and the second electric motor/generator/transmission 514 to supplement power to the two or more electric motor/generator/transmissions 506 and/or to charge the battery bank 512 (or a second battery 518) chargeable by the second electric motor/generator/transmission 514.

In some embodiments, propulsion systems 500 described herein can be used with diesel engines, which may be comparatively slower to accelerate, and as a result may have slower throttle response times when compared to, for example, gasoline powered engines. Slower throttle response times may be less desirable for some applications, including high speed attack applications, riverine applications, emergency response applications, and security boat applications. As described herein, systems and techniques in accordance with the present disclosure can speed up throttle response times for diesel engine configurations. The electric motor/generator/transmission 506 of the present disclosure has the ability to shift between stators of different windings, and can internally shift windings from series to parallel, and partially parallel and partially series, enabling the electric motor/generator/transmission 506 to serve as an electro/mechanical power source with selectively variable power ranges and selectively variable torque/speed ratios within each power setting.

A high performance diesel internal combustion engine may have low torque and power on startup and may require time under load to build up sufficient revolutions per minute (RPM) and torque to accelerate a boat, which may be slower than an equivalently powered gasoline internal combustion engine. A high performance diesel internal combustion engine also has an optimum speed at which it will run efficiently, generally burning less fuel at its optimum speed than an equivalently powered gasoline engine. High performance diesel engines also generally have a limited number of hours to run at top speed before an expiration of warranty and/or engine life. Thus, supplementary power can be supplied to a high performance diesel boat when rapid acceleration and/or high speed are required, e.g., for a rapid response boat, a patrol boat on a board, a search and seize mission where throttle response in coming along side is critical, a high speed attack boat on an extended mission where throttle response in rough seas is critical and extended cruise at high speed is desired, and so forth. While an electric motor can be used to provide supplementary power on startup, the electric motor may not be as efficient when providing power at high speed, except possibly with the assistance of an elaborate transmission, which may not be able to shift back and forth rapidly enough. A high speed electric motor may have the opposite result, being comparatively inefficient and possibly burning up when high torque is required in rapid acceleration situations. The electric motor/generator/transmissions 506 described herein can provide supplementary power at both the high end and the low end efficiently, and can shift from one to the other and many positions in between rapidly.

In some instances, larger patrol boats may use diesel internal combustion engines for cruising (e.g., at low speed) and then may switch to gas turbine powered electric generators and electric motors for high speed transit. A combination of diesel and electric engines may result in excessive torque for the transmission, which can fail. As described herein, a transmission (e.g., if other than a clutch), is between the internal combustion engine 504 and the electric motor/generator/transmission 506. The electric motor/generator/transmission 506 is itself the transmission to the marine propulsor 502 when supplementary power is applied and is self-disconnectable or neutral from the drive line without clutch or other device when the system is in diesel cruise mode only or intermittently. If another transmission is used, it can be a transmission or clutch for the internal combustion engine 504 and may only be subject to the internal combustion engine 504 power/torque and not the combined power/torque of both internal combustion engine 504 and the electric motor/generator/transmission 506. By using the electric motor/generator/transmission 506 to supplement the power of the internal combustion engine 504, both the internal combustion engine 504 and the electric motor/generator/transmission 506 can be of smaller design since they can work together and not independently when required.

The second electric motor/generator/transmission 514 described herein can have a wide range of torque/speed operating levels where it can be highly efficient and can adjust its power and torque to match the speed and power setting of, for example, an electric motor/generator/transmission 506 when operating at cruise or lower speeds and continue adjusting to obtain efficient battery charging at any speed when necessary. The second electric motor/generator/transmission 514 can supply charging power to the battery bank 512 at the same time it is providing power to the electric motor/generator/transmission 506 (e.g., except when the electric motor/generator/transmission 506 is demanding all power from the second electric motor/generator/transmission 514). This ability to continually adjust to adapt to widely varying speed and power demands can allow the propulsion system 500 to monitor and select an efficient power source between diesel, gas turbine, and electric to propel the vessel, and can allow the system to recharge the battery bank 512 in an efficient manner at various speeds where it is not demanding full power for the propulsion of the boat. An electric motor may not be able to accomplish this, because when it is not turning at its predetermined design speed, the electric motor is either delivering less efficient power to a propulsor or delivering less efficient power to a battery.

A propulsion system 500, including some or all of its components, can operate under computer control. For example, a processor can be included with or in a propulsion system 500 to control the components and functions of propulsion systems 500 described herein using software, firmware, hardware (e.g., fixed logic circuitry), manual processing, or a combination thereof. The terms "controller," "functionality," "service," and "logic" as used herein generally represent software, firmware, hardware, or a combination of software, firmware, or hardware in conjunction with controlling the propulsion systems 500. In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors.

The controller 510 can include a processor 550, a memory 552, and a communications interface 554. The processor 550 provides processing functionality for the controller 510 and can include any number of processors, micro-controllers, or other processing systems, and resident or external memory for storing data and other information accessed or generated by the controller 510. The processor 550 can execute one or more software programs that implement techniques described herein. The processor 550 is not limited by the materials from which it is formed or the processing mechanisms employed therein and, as such, can be implemented via semiconductor(s) and/or transistors (e.g., using electronic integrated circuit (IC) components), and so forth.

The memory 552 is an example of tangible, computer-readable storage medium that provides storage functionality to store various data associated with operation of the controller 510, such as software programs and/or code segments, or other data to instruct the processor 550, and possibly other components of the controller 510, to perform the functionality described herein. Thus, the memory 552 can store data, such as a program of instructions for operating the propulsion system 500 (including its components), and so forth. It should be noted that while a single memory 552 is described, a wide variety of types and combinations of memory (e.g., tangible, non-transitory memory) can be employed. The memory 552 can be integral with the processor 550, can comprise stand-alone memory, or can be a combination of both.

The memory 552 can include, but is not necessarily limited to: removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the controller 510 and/or the memory 552 can include removable integrated circuit card (ICC) memory, such as memory provided by a subscriber identity module (SIM) card, a universal subscriber identity module (USIM) card, a universal integrated circuit card (UICC), and so on.

The communications interface 554 is operatively configured to communicate with components of the propulsion system 500. For example, the communications interface 554 can be configured to transmit data for storage in the propulsion system 500, retrieve data from storage in the propulsion system 500, and so forth. The communications interface 554 is also communicatively coupled with the processor 550 to facilitate data transfer between components of the propulsion system 500 and the processor 550 (e.g., for communicating inputs to the processor 550 received from a device communicatively coupled with the controller 510). It should be noted that while the communications interface 554 is described as a component of a controller 510, one or more components of the communications interface 554 can be implemented as external components communicatively coupled to the propulsion system 500 via a wired and/or wireless connection. The propulsion system 500 can also comprise and/or connect to one or more input/output (I/O) devices (e.g., via the communications interface 554), including, but not necessarily limited to: a display, a mouse, a touchpad, a keyboard, and so on.

In embodiments of hybrid vehicles or marine vessels described herein, input sensors can include sensors for sensing: engine RPM, transmission gear ratio, fuel flow, fuel remaining, throttle position or pressure, brake position or pressure, battery state, charge level, KWH remaining, current flow from batteries (discharge), current flow into batteries (charge), forward shaft torque and RPM between the transmission and electric motor/generator/transmission, within the electric motor/generator/transmission stator/rotor positions for each stator/rotor set, stator phase winding setting-parallel or series for each stator, vehicle speed over the ground or if a boat vessel speed in the water, individual wheel speed for motor vehicle operation, aft shaft torque and RPM between the VTMG and the drive wheels or water propulsion unit. Sensors can also include a GPS or similar navigation unit for detecting data such as trip miles, previous destination memory, trajectory, and the like. The controller memory can include software to record energy consumed and recharged in route on previous destinations with peak load requirement and frequency, software to record general energy consumption per mile driven in area with peak demand and frequency, and the like. Operator input devices can include: system on/off, manual or automatic switch, GPS navigation unit that can communicate with trip software, forward/reverse/gear ratio selector, throttle, brake, and so forth.

Example Operational Sequence

In an example operational sequence, an operator enters vehicle, assumes the control position and switches system from off to automatic. This energizes the system electronic monitoring and control modules. The operator may engage GPS navigation unit and enter destination and note if one way or round trip. The system controller on automatic can run the following sequence of checks: engine RPM—can be zero, not yet started; engine transmission gear ratio/position—can be neutral-shaft disengaged, part of shut down protocol; torque of shaft from electric motor/generator/transmission can be zero; electric motor/generator/transmission checks: the low gear stator with the largest number of cores stators can be engaged with the rotor for max flux/torque to prevent accidental movement of vehicle, part of automatic shutdown protocol; core windings can be in Series for max flux/torque to prevent accidental movement of vehicle, part of automatic shutdown protocol; current flow from battery to electric motor/generator/transmission is off, part of automatic shutdown protocol; battery charge condition, if plugged into external power source overnight it can be at full charge but may not be if recently used or not plugged in, vehicle speed can be zero; if operator entered a destination into GPS system, controller can calculate energy requirements for trip and return, measure present fuel and KWH remaining and advise operator if fuel stop is desired. Calculations can be based on previous destination history if known or area history if not a previous destination.

When the Operator selects automatic drive mode. If batteries are charged to a high level (above 80%), controller can bypass combustion engine startup, and leave engine transmission in neutral with drive shaft disengaged from engine. Operator depresses brake and selects forward or reverse. With forward or reverse selected, controller confirms brake is depressed and vehicle speed is zero. Operator releases brake and advances throttle causing current to flow from the batteries through the inverter control unit for 3-phase power to the electric motor/generator/transmission causing the rotor and the vehicle drive shaft to rotate in the forward or reverse direction as selected. Operator further advances throttle sending more current from the batteries to the electric motor/generator/transmission.

Controller monitors speed of vehicle, RPM and torque on the drive shaft and current flow from the batteries versus pressure or position of throttle. If the operator is requesting more speed through pressure on or position of the throttle to accelerate the vehicle or climb a hill, the RPM/torque on the drive shaft is measured and added to the amount of additional power required to accelerate the vehicle. If the projected power demand is within the torque/RPM range of the first stator set, the controller can switch the first of the parallel wire sets in the core windings of the stator from series to parallel and then the second set and so on until the desired speed is obtained, having the same effect as switching gears from lower gear to higher gear ratio, but actually switching from series to parallel changing the voltage/amperage ratios to produce lower torque and higher RPM at each change of the core wiring from series to parallel. If the projected power demand is not within the torque/RPM range of the first stator set the computer can electrically disconnect the first stator set and cause the second stator actuator to engage the second stator/rotor set and the third and more stator/rotor sets as available and calculated to be desired from the pressure on or position of the throttle and the present torque/RPM loading and place them in the appropriate gear and stator position for a continued smooth acceleration in torque and speed concurrently electrically reconnecting the selected stator sets and shifting active stator sets as described to produce the desired speed. In other embodiments, each stator set can have its own starter whereby shutting down the active stators and bringing them back on line together can be eliminated, allowing each stator set to be independently activated; whereupon, active rotor/stator sets can be adjusted so that the active stator in each set is in the range desired for enhanced (e.g., optimized) efficiency and further fine-tuned by switching from series to parallel by commands from the controller until the desired speed is reached. The controller can continuously monitor the power and speed requirements of the vehicle as determined from the throttle and road conditions to adjust between stators and parallel and series combinations to achieve the least amount of power consumption and maximum efficiency.

When the operator lets up on the throttle, the controller can cause the stator actuators to disengage the stators from the rotors allowing the vehicle to coast with no current flow to the electric motor/generator/transmission. When the operator lightly touches the brake, the first stator set can be engaged in its high gear mode with the electric motor/generator/transmission acting as a generator. As brake pressure is increased the computer can rapidly shift the windings and stator sets to lower and lower parallel/series combinations or the positions with the greatest magnetic back EMF, electricity generated and electromagnetic braking force generated until the vehicle is stopped. In other embodiments, the engagement of high parallel/series mode and the fewest stator sets can occur on the let up of the throttle replacing the coast mode with a defined rate of deceleration on let up of the throttle, i.e. brake control.

As the vehicle continues in operation under full electric battery power it can eventually reach the point where the remaining KWH battery capacity is approximately 80% or some other level depending on battery design where it can more readily and efficiently accept charge from vehicle braking and deceleration as above described. At this point, which could be on startup, if the batteries were not fully charged beforehand, the controller can assess the energy requirements to complete the trip if the operator entered a destination, either new or previous, and compare same with battery charge remaining. If adequate battery power remains for the trip, no further changes are needed and the trip can be completed on full electric power. If the battery charge is insufficient to complete the trip with a reserve of some threshold (e.g., approximately 10 or 20%), the controller can calculate the rate of battery power consumption and the rate of recharge to determine when the combustion engine can be started and engaged to adequately complete the trip—assuming that at the end of the trip the battery can be recharged from external sources. If no destination is entered, the controller can assume the trip length is indefinite and base its computations of energy consumption on prior history for the area it is in, or if no prior history a predetermined factor for different areas of the country such as sea level, hilly, high country mountainous, heavy urban or rural can be used. Where the trip is considered as having indefinite/unknown length the combustion engine can be started and brought on line as desired to maintain an economical and efficient use of power on a continuous basis balancing between combustion fuel and electric power. Although it is stated herein that the calculations for employing the combustion engine can be made at the 80% mark, because that may be the level below which the batteries can more efficiently be recharged, the calculations can be made from the moment the system is turned on and continuously thereafter at regular intervals using the battery charge level, rate of discharge and rate of recharge to determine when the combustion engine can be engaged, unless over ridden by manually selecting battery recharge instead of automatic. Moreover, any threshold or range provided herein and may be substituted by another value if implementation needs so require.

When the controller calculates and determines that the combustion engine can be started and brought on line, the combustion engine becomes the primary power source for the vehicle. The combustion engine is sized to provide sufficient power to move the vehicle at max load and at a predetermined speed over level ground, e.g., 70 mph turnpike driving plus an additional predetermined amount of power to be able accelerate the vehicle to bring it up to speed and climb modest hills without losing excessive amounts of speed. The combustion engine can be sized with the intent of powering a vehicle with a small fuel efficient engine to meet ordinary level driving power requirements plus an incremental additional amount of power for modest acceleration purposes.

When the internal combustion engine is engaged, the engine and associated engine transmission can respond to throttle pressure or position. The torque and RPM on the shaft from the engine prior to the electric motor/generator/transmission is monitored, When RPM used by the operator through the throttle position exceeds the capacity of the engine, the computer can compute the power required to increase the RPM of the shaft from its current torque/RPM level to that required by throttle position and determines the number of stator sets to be engaged to meet the additional power requirement, the appropriate stator within the sets and the appropriate parallel/series winding combination to be able to increase the applied torque to the shaft at the then RPM. As the RPM increases the computer can shift stator sets and parallel/series windings to provide efficient use of power as it can with the electric mode above described. In this case, however, the electric motor/generator/transmission is providing supplemental power in addition to that supplied by the combustion engine which is primary. The electric motor/generator/transmission can come into use as described when additional power is required to accelerate and pass another vehicle, enter traffic flow or increase vehicle speed faster than the low powered combustion engine can produce. The same can be the case if a large hill is encountered and additional torque is used to maintain speed. When the other vehicle is passed or the top of the hill is reached and additional power to maintain speed begins to diminish, the controller can reduce the number of stator sets employed, and downshift the electric motor/generator/transmission by shifting between stators within the sets and changing the parallel/series until the additional power requirement is no longer required and can shut down the electric motor/generator/transmission. The controller continuously monitoring the system throughout to maintain efficient/economical use of power and fuel through the use of the electric motor/generator/transmission. This can also apply in cases where the combustion engine is required by throttle position to operate outside of its optimum efficiency range and the computer determines that there is adequate battery power to supplement the combustion engine.

When decelerating and/or braking under combustion engine power, the operator can reduce throttle pressure or position, the combustion engine can be disengaged (after a predefined lag can shut down) and stator actuators in the electric motor/generator/transmission can move the stators and shift the parallel/series windings as described above. When the throttle pressure is increased after decelerating or braking the engine restarts if shut down and if desired the VTMG supplements the combustion engine with electric power as described above.

When traveling under combustion engine power and the computer determines that the battery charge is not being maintained sufficiently to provide auxiliary power for operations as defined by recent history of operation of the vehicle and past history for the area or destination if available, the controller can engage one or more stator sets in the generator mode to utilize the incremental additional power during times when the vehicle is operating on level ground and has such incremental power available within the capacity of the combustion engine. This and the deceleration or braking mode is an area where the techniques in accordance with the present disclosure can provide two or more stator coils windings of different coil numbers and the ability to switch sets of wires within a stator from parallel to series to efficiently collect energy available at optimum efficiency whether kinetic or combustion/mechanical, it can replenish the battery charge readily and efficiently. This is accomplished by automatically switching to a lower mechanical gear, if desired, in the combustion engine transmission designed for that purpose and running the combustion engine at higher RPM where drive shaft speed is consistent with typical operation but with higher engine speed and greater torque there is excess engine power being generated during straight and level non-accelerating operations to be collected by the electric motor/generator/transmission to recharge the batteries along with the ability to quickly redirect the power being collected back to the vehicle operation and further supplement it as described above.

In certain instances where the difference between typical operations and peak demand is high, the capacity of the battery system and the frequency and level of recharge including recharge from the engine may be insufficient to provide supplementary power for meeting extreme demands. Examples of this may be a heavily loaded truck climbing up a long mountain pass or a military patrol boat that is normally on patrol at idle or slow cruise speeds and then goes into a high speed chase or other extreme military maneuver. In such instances a third power source may be desirable. In the case of a truck it might be a second diesel engine powering a second electric motor/generator/transmission unit that can independent from the primary electric motor/generator/transmission recharge the batteries or provide additional power to the primary electric motor/generator/transmission controlled from the primary computer. In the case of a patrol boat it could have twin diesel engines powering propellers or other propulsion units such as water jets each with an electric motor/generator/transmission arranged as shown for the hybrid vehicle and its engine and a third larger jet turbine engine with a third larger electric motor/generator/transmission providing electrical power to the two primary electric motor/generator/transmission units or power to recharge the battery bank.

For use in industrial motor functions, the disclosure can slowly engage the stator actuation and shift windings from high torque/low speed to high speed lower torque in order to "soft start" in heavy use situations such as large air conditioning, piston compressors, conveyors, large water pumps and hydraulic pumps. This can help conserve energy and cost as the initial power spike can be lessened and lower maximum amperage draws from the power company can result in a lower power bill.

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits. Such integrated circuits may comprise various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block, or circuit may be implemented using its software or firmware equivalent. In other instances, one part of a given system, block, or circuit may be implemented in software or firmware, while other parts are implemented in hardware.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A propulsion system comprising:
   a propulsion device;
   an engine to selectively power the propulsion device;
   a variable torque motor/generator/transmission to selectively power the propulsion device;
   an energy storage device to store energy for powering the variable torque motor/generator/transmission; and
   a controller to selectively operate the propulsion system in a first mode where the variable torque motor/generator/transmission supplies power to the propulsion device, and a second mode where the engine supplies power to both the propulsion device and the variable torque motor/generator/transmission, wherein the variable torque motor/generator/transmission supplies energy for storage in the energy storage device when the propulsion system is operated in the second mode,
wherein the variable torque motor/generator/transmission includes:
a stator support extending longitudinally in a first direction, the stator support having a first stator and a second stator spaced apart from the first stator in the first direction;
a rotor rotatably coupled with the stator support, the rotor having an axis of rotation and a longitudinal support structure extending in the first direction; and
an interactive field element slidably coupled with the longitudinal support structure to translate along the longitudinal support structure parallel to its axis of rotation between a first orientation where the first stator is engaged with the interactive field element, a second orientation where the second stator is engaged with the interactive field element, and a third orientation where neither the first stator nor the second stator is engaged with the interactive field element.

2. The propulsion system as recited in claim 1, wherein at least one of the first stator or the second stator comprises at least one of an outer ring or an inner ring with respect to the interactive field element.

3. The propulsion system as recited in claim 1, wherein the interactive field element comprises at least one of a permanent magnet or an electromagnet.

4. The propulsion system as recited in claim 1, wherein the first stator comprises a first wire winding having a first winding configuration and the second stator comprises a second wire winding having a second winding configuration different from the first winding configuration.

5. The propulsion system as recited in claim 1, wherein the longitudinal support structure comprises a central shaft with the first stator and the second stator of the stator support disposed around at least a portion of the central shaft.

6. The propulsion system as recited in claim 1, wherein the rotor is configured to couple with at least a second rotor of a second motor/generator/transmission to form a multi set motor/generator/transmission with a common axle formed by the rotor and the second rotor.

7. The propulsion system as recited in claim 1, further comprising at least a second interactive field element slidably coupled with the longitudinal support structure to translate along the longitudinal support structure parallel to its axis of rotation between the first stator engaged with the second interactive field element, the second stator engaged with the second interactive field element, and neither the first stator nor the second stator engaged with the second interactive field element.

8. The propulsion system as recited in claim 1, wherein the interactive field element and the second interactive field element are spaced apart from one another at a periphery of an outer surface of the rotor to form a ring.

9. The propulsion system as recited in claim 1, further comprising at least a third interactive field element slidably coupled with the longitudinal support structure to translate along the longitudinal support structure parallel to its axis of rotation between the first stator engaged with the third interactive field element, the second stator engaged with the third interactive field element, and neither the first stator nor the second stator engaged with the third interactive field element.

10. The propulsion system as recited in claim 1, wherein the interactive field element, the second interactive field element, and the third interactive field element are equally spaced apart from one another at a periphery of an outer surface of the rotor to form a ring.

11. The propulsion system as recited in claim 1, further comprising an actuator configured to move the interactive field element between the first orientation, the second orientation, and the third orientation.

12. The propulsion system as recited in claim 11, wherein the actuator comprises at least one of a solenoid, a linear motion screw, a pneumatic cylinder, or a hydraulic cylinder.

13. The propulsion system as recited in claim 1, wherein each of the first and second stators includes a ring of cores circumscribing a central stator axis that is coaxial with the axis of rotation of the rotor, wherein each phase of the ring of cores is wound with two or more non-twisted wires, in parallel with one another other, separated at a switchable center tap.

14. The propulsion system as recited in claim 13, further comprising:
electronically controlled switches configured to selectively connect the two or more non-twisted wires in parallel or series.

15. The propulsion system as recited in claim 14, wherein the electronically controlled switches are configured to connect the two or more non-twisted wires of each phase all in parallel, producing a first torque/speed.

16. The propulsion system as recited in claim 14, wherein the electronically controlled switches are configured to connect the two or more non-twisted wires of each phase all in series, producing a second torque/speed.

17. The propulsion system as recited in claim 14, wherein the two or more non-twisted wires include multiple sets of two wires, wherein the electronically controlled switches are configured to connect the two wires of each set in parallel and are configured to connect the multiple sets in series with one another, producing a third torque/speed different from all parallel and all series configurations of the two or more non-twisted wires.

18. The propulsion system as recited in claim 14, wherein the two or more non-twisted wires include multiple sets of three wires, wherein the electronically controlled switches are configured to connect the three wires of each set in parallel and are configured to connect the multiple sets in series with one another, producing a fourth torque/speed different from all parallel and all series configurations of the two or more non-twisted wires.

19. The propulsion system as recited in claim 1, wherein the propulsion system comprises a hybrid propulsion system.

20. The propulsion system as recited in claim 1, wherein the engine comprises at least one of an internal combustion engine or a battery.

* * * * *